(12) United States Patent
Harviainen

(10) Patent No.: US 12,342,023 B2
(45) Date of Patent: *Jun. 24, 2025

(54) SYSTEM AND METHOD FOR ADAPTIVE SPATIAL CONTENT STREAMING WITH MULTIPLE LEVELS OF DETAIL AND DEGREES OF FREEDOM

(71) Applicant: InterDigital VC Holdings, Inc., Wilmington, DE (US)

(72) Inventor: Tatu V J Harviainen, Helsinki (FI)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,545

(22) Filed: May 24, 2024

(65) Prior Publication Data

US 2024/0314380 A1    Sep. 19, 2024

Related U.S. Application Data

(63) Continuation of application No. 18/208,798, filed on Jun. 12, 2023, now Pat. No. 12,022,144, which is a
(Continued)

(51) Int. Cl.
*H04N 21/2662* (2011.01)
*H04L 65/612* (2022.01)
(Continued)

(52) U.S. Cl.
CPC ....... *H04N 21/2662* (2013.01); *H04L 65/612* (2022.05); *H04L 65/80* (2013.01); *H04N 21/2402* (2013.01)

(58) Field of Classification Search
CPC ........... H04N 21/2662; H04N 21/2402; H04N 19/597; H04N 21/23439; H04N 21/6587;
(Continued)

(56) References Cited

U.S. PATENT DOCUMENTS

| 9,438,652 B2 | 9/2016 | Andersson |
| 9,699,437 B2 | 7/2017 | Cole |

(Continued)

FOREIGN PATENT DOCUMENTS

| CN | 108600789 A | 9/2018 |
| WO | 2018049221 A1 | 3/2018 |
| WO | 2018069357 A1 | 4/2018 |

OTHER PUBLICATIONS

International Search Report and Written Opinion of the International Searching Authority for PCT/US2020/014184 mailed Mar. 16, 2020, 15 pages.
(Continued)

*Primary Examiner* — Javier O Guzman
(74) *Attorney, Agent, or Firm* — Klintworth & Rozenblat IP LLP

(57) ABSTRACT

Some embodiments of an example method may include: receiving a manifest file for streaming content, the manifest file identifying one or more degrees of freedom representations of content; tracking bandwidth available; selecting a selected representation from the one or more degrees of freedom representations based on the bandwidth available; retrieving the selected representation; and rendering the selected representation. Some embodiments of the example method may include determining estimated download latency of the one or more degrees of freedom representations. Some embodiments of the example method may include tracking client capabilities. For some embodiments of the example method, selecting the selected representation may be based on the estimated download latency and/or the client capabilities.

19 Claims, 28 Drawing Sheets

Related U.S. Application Data continuation of application No. 17/423,787, filed as application No. PCT/US2020/014184 on Jan. 17, 2020, now Pat. No. 11,722,718.

(60) Provisional application No. 62/871,942, filed on Jul. 9, 2019, provisional application No. 62/796,406, filed on Jan. 24, 2019.

(51) Int. Cl.
   *H04L 65/80* (2022.01)
   *H04N 21/24* (2011.01)

(58) Field of Classification Search
   CPC ........... H04N 21/816; H04N 21/85406; H04N 21/8456; H04N 21/2343; H04N 21/81; H04N 21/845; H04N 21/854; H04L 65/612; H04L 65/80; H04L 65/752; H04L 43/0894; H04L 67/02
   See application file for complete search history.

(56) References Cited

U.S. PATENT DOCUMENTS

| | | | |
|---|---|---|---|
| 9,753,542 | B2 | 9/2017 | Chizeck |
| 9,786,027 | B1 | 10/2017 | Cooley |
| 10,491,711 | B2 * | 11/2019 | Hancock ............... G06F 3/013 |
| 11,165,958 | B2 | 11/2021 | Kim |
| 11,677,802 | B2 | 6/2023 | He |
| 2013/0091297 | A1 * | 4/2013 | Minder .............. H04N 21/4384 709/231 |
| 2013/0195204 | A1 | 8/2013 | Reznik |
| 2014/0149573 | A1 | 5/2014 | Tofighbakhsh |
| 2015/0235430 | A1 | 8/2015 | Schowengerdt |
| 2015/0373153 | A1 | 12/2015 | Jenkins |
| 2016/0014184 | A1 | 1/2016 | Rehan |
| 2016/0140930 | A1 | 5/2016 | Pusch |
| 2016/0198140 | A1 | 7/2016 | Nadler |
| 2017/0124398 | A1 | 5/2017 | Birkbeck |
| 2018/0077451 | A1 * | 3/2018 | Yip ...................... H04N 13/194 |
| 2018/0191799 | A1 | 7/2018 | Chen |
| 2018/0240276 | A1 | 8/2018 | He |
| 2019/0020816 | A1 | 1/2019 | Shan |
| 2019/0028691 | A1 | 1/2019 | Hinds |
| 2019/0089643 | A1 | 3/2019 | Westphal |
| 2019/0230142 | A1 * | 7/2019 | He .......................... H04L 65/70 |
| 2019/0238609 | A1 | 8/2019 | Skupin |
| 2020/0014907 | A1 | 1/2020 | Lee |
| 2020/0037029 | A1 | 1/2020 | He |
| 2020/0288097 | A1 * | 9/2020 | Sheng ..................... G06V 20/40 |
| 2020/0344458 | A1 | 10/2020 | Hanhart |
| 2020/0413097 | A1 | 12/2020 | Kroon |
| 2021/0058633 | A1 | 2/2021 | Pettersson |
| 2021/0112233 | A1 | 4/2021 | Miska |
| 2021/0120360 | A1 | 4/2021 | Terentiv |
| 2021/0157406 | A1 | 5/2021 | Leppänen |
| 2021/0183010 | A1 | 6/2021 | Mate |
| 2021/0321072 | A1 | 10/2021 | Oh |
| 2021/0400314 | A1 | 12/2021 | Varekamp |
| 2022/0038791 | A1 | 2/2022 | Curcio |
| 2022/0053224 | A1 | 2/2022 | Katsumata |
| 2022/0078486 | A1 | 3/2022 | Hannuksela |
| 2022/0095001 | A1 * | 3/2022 | Harviainen ........ H04N 21/6587 |

OTHER PUBLICATIONS

Xu, Yiling, et. al., "Omnidirectional Media Format and Its Application to Immersive Video Streaming: An Overview". XP055602670, Jan. 1, 2018, 11 pages.

Zampoglou, Markos, et. al., "Adaptive Streaming of Complex Web 3D Scenes Based on the MPEG-DASH Standard". 77.1 Multimedia Tools and Applications, No. XP036403724, Dec. 16, 2016, pp. 125-148 (13 pages).

VR Industry Forum: "Guidelines Version 2.0, draft004 2019-01-07 VR Industry Forum". 3GPP Draft; VRIF2018.110.04-Guidelines-2.0-For-Community-Review, 3rd Generation Partnership Project (3GPP), Jan. 18, 2019, No. XP051611873 (99 pages).

Wien, Mathias, et al., "Standardization Status of Immersive Video Coding". IEEE Journal on Emerging and Selected Topics in Circuits and Systems, vol. 9, No. 1, XP011714056, Mar. 1, 2019, pp. 5-17 (13 pages).

"Draft Requirements for MPEG-1 Phase 2". 124. MPEG Meeting, No. n17926, Oct. 8-12, 2018 (6 pages).

International Preliminary Report on Patentability for PCT/US2020/014184 mailed Aug. 5, 2021, 11 pages.

Lavoué, Guillaume, et al. "Streaming Compressed 3D Data on the Web using JavaScript and WebGL." In: Proceedings of the 18th International Conference on 3D Web Technology. ACM, 2013, pp. 19-27 (9 pages).

Park, Jounsup, et al. "Rate-Utility Optimized Streaming of Volumetric Media for Augmented Reality." IEEE Journal on Emerging and Selected Topics in Circuits and Systems 9, No. 1 (2019, pp. 149-162 https://arxiv.org/ftp/arxiv/papers/1804/1804.09864.pdf (18 pages).

"The structure of an MPEG-DASH MPD". https://www.brendanlong.com/the-structure-of-an-mpeg-dash-mpd.html, Mar. 20, 2015 (6 pages).

Evans, Alun, et al. "A pipeline for the creation of progressively rendered web 3D scenes". Multimedia Tools and Applications, 2017 (29 pages).

* cited by examiner

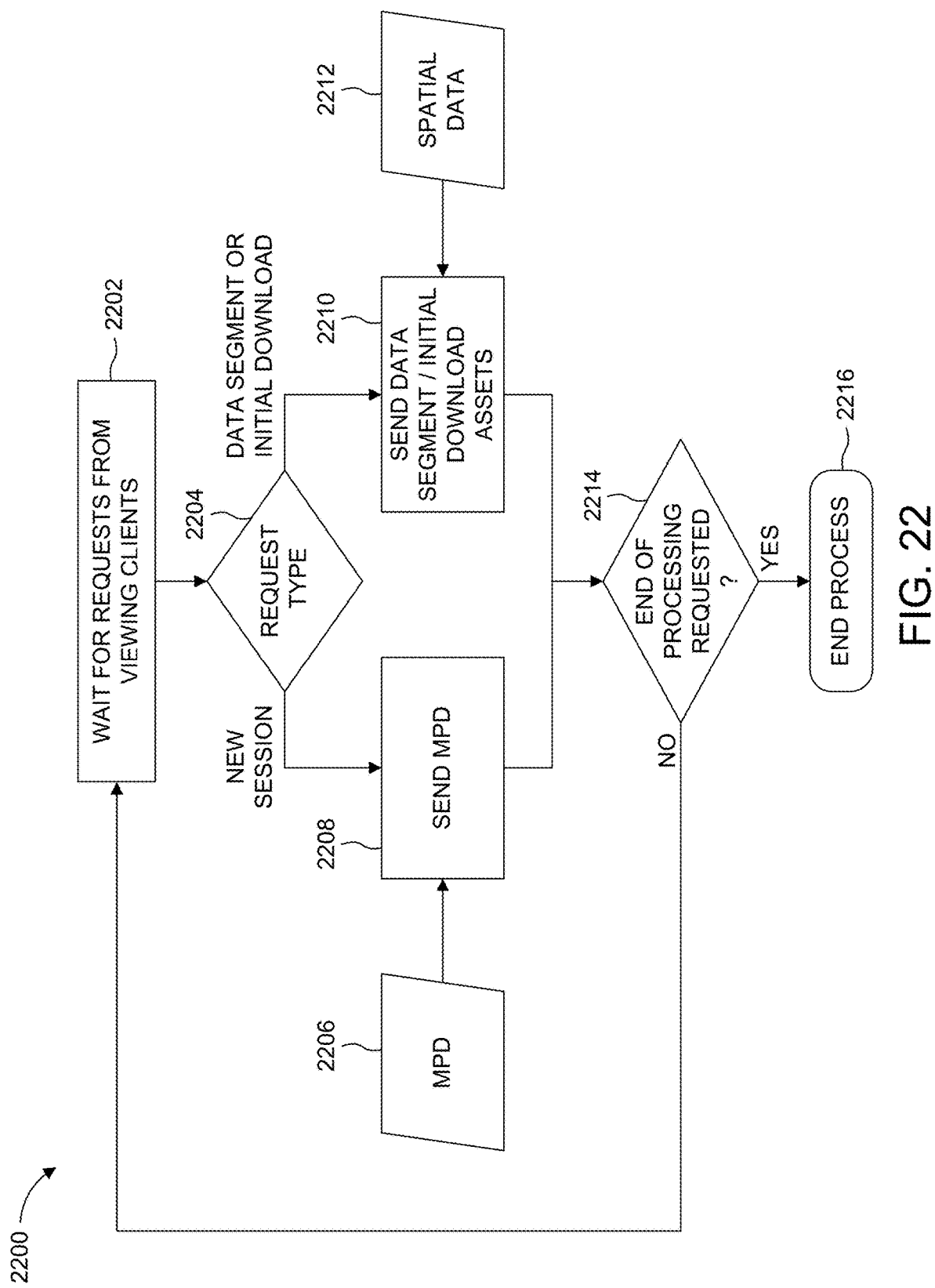

SYSTEM AND METHOD FOR ADAPTIVE SPATIAL CONTENT STREAMING WITH MULTIPLE LEVELS OF DETAIL AND DEGREES OF FREEDOM

CROSS-REFERENCE TO RELATED APPLICATIONS

The present application is a continuation of U.S. patent application Ser. No. 18/208,798, entitled "SYSTEM AND METHOD FOR ADAPTIVE SPATIAL CONTENT STREAMING WITH MULTIPLE LEVELS OF DETAIL AND DEGREES OF FREEDOM", filed Jun. 12, 2023, which is a continuation of U.S. patent application Ser. No. 17/423,787, entitled "SYSTEM AND METHOD FOR ADAPTIVE SPATIAL CONTENT STREAMING WITH MULTIPLE LEVELS OF DETAIL AND DEGREES OF FREEDOM," filed Jul. 16, 2021, now U.S. Pat. No. 11,722,718, issued on Aug. 8, 2023, which claims benefit under 35 U.S.C. § 371 of International Application No. PCT/US2020/014184, entitled "SYSTEM AND METHOD FOR ADAPTIVE SPATIAL CONTENT STREAMING WITH MULTIPLE LEVELS OF DETAIL AND DEGREES OF FREEDOM," filed Jan. 17, 2020, which claims benefit under 35 U.S.C. § 119(e) from U.S. Provisional Patent Application Ser. No. 62/796,406, entitled "SYSTEM AND METHOD FOR ADAPTIVE SPATIAL CONTENT STREAMING WITH MULTIPLE LEVELS OF DETAIL AND DEGREES OF FREEDOM," filed Jan. 24, 2019 and from U.S. Provisional Patent Application Ser. No. 62/871,942, entitled "SYSTEM AND METHOD FOR BALANCING DOWNLOADS IN SPATIAL DATA STREAMING," filed Jul. 9, 2019, all of which are hereby incorporated by reference in its respective entirety.

BACKGROUND

The MPEG-DASH protocol addresses dynamic variation in streaming media distribution bandwidth by focusing on video content. Some previous systems of adaptive spatial content streaming focus on a single spatial content type, such as 3D data in a polygon mesh format. Some systems adjust to bandwidth limitations and to computing performance at the client.

Contrary to video content, where streamed data is always essentially a sequence of image frames, spatial data may have much more variability in how the content is organized and intended to be used for producing the images finally at the client side sent to the display. Different content formats have different characteristics and variation in content quality, memory consumption, and freedom of navigation permitted. Furthermore, some spatial content formats may in some cases require a large amount of content assets to be downloaded before the content rendering may begin.

SUMMARY

An example method in accordance with some embodiments may include: receiving a manifest file for streaming content, the manifest file identifying one or more degrees of freedom representations of content; tracking bandwidth available; selecting a selected representation from the one or more degrees of freedom representations based on the bandwidth available; retrieving the selected representation; and rendering the selected representation.

For some embodiments, the example method may further include: determining estimated download latency of the one or more degrees of freedom representations; responsive to the estimated download latency, selecting a second representation from the one or more degrees of freedom representations; retrieving the second representation; and rendering the second representation.

For some embodiments, the example method may further include: determining estimated download latency of the one or more degrees of freedom representations; responsive to the estimated download latency, selecting a second representation from the one or more degrees of freedom representations; retrieving initial download data of the second representation; requesting a stream segment of the second representation; and displaying the retrieved initial download data and the stream segment comprising a full spatial data scene view.

For some embodiments of the example method, the one or more degrees of freedom representations may include 0 DoF, 3 DoF, 3 DoF+, and 6 DoF representations of content.

For some embodiments of the example method, selecting the selected representation may be selected further based on at least one of client capabilities and range of motion of the client.

For some embodiments, the example method in accordance with some embodiments may further include: tracking the range of motion of the client; detecting a change in the range of motion of the client; and responsive to detecting the change in the range of motion of the client, selecting another representation from the one or more degrees of freedom representations.

For some embodiments, the example method in accordance with some embodiments may further include: tracking the client capabilities; detecting a change in the client capabilities; and responsive to detecting the change in the client capabilities, selecting another representation from the one or more degrees of freedom representations.

For some embodiments, the example method in accordance with some embodiments may further include: detecting a change in the bandwidth available; responsive to detecting the change in the bandwidth available, selecting an additional representation from the one or more degrees of freedom representations; retrieving the additional representation; and rendering the additional representation.

For some embodiments of the example method, selecting the selected representation may include: determining a respective minimum bandwidth for each of the one or more degrees of freedom representations; and selecting the selected representation from the one or more degrees of freedom representations associated with a highest level of detail available such that the respective minimum bandwidth is less than the tracked bandwidth available.

For some embodiments of the example method, selecting the selected representation may include: determining a respective start-up delay for one or more of a plurality of content elements; determining a minimum start-up delay of the determined respective start-up delays; and selecting the degrees of freedom representation corresponding to the minimum start-up delay.

For some embodiments, the example method in accordance with some embodiments may further include: determining a quality of experience (QoE) metric for the selected representation is less than a threshold; and responsive to determining the QoE metric for the selected representation is less than the threshold, selecting a still further representation from the one or more degrees of freedom representations.

For some embodiments of the example method, the QoE metric may be a metric selected from the group consisting of network performance, processing performance, client computing performance, and session conditions.

For some embodiments, the example method in accordance with some embodiments may further include: selecting a level of detail representation from one or more level of detail representations for the selected degrees of freedom representation based on a viewpoint of a user, wherein the selected degrees of freedom representation comprises the one or more level of detail representations.

For some embodiments, the example method in accordance with some embodiments may further include: limiting the viewpoint of the user to a viewing area for the user, wherein the manifest file comprises the viewing area for the user.

For some embodiments, the example method in accordance with some embodiments may further include: determining available processing power for processing the selected degrees of freedom representation; and selecting a level of detail representation from one or more level of detail representations for the selected degrees of freedom representation based on the available processing power, wherein the selected degrees of freedom representation comprises the selected level of detail representation.

For some embodiments, the capabilities of the client may include one or more of the following: resolution, display size, pixel size, number of dimensions supported, degrees of freedom supported, levels of detail supported, bandwidth supported, processing power, processing performance, start-up delay, latency delay, image quality, and spatial content types supported.

For some embodiments, the manifest file may include a Media Presentation Description (MPD) file.

An example apparatus in accordance with some embodiments may include: a processor; and a non-transitory computer-readable medium storing instructions that are operative, when executed by the processor, to cause the apparatus to perform any of the embodiments of the example method.

An example method in accordance with some embodiments may include: receiving, at a client device, a manifest file describing an ordered plurality of degrees of freedom representations of content; estimating, at the client device, bandwidth available for streaming the content to the client device; selecting, at the client device, a first degrees of freedom representation from the ordered plurality of degrees of freedom representations; detecting, at the client device, a change in the bandwidth available for streaming the content; responsive to detecting the change in the bandwidth available, selecting, at the client device, a second degrees of freedom representation from the ordered plurality of degrees of freedom representations; and requesting the second degrees of freedom representation.

An example apparatus is accordance with some embodiments may include: a processor; and a non-transitory computer-readable medium storing instructions that are operative, when executed by the processor, to perform an example method listed above.

In some embodiments of the example method, estimating bandwidth available for streaming the content to the client device may include detecting the change in the bandwidth available for streaming the content, and selecting the second degrees of freedom representation responsive to estimating the change in bandwidth available may include selecting the second degrees of freedom representation responsive to detecting the change in the bandwidth available for streaming the content In some embodiments of the example method, the manifest file comprises a Media Presentation Description (MPD) file.

In some embodiments of the example method, the plurality of degrees of freedom representations may include 0 DoF, 3 DoF, 3 DoF+, and 6 DoF representations of the content.

In some embodiments of the example method, the change in the bandwidth available may be estimated to be a reduction, and the second degrees of freedom representation may include a lower degree of freedom.

In some embodiments of the example method, the change in the bandwidth available may be estimated to be an increase, and the second degrees of freedom representation comprises a higher degree of freedom.

Some embodiments of the example method may further include: determining available processing power for processing the second degrees of freedom representation; and selecting a level of detail representation from a plurality of level of detail representations for the second degrees of freedom representation based on the available processing power, wherein the second degrees of freedom representation may include the plurality of level of detail representations.

In some embodiments of the example method, the available processing power may include at least one parameter selected from the group consisting of local rendering power and view interpolation power.

Some embodiments of the example method may further include: tracking a range of motion of the client; and responsive to detecting a reduction in the range of motion of the client, selecting a third degrees of freedom representation from the ordered plurality of degrees of freedom representations, wherein degrees of freedom of the third degrees of freedom representation may be less than degrees of freedom of the second degrees of freedom representation.

Some embodiments of the example method may further include rendering the content for the second degrees of freedom representation.

Some embodiments of the example method may further include: determining a quality of experience (QoE) metric for the content; selecting a third degrees of freedom representation from the ordered plurality of degrees of freedom representations based on the QoE metric; and requesting, from a streaming server, the third degrees of freedom representation.

In some embodiments of the example method, the QoE metric may be selected from the group consisting of: network performance, processing performance, and session conditions.

Some embodiments of the example method may further include selecting a level of detail representation from a plurality of level of detail representations for the third degrees of freedom representation based on the QoE metric, wherein the third degrees of freedom representation may include the plurality of level of detail representations.

Some embodiments of the example method may further include determining a viewpoint of a user, wherein rendering the content renders the content for the viewpoint of the user.

Some embodiments of the example method may further include: selecting a third degrees of freedom representation from the ordered plurality of degrees of freedom representations based on the viewpoint of the user; and requesting, from a streaming server, the third degrees of freedom representation.

Some embodiments of the example method may further include selecting a level of detail representation from a plurality of level of detail representations for the third degrees of freedom representation based on the viewpoint of the user, wherein the third degrees of freedom representation may include the plurality of level of detail representations.

Some embodiments of the example method may further include limiting a viewpoint of a user to a viewing area for the user, wherein the manifest file may include the viewing area for the user.

Some embodiments of the example method may further include limiting a viewpoint of a user to a combination of the viewing area for the user and a navigation area for the user, wherein the manifest file may include the navigation area for the user.

An example apparatus in accordance with some embodiments may include: a processor; a non-transitory computer-readable medium storing instructions that are operative, when executed by the processor, to perform any of the methods of a client device including, e.g., a viewing client described above.

Another example method in accordance with some embodiments may include: receiving, at a content server, e.g., a streaming content server, a request for a manifest file describing an ordered plurality of degrees of freedom representations of content; generating the manifest file for the content; sending, to a client device, the manifest file; receiving, from the client device, a request for a data segment of the content; and sending, to the client device, the data segment of the content, wherein at least one of the ordered plurality of degrees of freedom representations may include at least two level of detail representations of the content.

In some embodiments of the example method, the request for the data segment indicates a selected degrees of freedom representation selected from the ordered plurality of degrees of freedom representations, the selected degrees of freedom representation within the manifest file comprises a plurality of level of detail representations, and the request for the data segment indicates a selected level of detail selected from the plurality of level of detail representations.

In some embodiments of the example method, the data segment sent to the client device matches the selected degrees of freedom representation and the selected level of detail representation.

An example apparatus in accordance with some embodiments may include: a processor; a non-transitory computer-readable medium storing instructions that are operative, when executed by the processor, to perform any of the methods of a content server described above.

An example method in accordance with some embodiments may include: receiving spatial data of a scene; generating ordered levels of detail (LoD) versions of the spatial data; generating ordered degrees of freedom (DoF) versions of the spatial data; generating a media presentation description (MPD) for the scene; responsive to receiving a content request from a viewing client, sending the MPD to the viewing client; and transferring, to the viewing client, data elements for the content request.

An example apparatus in accordance with some embodiments may include: a processor; a non-transitory computer-readable medium storing instructions that are operative, when executed by the processor, to perform the method of: receiving spatial data of a scene; generating ordered levels of detail (LoD) versions of the spatial data; generating ordered degrees of freedom (DoF) versions of the spatial data; generating a media presentation description (MPD) for the scene; responsive to receiving a content request from a viewing client, sending the MPD to the viewing client; and transferring, to the viewing client, data elements for the content request.

An example method in accordance with some embodiments may include: requesting, from a content server, content for a scene; collecting information on session specific viewing conditions; receiving, from the content server, a media presentation description (MPD) for the scene; selecting a viewpoint as an initial viewpoint of the scene; requesting an initial set of content segments of the scene using application specific initial requirements; setting a current set of content segments to the initial set of content segments; and repeating continually, until a session termination is received, a content request and display process comprising: displaying the current set of content segments; responsive to processing scene logic and user feedback input, updating the viewpoint of the scene; determining a quality of experience (QoE) metric; updating LoD and DoF levels adapted to the QoE metric; updating LoD and DoF levels adapted to the QoE metric; requesting an updated set of content segments of the scene matching the updated LoD and DoF levels; and setting the current set of content segments to be the updated set of content segments.

In some embodiments of the example method, the application specific initial requirements include initial levels for the LoD and DoF.

An example apparatus in accordance with some embodiments may include: a processor; a non-transitory computer-readable medium storing instructions that are operative, when executed by the processor, to perform the method of: requesting, from a content server, content for a scene; collecting information on session specific viewing conditions; receiving, from the content server, a media presentation description (MPD) for the scene; selecting a viewpoint as an initial viewpoint of the scene; requesting an initial set of content segments of the scene using application specific initial requirements; setting a current set of content segments to the initial set of content segments; and repeating continually, until a session termination is received, a content request and display process comprising: displaying the current set of content segments; responsive to processing scene logic and user feedback input, updating the viewpoint of the scene; determining a quality of experience (QoE) metric; updating LoD and DoF levels adapted to the QoE metric; updating LoD and DoF levels adapted to the QoE metric; requesting an updated set of content segments of the scene matching the updated LoD and DoF levels; and setting the current set of content segments to be the updated set of content segments.

Another example method in accordance with some embodiments may include: receiving a manifest file describing ordered adaptation sets for content; estimating a bandwidth available for streaming content to a viewing client; selecting an initial adaptation set based on the estimated bandwidth available; responsive to estimating a change in the bandwidth available, selecting an updated adaptation set from the ordered adaptation sets described in the manifest file; requesting content streams for the updated adaptation set; receiving the content streams for the updated adaptation set; and displaying the content streams for the updated adaptation set.

Some embodiments of another example method may further include: measuring quality of experience (QoE) metrics; updating the adaptation set based on the QoE metrics; and selecting a representation content type corresponding to the updated adaptation set based on the estimated bandwidth and QoE metrics.

Another example apparatus in accordance with some embodiments may include: a processor, and a non-transitory computer-readable medium storing instructions that are operative, when executed by the processor, to perform the method of: requesting spatial content from a server; receiving a manifest file describing a plurality of content element representations of portions of the spatial content with associated initial download and streaming specifications for a corresponding plurality of content elements; determining estimated bandwidth available for streaming and estimated download latency; responsive to the estimated download latency, selecting a content element representation from the plurality of content element representations; requesting initial download data of the selected content element representation; receiving the initial download data; requesting a stream segment of the selected content element representation; and displaying the received initial download data and the stream segment comprising a full spatial data scene view.

A further example method in accordance with some embodiments may include: requesting spatial content from a server; receiving a manifest file describing a plurality of content element representations of portions of the spatial content with associated initial download and streaming specifications for a corresponding plurality of content elements; determining estimated bandwidth available for streaming and download latency; responsive to estimated download latency, selecting a selected content element representation from the plurality of content element representations; requesting initial download data of the selected content element representation; receiving the initial download data; requesting a stream segment of the selected content element representation; and displaying the received initial download data and the stream segment including a full spatial data scene view.

A further example apparatus in accordance with some embodiments may include: a processor; and a non-transitory computer-readable medium storing instructions that are operative, when executed by the processor, to perform the method of: requesting spatial content from a server; receiving a manifest file describing a plurality of content element representations of portions of the spatial content with associated initial download and streaming specifications for a corresponding plurality of content elements; determining estimated bandwidth available for streaming and estimated download latency; responsive to the estimated download latency, selecting a content element representation from the plurality of content element representations; requesting initial download data of the selected content element representation; receiving the initial download data; requesting a stream segment of the selected content element representation; and displaying the received initial download data and the stream segment comprising a full spatial data scene view.

An example method in accordance with some embodiments may include: receiving a manifest file describing a plurality of content element representations of portions of a spatial scene with associated initial download and streaming specifications for a corresponding plurality of content elements; determining estimated bandwidth available for streaming and download latency; responsive to estimated download latency, selecting a selected content element representation from the plurality of content element representations; retrieving initial download data of the selected content element representation; retrieving a stream segment of the selected content element representation; and displaying the received initial download data and the stream segment.

Some embodiments of an example method may further include requesting spatial content from a server.

For some embodiments of an example method, the received initial download data and the stream segment may include a full spatial data scene view.

Some embodiments of an example method may further include: receiving timeline information regarding one or more of the plurality of content elements, wherein selecting the content element representation may be based on representation size, the estimated bandwidth, and playback duration until the content element is displayed.

For some embodiments of an example method, selecting the content element representation may be based on representation size, the estimated bandwidth, and playback duration until the content element is displayed.

For some embodiments of an example method, selecting the content element representation may include: determining a respective minimum bandwidth for each of the plurality of content element representations; and selecting the content element representation from the plurality of content element representations associated with a highest level of detail available such that the estimated bandwidth exceeds the respective minimum bandwidth.

For some embodiments of an example method, the manifest file may include timeline information regarding one or more of the plurality of content elements, and selecting the content element representation may be based on the timeline information.

For some embodiments of an example method, selecting the content element representation may include: determining a respective start-up delay for one or more of the plurality of content elements; determining a minimum start-up delay of the determined respective start-up delays; and selecting the content element representation corresponding to the minimum start-up delay, wherein the timeline information may include information regarding the respective start-up delay for one or more of the plurality of content elements.

Some embodiments of an example method may further include: determining a quality of experience (QoE) metric for the selected content element representation is less than a threshold; and selecting a second content element representation from the plurality of content element representations.

For some embodiments of an example method, selecting the second content element representation may include determining the QoE metric corresponding to the second content element representation exceeds a minimum threshold.

For some embodiments of an example method, the QoE metric may be a metric selected from the group consisting of network performance, processing performance, client computing performance, and session conditions.

Some embodiments of an example method may further include: retrieving a stream segment of the second content element representation; and displaying the stream segment of the second content element representation.

An example apparatus in accordance with some embodiments may include: a processor; and a non-transitory computer-readable medium storing instructions that are operative, when executed by the processor, to perform any of the example methods.

An additional example method in accordance with some embodiments may include: receiving a manifest file describing: (1) a plurality of content element representations of portions of a spatial scene with associated initial download and streaming specifications for a corresponding plurality of content elements, and (2) timeline information regarding one or more of the plurality of content elements; determining an estimated bandwidth available for streaming content; selecting a content element representation from the plurality of content element representations based on at least one of the estimated bandwidth, initial download and streaming specifications, and the timeline information; retrieving initial download data of the selected content element representation; and retrieving a stream segment of the selected content element representation.

Some embodiments of an additional example method may further include displaying the received initial download data and the stream segment.

For some embodiments of an additional example method, selecting the content element representation may include: determining a respective latency time associated with the initial download specification for one or more of the plurality of content element representations; and selecting one of the plurality of content element representations, wherein the latency time of the selected content element representation may be less than a threshold.

Some embodiments of an additional example method may further include determining a respective latency time for each of the plurality of content element representations, wherein selecting the content element representation uses the determined respective latency times.

Some embodiments of an additional example method may further include determining a quality of experience (QoE) metric for the selected content element representation; and selecting a second content element representation from the plurality of content element representations based on the determined QoE metric.

For some embodiments of an additional example method, selecting the second content element representation may include determining the QoE metric corresponding to the second content element representation exceeds a minimum threshold.

For some embodiments of an additional example method, the QoE metric may be a metric selected from the group consisting of network performance, processing performance, client computing performance, and session conditions.

An additional example apparatus in accordance with some embodiments may include: a processor; and a non-transitory computer-readable medium storing instructions that are operative, when executed by the processor, to perform any of the additional example methods.

Another example apparatus in accordance with some embodiments may include: determining a respective estimated download latency of a plurality of content element representations; selecting a content element representation from the plurality of content element representations based on the respective estimated download latency; and retrieving a stream segment of the selected content element representation.

A further example method performed by a viewing client, of dynamically adapting content streaming to viewing conditions with limits of client and available connection capabilities in accordance with some embodiments may include: selecting a stream of content from a set of available streams offered by a content server based at least in part on streaming manifest metadata information about the content provided by the content server, wherein the manifest metadata information forms part of a media presentation description (MPD) file and takes into account specific capabilities of the content server, the available connection, and the viewing client; and leveraging at least the manifest metadata information to dynamically provide the stream of content to a display in accordance with download, streaming, and QoE metric constraints, wherein selecting the stream of content is further based at least in part on at least one of contextual information relevant to the viewing client regarding viewing conditions relating to the content; available bandwidth with respect to available connection capabilities of the viewing client; or available processing resources of the viewing client.

BRIEF DESCRIPTION OF THE DRAWINGS

FIG. 22 is a flowchart illustrating an example content server run-time process according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

EXAMPLE NETWORKS FOR IMPLEMENTATION OF THE EMBODIMENTS

A wireless transmit/receive unit (WTRU) may be used, e.g., as a content server, a viewing client, a head mounted display (HMD), a virtual reality (VR) display device, a mixed reality (MR) display device, and/or an augmented reality (AR) display device in some embodiments described herein.

Figure 1A:
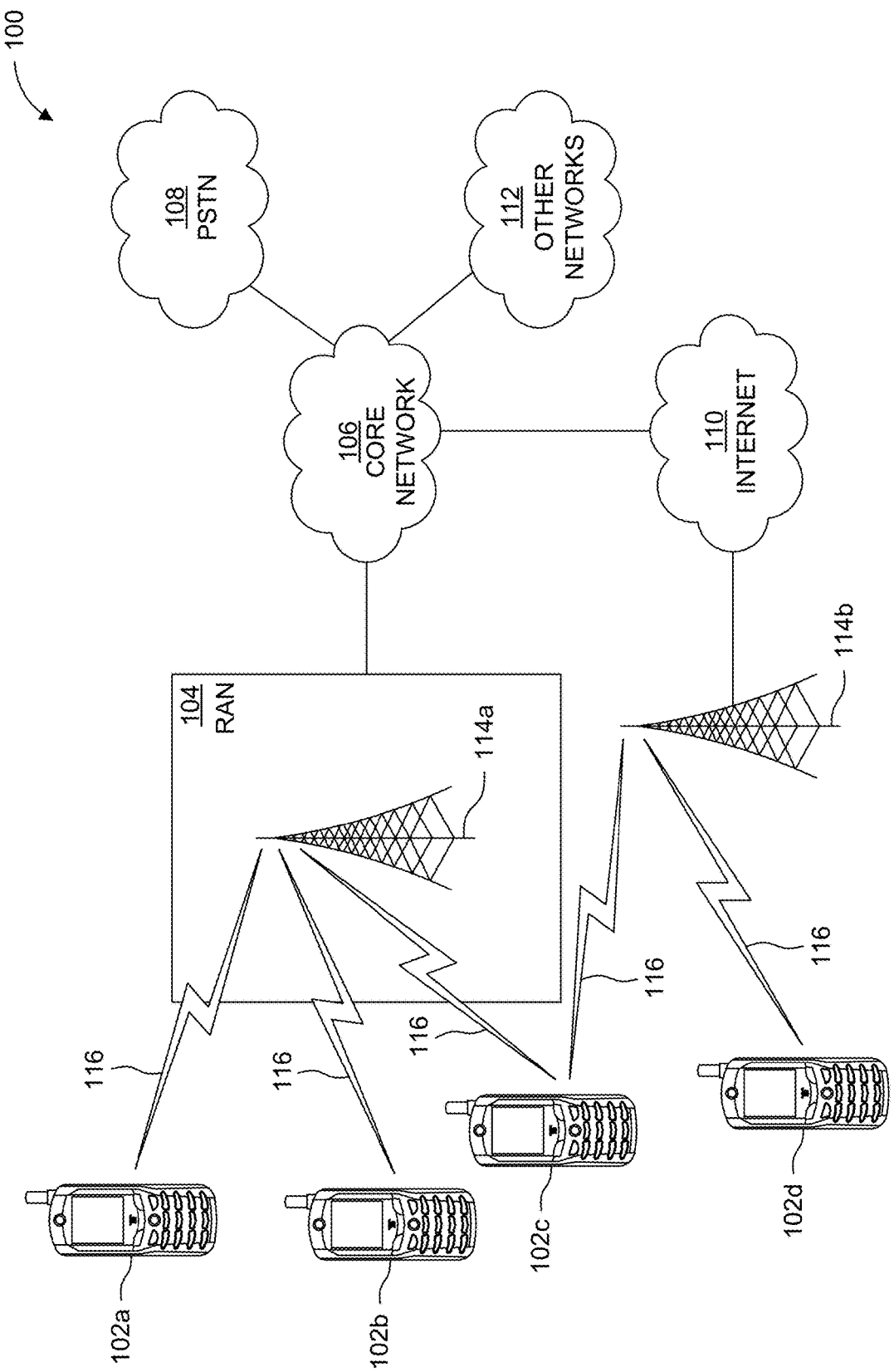
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
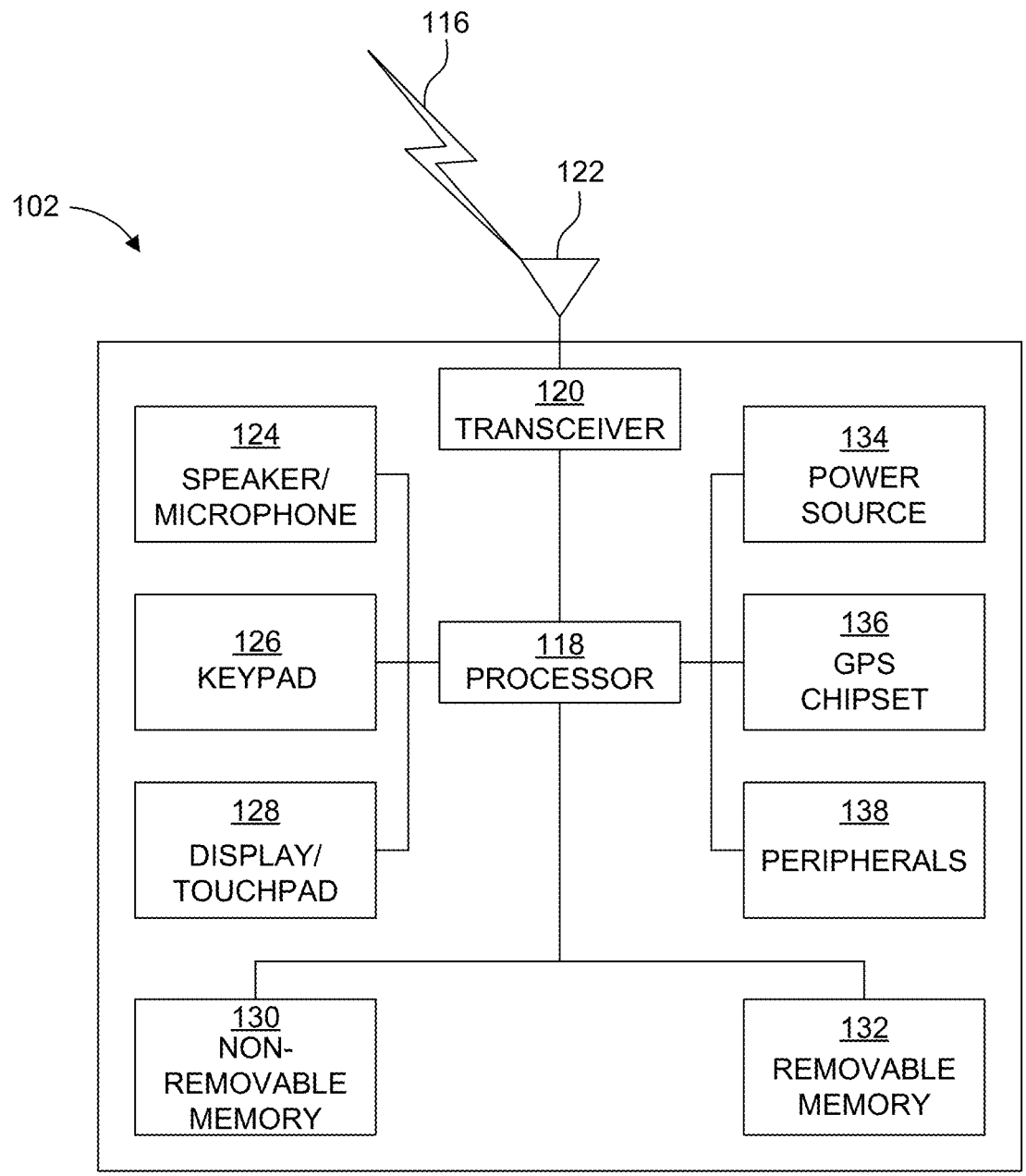
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

In view of FIGS. 1A-1B, and the corresponding description of FIGS. 1A-1B, one or more, or all, of the functions described herein with regard to one or more of: WTRU 102*a-d*, Base Station 114*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Communication of spatial data may increase demand for content streaming bandwidth and for the ability to dynamically adapt to the changing of resources available. For 2D video content, some systems adjusted just the resolution and compression rate across the whole image area depending on the available bandwidth. Some embodiments disclosed herein may balance between bandwidth consumption and quality of experience (QoE) metrics. For example, if using spatial data, reducing the content navigation area instead of reducing the resolution may result in a better QoE depending on viewing conditions.

The complexity of requirements are increasing. MPEG-DASH addresses dynamic variation in the streaming media distribution bandwidth by focusing on video content. With spatial media, a dynamic adaptive streaming process may use a multitude of spatial content formats and additional contextual conditions. These conditions may include variation from session to session and variations within a session, such as type and number of display devices, number of users, and environment layout. Systems and methods disclosed herein in accordance with some embodiments may account for these conditions by balancing bandwidth and quality of experience (QoE) parameters.

With spatial data, content may be distributed using a larger selection of content formats. Different content formats may have different characteristics and variations in content quality, memory consumption, and freedom of navigation permitted.

Some adaptive spatial content streaming devices focus on a single spatial content type, namely 3D data in polygon mesh format. See the following three articles: Lavoué, Guillaume, et al., Streaming Compressed 3D Data on the Web Using JavaScript and WebGL, Proceedings of the 18th International Conference on 3D Web Technology 19-27, ACM (2013), Evans, Alun, et al., A Pipeline for the Creation of Progressively Rendered Web 3D Scenes, Multimedia Tools and Applications 1-29 (2017), and Zampoglou, Markos, et al., Adaptive Streaming of Complex Web 3D Scenes Based on the MPEG-DASH Standard, 77.1 Multimedia Tools and Applications 125-148 (2018). These articles expand content adjustment schema at the client side from just adjusting to bandwidth limitations to also adjusting to computing performance at the client side. Zampoglou investigates applicability of the MPEG-DASH standard to transmit 3D data with multiple levels of detail (LoD) together with associated metadata. Lavoué and Evans both propose a progressive algorithm for 3D graphics data suitable for adaptive LoD streaming.

Expanding adaptive spatial data streaming by considering multiple spatial data formats is understood to not yet be much explored. Spatial data, such as light fields, may enable free content navigation while providing higher visual quality than 3D polygon mesh data. Light fields may be formatted as an array of images that may be used together to enable viewpoint adjustment within a limited viewing volume. For adaptive streaming, if only limited content distribution bandwidth is available, a better QoE may be achieved for the end user by limiting both the resolution and the motion parallax (the number of distinct views).

For some embodiments, dynamically adaptive streaming of spatial data may balance quality of experience (QoE) and available resources. As the number of available data formats increases, a larger selection of parameters, such as, e.g., light field resolution, area for which motion parallax is supported, and spatial data format, may be used. Information about available spatial data formats and suggested use may be communicated from a content server to a viewing client. The viewing client may adapt such spatial content to meet session conditions. Dynamic streaming of spatial data may use a content server streaming spatial content with various formats and quality settings, allowing a viewing client to dynamically adapt the content streaming to the viewing conditions within limits of the available bandwidth, client performance, and per session conditions for some embodiments. In addition to several quality and format streams, the server provides metadata about the available streams to the viewing client. A viewing client may select streams to be used based on information about, e.g., the content received as metadata from the server, the contextual information the viewing client has about the viewing conditions, available bandwidth, and processing resources for some embodiments.

Systems and methods disclosed herein in accordance with some embodiments may use a content server that communicates to a viewing client the available content streams for levels of freedom for content navigation. A viewing client may use such levels of freedom of navigation in addition to levels of detail (LoD) as an adjustment parameter. Based on the freedom of content navigation schemas, the client may adjust the content complexity and the amount of data communicated. For some embodiments, freedom of content navigation uses levels of degrees of freedom (DoF) to classify content streams and assets. In some embodiments, levels used in the DoF schemas indicating various levels of freedom of content navigation are, e.g., 0 DoF, 3 DoF, 3 DoF+, and 6 DoF. For example, degrees of freedom representations may comprise 0 DoF, 3 DoF, 3 DoF+, and 6 DoF representations of content.

Based on the content, the content server compiles DoF schema and LoD versions according to the different spatial content formats and quality versions in a manifest file, such as, e.g., a media presentation description (MPD) file or a set of one or more files (such as an XML document) that include metadata that may be used for configuring a device. In some embodiments, at the beginning of a streaming session, the viewing client loads the MPD. Based on the MPD, current conditions, and current capabilities, the viewing client may select a version of the data to be downloaded. Content segment format and resolution may be adapted to meet data transmission parameter and quality metric thresholds for available resources. For some embodiments, representation of content may be selected based in part on client capabilities and/or range of motion of a client. In some embodiments, capabilities of a client device may include, e.g., one or more capabilities such as, display characteristics, such as, e.g., resolution, display size, pixel size, number of dimensions supported, degrees of freedom supported (e.g., 0 DoF, 3 DoF, 3 DoF+, and 6 DoF), levels of detail supported, bandwidth supported, processing power, processing performance, start-up delay, latency delay, image quality, and spatial content types supported. A start-up delay may include a latency delay waiting for a full geometry to be available at the client device prior to starting 3D rendering of an object, such as a 3D polygon mesh. It will be understood that "capabilities of a client device" will in general refer to, e.g., one or more (e.g., relevant) capabilities of a client device with respect to, e.g., context, such as content representation, not, e.g., in general to every literal "capability" of a client device, regardless of or divorced from context or relevance.

For some embodiments, the content server may execute a process that includes: receiving spatial data; generating (which may include producing and organizing) LoD versions of the spatial data; generating (which may include producing and organizing) DoF versions of the spatial data; generating (which may include producing) an MPD for a scene; waiting for content requests from viewing clients; sending the MPD to the client; and transferring data elements to the client based on client content requests (which may be HTTP requests for some embodiments).

For some embodiments, the viewing client may execute a process that includes: requesting specific content for a scene from the content server; collecting information on session specific viewing conditions; receiving the MPD for the scene from the content server; selecting an initial viewpoint of the scene; requesting an initial set of segments of the scene data using application specific initial requirements (which may include initial levels for the LoD and DoF); displaying the current set of content segments; processing scene logic and user feedback input, updating the viewpoint of the scene accordingly; determining (which may include observing and/or measuring) QoE metrics (network and processing performance and session conditions); requesting an updated set of content segments matching LoD and DoF levels adapted to the QoE metrics; and repeating the process by returning to displaying the updated content until a session termination is indicated or signaled. The initial segment request may use the lowest requirements (e.g., 0 DoF with the lowest bandwidth requirement closest to the selected viewpoint) or higher requirements if the viewing client determines that a higher capacity is available.

Systems and methods disclosed herein in accordance with some embodiments may enable progressive and adaptive distribution of spatial data to client devices with large variation in the capabilities and display characteristics of these client devices. Such systems and methods in accordance with some embodiments may also take into account, e.g., transmission bandwidth and client device processing performance. Web-based distribution of spatial scenes with multiple spatial content types and minimal latency and start-up delays may be enabled for systems and methods disclosed herein in accordance with some embodiments.

Figure 2:
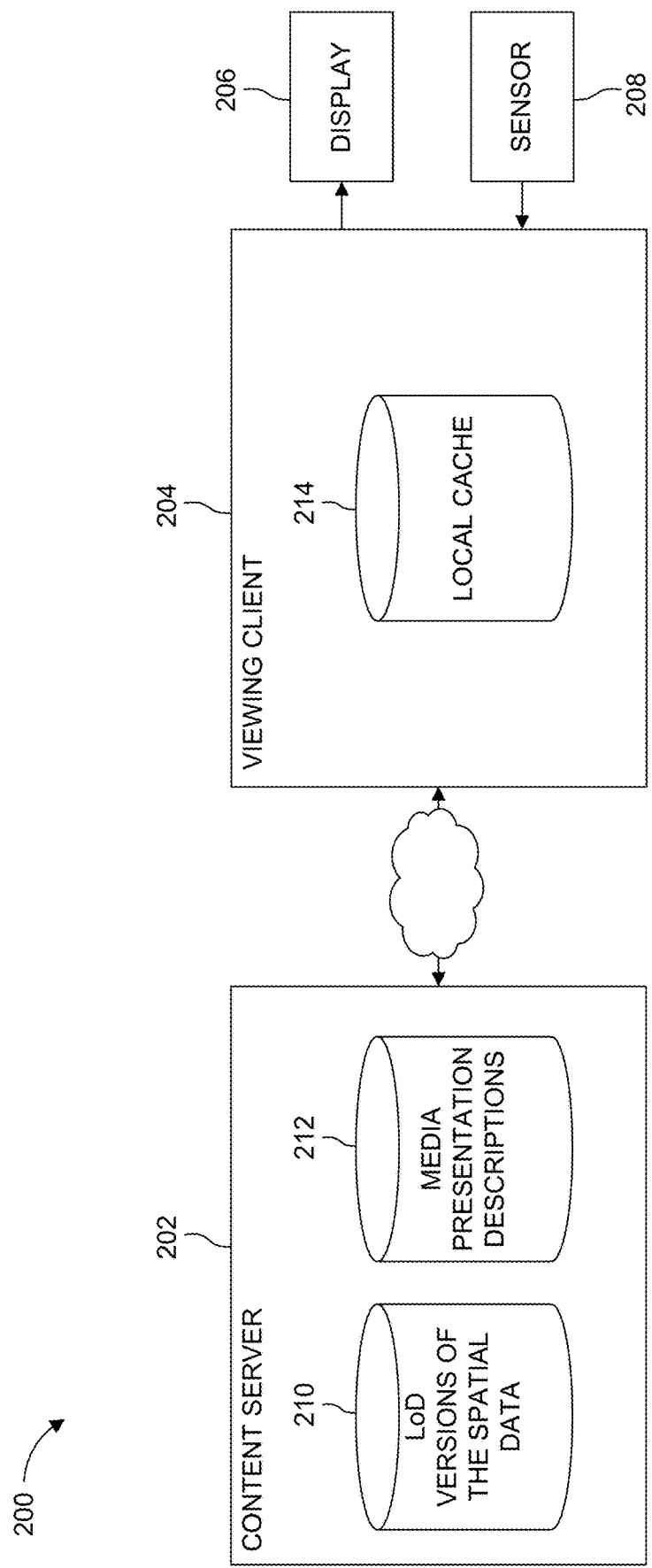
FIG. 2 is a system diagram illustrating an example set of interfaces for a viewing client according to some embodiments.

FIG. 2 is a system diagram illustrating an example set of interfaces for a viewing client according to some embodiments. For some embodiments, a viewing client 204 may interface with a display 206 and one or more sensors 208. A viewing client 204 may include local cache memory 214. One or more displays 206 and one or more sensors 208 may be located locally for some embodiments. For other embodiments, one or more displays 206 and one or more sensors 208 may be located externally. A viewing client 204 may interface via a network, e.g., a cloud network, to a content server 202. Media presentation description (MPD) files 212 and levels of detail (LoD) versions of spatial data 210 may be stored on the content server 202. For some embodiments, one or more degrees of freedom (DoF) representations of spatial data may be stored on the content server 202. For some embodiments, a system 200 may include a viewing client 204 interfacing with a display 206, a sensor 208, and a content server 202.

In some embodiments, the content server streams spatial content with multiple formats and quality settings and enables a viewing client to dynamically adapt to the available bandwidth, client performance, and per session conditions. In addition to several quality and format streams, the content server provides metadata about the available streams to the viewing client as a manifest file such as a Media Presentation Description (MPD) file for some embodiments. To enable dynamic adjustment, the content server creates schemas for the content elements that use freedom of content navigation to further adjust to available bandwidth, client performance, and per session conditions in some embodiments. Based on the freedom of content navigation schemas, the client may adjust the content complexity and amount of data transferred.

Figure 3:
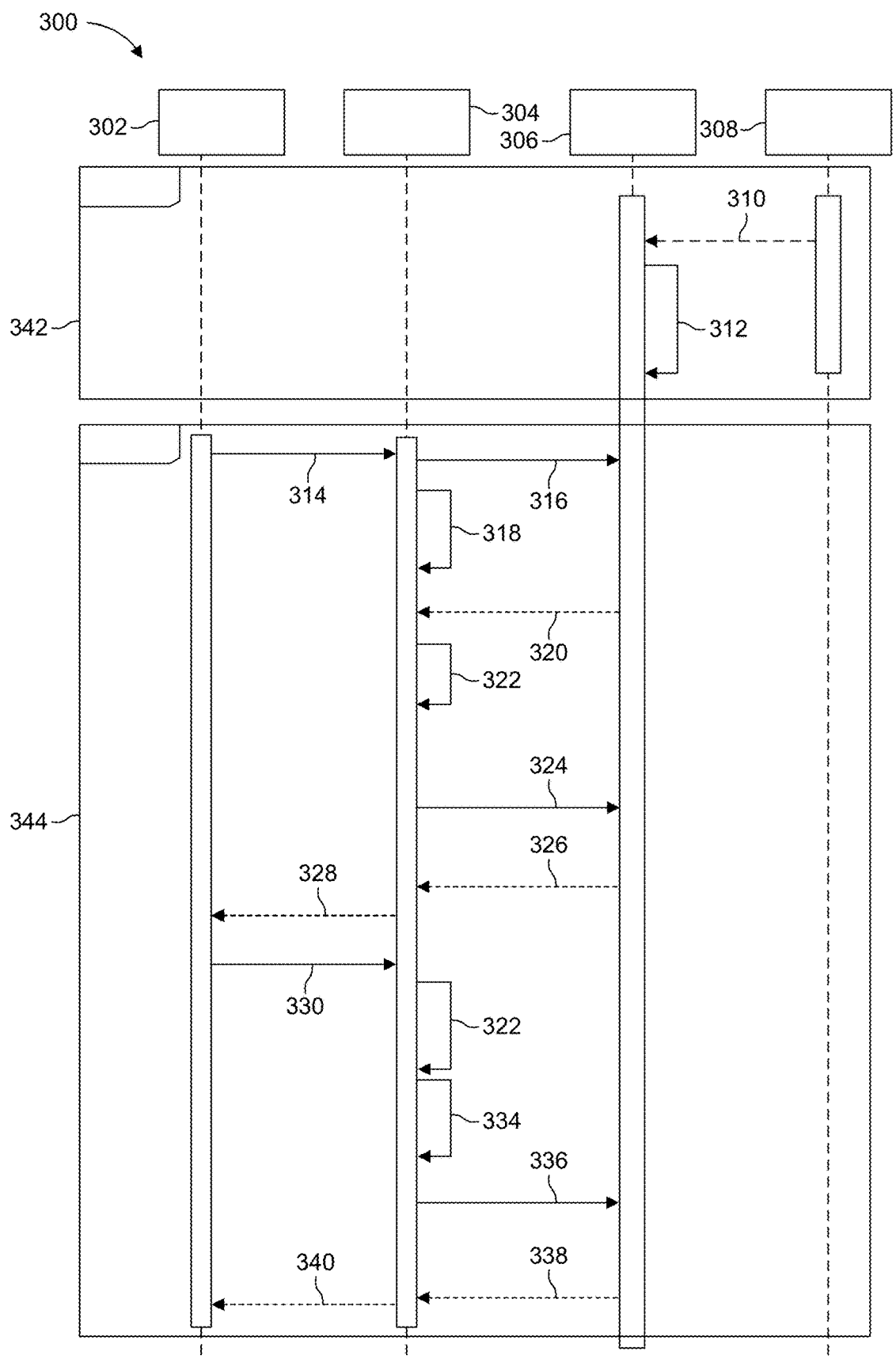
FIG. 3 is a message sequencing diagram illustrating example processes for pre-processing content and for streaming content to a viewing client according to some embodiments.

FIG. 3 is a message sequencing diagram illustrating example processes for pre-processing content and for streaming content to a viewing client according to some embodiments. For some embodiments, a process 300 may include a content pre-processing process 342 and a content streaming process 344. The content pre-processing process 342 may include, for some embodiments, a content provider 308 sending 310 spatial data to a content server 306. The content server 306 may compile (or generate) 312 multiple levels of detail (LoD) and degrees of freedom (DoF) versions of the content as content segments. In some embodiments, the content server 306 may produce an MPD that includes one or more of the LoD and DoF versions of the content.

For some embodiments, the content streaming process 344 may include a viewing (or viewer) client 304 receiving 314 a content request from a client or user 302. The viewing client 304 may send 316 a content request to a content server 306. The viewing client 304 may collect 318 sensor and configuration data for some embodiments. The content server 306 may send 320 a media presentation description (MPD) file to the viewing client 304. The example contents of an example MPD in accordance with some embodiments are described in more detail in relation to FIGS. 5 and 6. In some embodiments, an initial viewpoint is selected 322 by the viewing client 304. For some embodiments, the viewing client 304 may send 324 a request to the content server 306 for the lowest LoD and DoF segment for the selected viewpoint. For some embodiments, the level of detail (LoD) may be ordered in resolution size so that the lowest LoD is the LoD with the smallest number of total pixels. For some embodiments, the degrees of freedom (DoF) may be ordered by the number of degrees of freedom such that the lowest DoF is the lowest DoF available (for example, in the order of 0 DoF, 3 DoF, 3 DoF+, and 6 DoF). The content server 306 may send 326 the requested segment to the viewing client 304. The contents may be displayed 328 by the viewing client 304 and seen by the user 302. The user 302 may respond 330 with a user input. The viewing client 304 may process 332 the user input and scene logic and update the viewpoint. For some embodiments, the user input may be motion or feedback on the displayed content. The viewing client 304 may observe 334 QoE metrics and may request 336 a LoD and DoF segment according to the QoE metrics. For example, the QoE metrics may indicate that the user experience is below a threshold, and the viewing client 304 may request a segment with a higher LoD. The content server 306 responds 338 with the requested segment, and the viewing client 304 renders and displays 340 the LoD and DoF representations of the content for the user 302.

For some embodiments, the viewing client may determine QoE metrics, such as, for example, network performance, processing performance, client computing performance, and session conditions. The process of determining the QoE metrics, selecting LoD and DoF representations based on the QoE metric, and requesting LoD and DoF content segments may be an iterative process that may be continually repeated for some embodiments. The LoD and DoF representations may be selected from a set of one or more LoD and DoF representations described in an MPD file. For some embodiments, a viewpoint of a user is determined, and the content is rendered for the determined viewpoint. With some embodiments, the DoF and LoD representations are selected based on the viewpoint of the user. A viewpoint may be associated with particular DoF and LoD schema. For example, a viewpoint may be associated with 3 DoF and 0 DoF schema. The DoF scheme may be updated to select one of the available DoF schema associated with the viewpoint. The LoD scheme may be updated to select one of the available LoD for the selected DoF. For example, 3 DoF may be selected as an update to the DoF scheme, and a medium level LoD with a resolution of 1920×1080 may be selected. Some embodiments may limit the viewpoint of the user to a viewing area that may be indicated in the MPD file. In some embodiments, the viewpoint of the user may be limited to a combination of the viewing area and a navigation area that may be indicated in the MPD file. For some embodiments, selecting a level of detail representation from one or more level of detail representations for the selected degrees of freedom representation based on a viewpoint of a user, such that the selected degrees of freedom representation may include the one or more level of detail representations. For some embodiments, a process may include limiting the viewpoint of the user to a viewing area for the user, wherein the manifest file may include the viewing area for the user.

Figure 4:
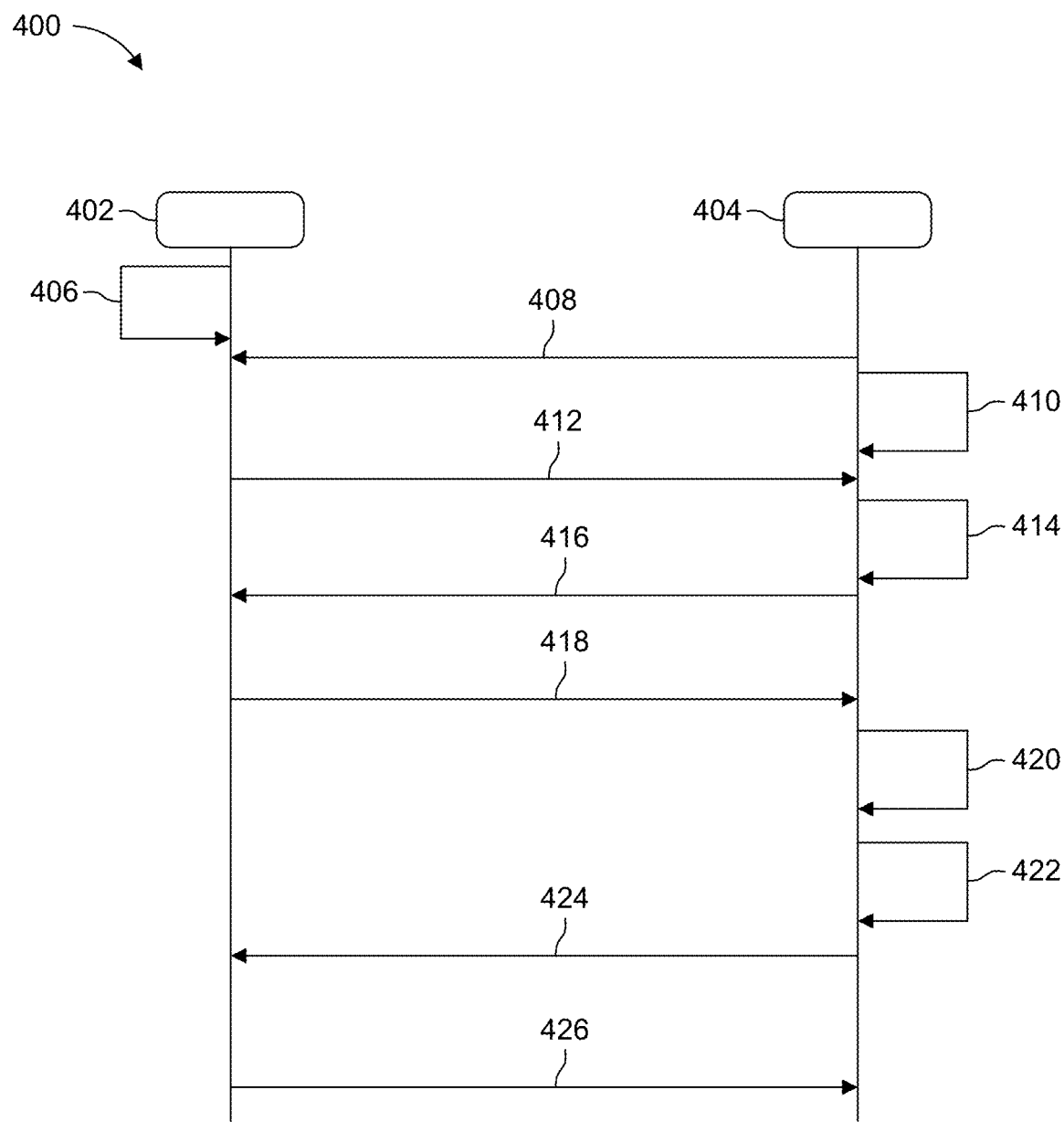
FIG. 4 is a message sequencing diagram illustrating an example process for a viewing client requesting content based on QoE metrics according to some embodiments.

FIG. 4 is a message sequencing diagram illustrating an example process for a viewing client requesting content based on QoE metrics according to some embodiments. The server 402 (which may be a content server) may determine (e.g., compile or generate) LoD and DoF versions of the content. The server 402 may generate 406 the MPD file, which may indicate the LoD and DoF versions compiled. In a client pull model, the viewing client 404 requests 408 content from the server. The viewing client 404 may collect 410 sensor and configuration data about viewing conditions. The viewing client 404 may collect system information by using available sensors and by monitoring network communication and processing performance parameters. The server 402 sends 412 the MPD file to the viewing client 404. The viewing client 404 selects 414 an initial viewpoint and representation (e.g., DoF and LoD). The viewing client 404 requests 416 initial LoD and DoF segments, and the content server 402 responds 418 with spatial data for the requested segments. The viewing client 404 renders 420 and displays the requested segments. The viewing client 404 may observe 422 QoE metrics and may select LoD and DoF levels for additional segments based on the MPD file provided by the content server. The QoE metrics may be determined based on the dynamically changing viewing conditions. For some embodiments, the LoD and DoF levels for additional segments may be selected to adaptively balance the QoE metrics and available resources. The selected LoD and DoF segments may be requested 424 by the viewing client 404, and the content server 402 may respond 426 with the requested segments. The viewing client 404 may select among the DoF and LoD options based on user motion and bandwidth constraints for some embodiments.

Figure 5:
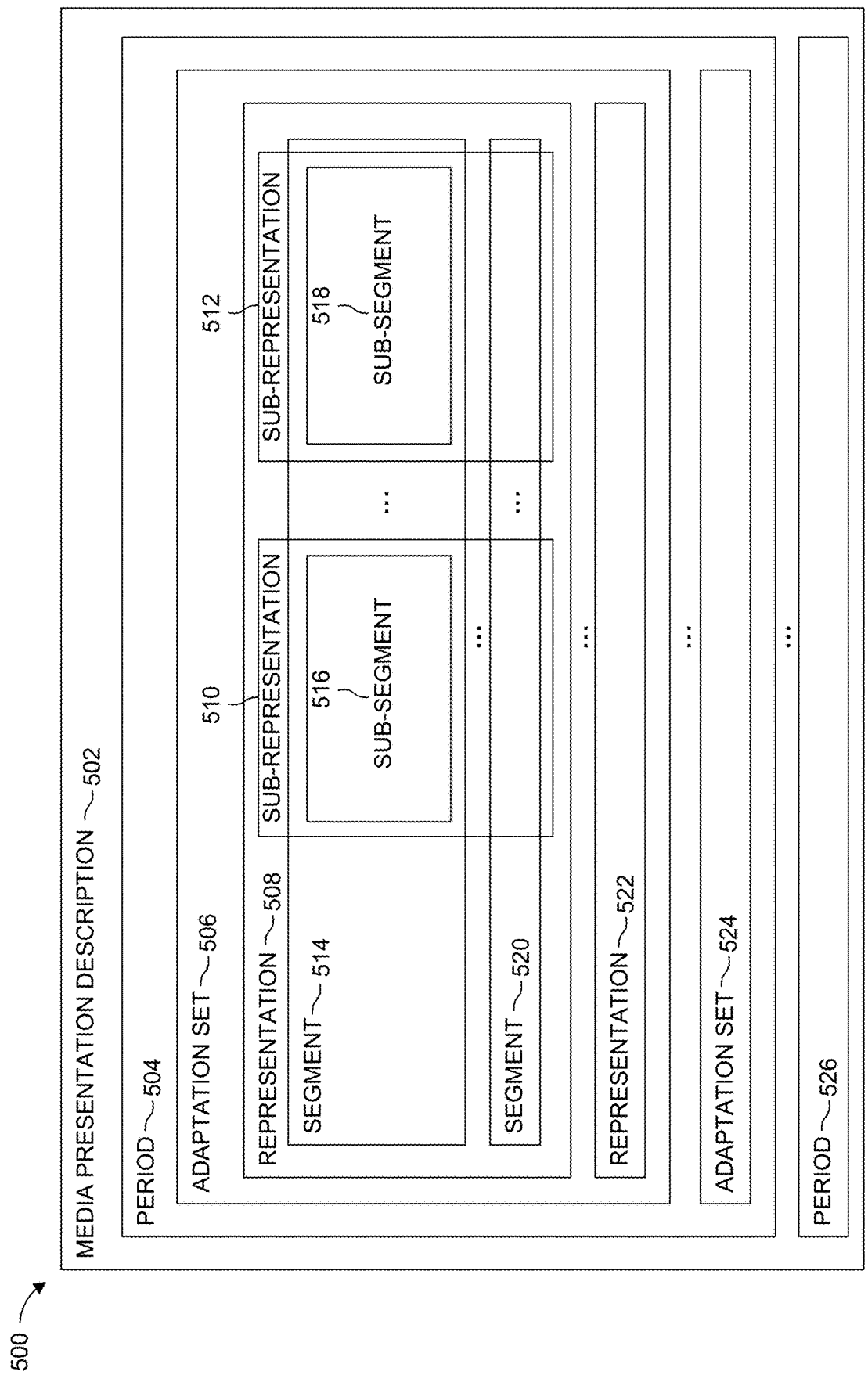
FIG. 5 is a data structure diagram illustrating an example MPEG-DASH Media Presentation Description (MPD) according to some embodiments.

FIG. 5 is a data structure diagram illustrating an example MPEG-DASH Media Presentation Description (MPD) according to some embodiments. FIG. 5 shows a structure 500 of an MPEG-DASH media presentation description (MPD) file 502. This file format may be used for the MPD transmitted by the content server to the viewing client. For some embodiments, the MPD file 502 may be sent to start initialization of a streaming session. The MPD file 502 may include one or more periods 504, 526. The period 504, 526 may include a start time and duration for content. The period 504, 526 may include one or more adaptation sets 506, 524. The adaptation set 506, 524 contains a media stream. The adaptation set 506, 524 may include one or more representations 508, 522. Representations 508, 522 may include one or more encodings of content, such as 720p and 1080p encodings. Representations 508, 522 may include one or more segments 514, 520. The segment 514, 520 is media content data that may be used by a media player (or viewing client) to display the content. The segment 514, 520 may include one or more sub-segments 516, 518 that represent sub-representations 510, 512 with a representation field 508, 522. Sub-representations 510, 512 contain information that apply to a particular media stream.

Figure 6:
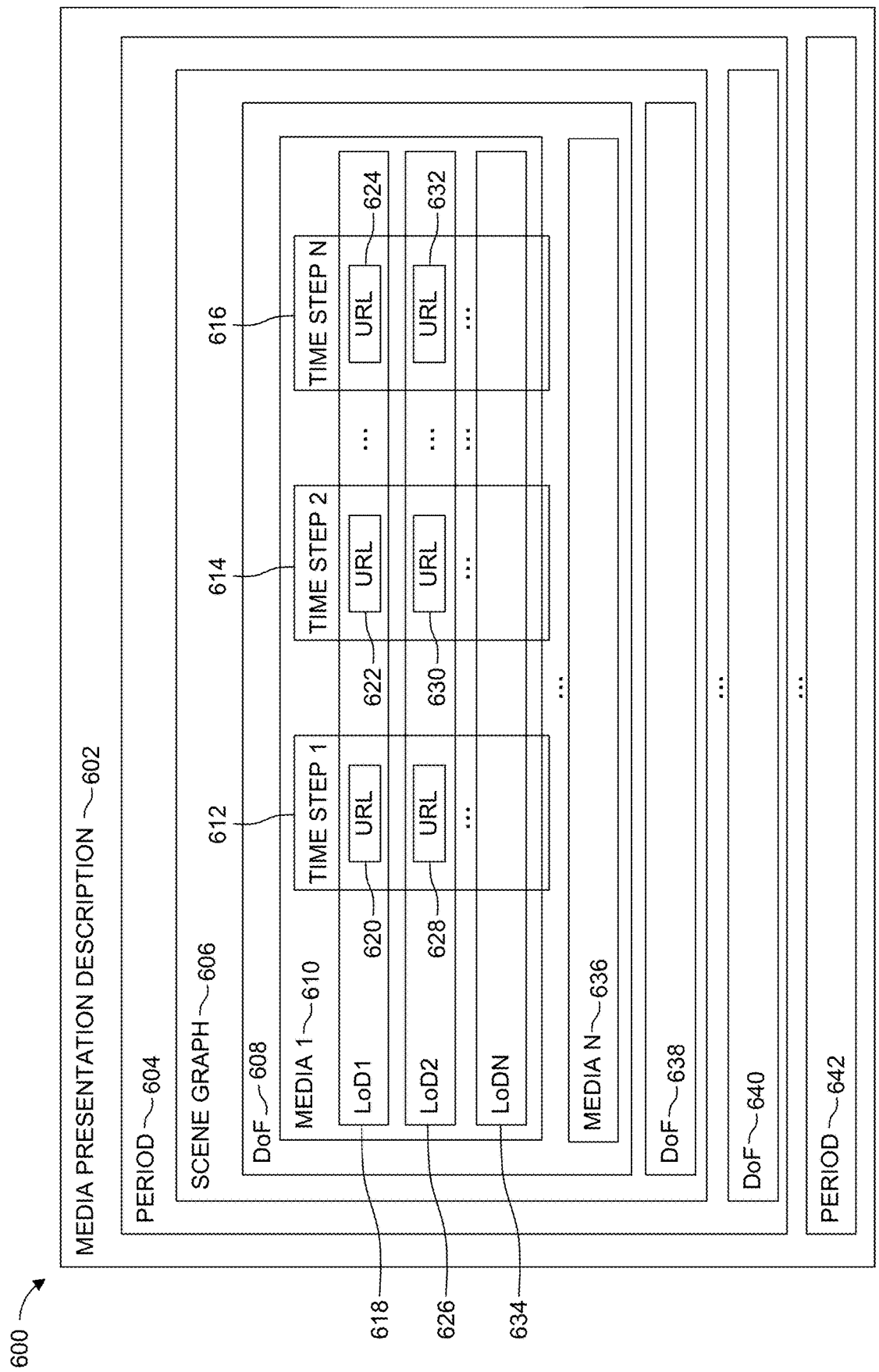
FIG. 6 is a data structure diagram illustrating an example Media Presentation Description (MPD) with example Degrees of Freedom (DoF) and Levels of Detail (LoD) schemes according to some embodiments.

FIG. 6 is a data structure diagram illustrating an example Media Presentation Description (MPD) with example Degrees of Freedom (DoF) and Levels of Detail (LoD) schemes according to some embodiments. The format 600 of the MPD file 602 shown in FIG. 6 may be used for adaptive spatial data streaming within the MPEG-DASH protocol structure for MPD files 602. For some embodiments, the top hierarchical entity is a period 604, 642 with each period including the information of a single consistent virtual scene composed of spatial data. A single scene, for example, may be a single virtual environment in which an interactive and/or pre-defined virtual experience takes place. The virtual experience may include several scenes, and each scene may include one or more period blocks, similar to a movie that has several scenes. Each period 604, 642 may include a scene graph 606 and one or more DoF blocks 608, 638, 640, each containing a description of an available viewport-associated DoF scheme available for the scene. DoF scheme elements 608, 638, 640 (as well as LoD data structures 618, 626, 634 for a DoF schema) and the scene graph 606 are described in more detail in relation to FIGS. 7 and 8, respectively.

Relating FIGS. 5 and 6 together, DoF divisions 608, 638, 640 may correspond to MPEG-DASH adaptation sets, and LoD divisions 618, 626, 634 under a given DoF may correspond to MPEG-DASH representations and segments. For some embodiments, media blocks 610, 636 may correspond to MPEG-DASH representations, and time steps 612, 614, 616 may correspond to sub-representations. For some embodiments, each LoD block 618, 626, 634 may include a URL 620, 622, 624, 628, 630, 632 for a corresponding time step 612, 614, 616. For some embodiments, a period 604, 642 may include DoF blocks (or DoF representations) 608, 638, 640 for 3 DoF, 3 DoF+, and 6 DoF representations.

In some embodiments, a viewing client adaptively manages tradeoffs between degrees of freedom (DoF) and levels of detail (LoD) based on device capabilities and available bandwidth. Other tradeoffs that may be managed include angular density and angular range, in addition to spatial and temporal resolutions. In some embodiments, spatial data may be formatted, for example, as a light field, a point cloud, or a mesh. A light field may be a function that maps light rays to points in space. A point cloud may be a set of points that indicate surfaces of a 3D object. A mesh may be a set of surfaces, polygons, faces, edges, and vertices that describe a 3D object. For example, at a given bandwidth, a viewing client with motion tracking may select a 6 DoF representation with coarse angular density, and a viewing client with a light field display may select a 3 DoF+ representation to display fine motion parallax.

Table 1 shows an example illustrating three DoF schemes (6 DoF, 3 DoF+, and 360) and three content types (light field, point cloud, and video). For the example shown in Table 1, the AdaptationSet id field indicates the DoF scheme, and the contentType field indicates the content type. Within an adaptation set, the content type is fixed. For example, the content type may be "light field" for each representation within an adaptation set, but the spatial and angular resolutions may differ for each representation. Table 1 does not show details of MPD syntax.

TABLE 1

DASH MPD Example

```
<AdaptationSet id="6DoF" contentType="LightField">
  <!-4Kp Representation at 100 Mbps and 10 second segments -->
  <Representation id="LoD1" bandwidth="100000000" width="3840"
  height="2160"
    anglespread="10x10">
  ...
  <!-1080p Representation at 20 Mbps and 10 second segments -->
  <Representation id="LoD2" bandwidth="20000000" width="1920"
  height="1080"
    anglespread="3x3">
  ...
<AdaptationSet id="3DoF+" contentType="PointCloud">
  <!-8M point Representation at 30 Mbps and 10 second segments -->
  <Representation id="LoD1" bandwidth="30000000"
  points="8000000">
  ...
  </Representation>
  <!-1M point Representation at 6.8 Mbps and 10 second segments -->
  <Representation id="LoD2" bandwidth="6800000"
  points="1000000 ">
  ...
<AdaptationSet id="360" contentType="video">
  <!-4Kp Representation at 5 Mbps and 10 second segments -->
  <Representation id="LoD1" bandwidth="5000000" width="3840"
  height="2160">
  ...
  <!-1080p Representation at 1 Mbps and 10 second segments -->
  <Representation id="LoD2" bandwidth="1000000" width="1920"
  height="1080">
```

Figure 10:
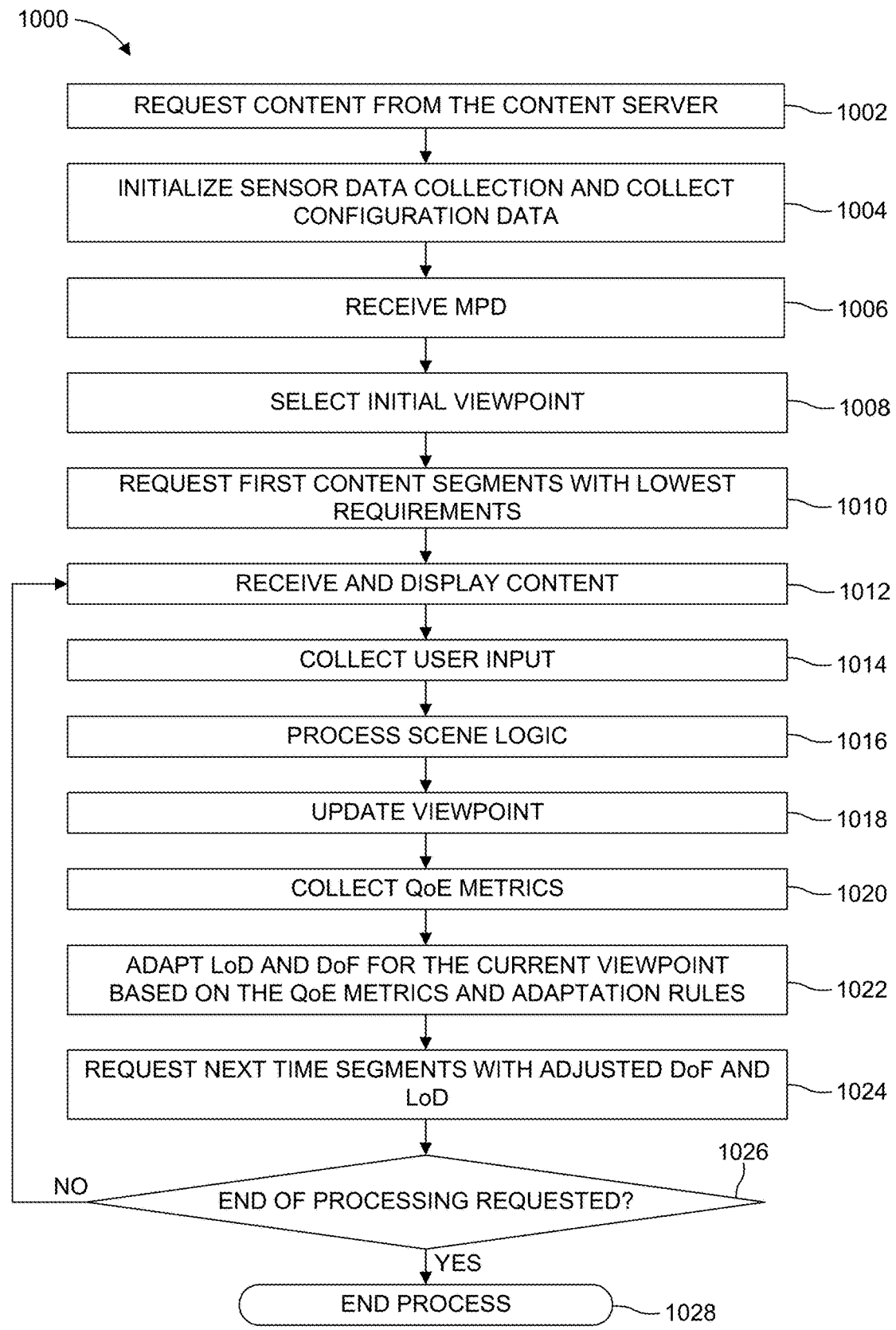
FIG. 10 is a flowchart illustrating an example process for adjusting content requests based on QoE metrics according to some embodiments.

For some embodiments, DoF schemas indicate levels of freedom of navigation that are supported for a given viewpoint. In addition, in some embodiments, the schemas may indicate requirements to support a particular DoF schema. For a given viewpoint, multiple schemas may be indicated, and the viewing client may use schemas to adapt freedom of navigation during a viewing session to the available resources. For some embodiments, the viewing client executes a process that uses quality metrics and a rules set for DoF adaptation. For some embodiments, DoF schemas do not describe rules by which the viewing client may switch between DoF schemas. The viewing client may implement the logic for DoF adaptation that depends on the viewing client use. FIG. 10 describes an exemplary processing executed by the viewing client.

Requirements for a given DoF schema may include a network bandwidth threshold used to stream the content (such as to meet a QoE threshold) as well as amount of data transmission used by the initial content download. With some formats of spatial data, for example a 3D polygon mesh, the full geometry may need to be available at the client side upon starting the 3D rendering. Upon receiving the full mesh at the client, the mesh may be reused for different temporal steps. The appearance of a full mesh (which may have been previously received) may be modified between temporal steps with additional control data in another format, such as, for example, skeleton pose data that may be used for a skeleton animation rig embedded with the original full mesh. Some embodiments divide transmission bandwidth requirements between the initial download and the streaming bandwidth.

Figure 7:
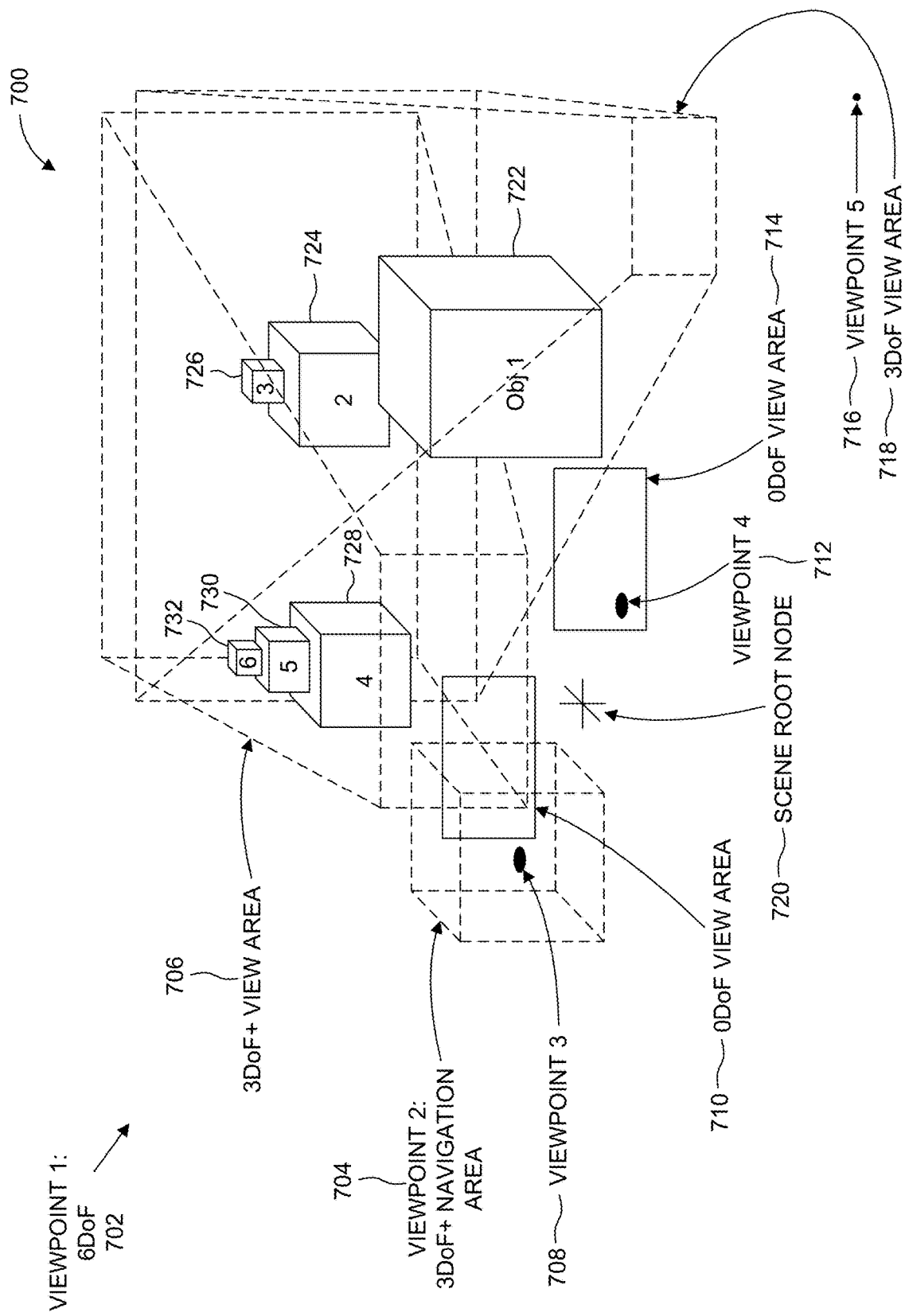
FIG. 7 is a schematic perspective view illustrating an example virtual scene environment according to some embodiments.

FIG. 7 is a schematic perspective view illustrating an example virtual scene environment according to some embodiments. FIG. 7 shows an exemplary scene 700. The example shown indicates five viewpoints 702, 704, 708, 712, 716 and associated available DoF schemas, DoF viewing areas, and DoF navigation areas. For 0 DoF, the viewpoint is shown as a point. Viewpoints 3 and 4 (708, 712) are associated with available 0 DoF schemas. The associated viewing area 710, 714 for 0 DoF is a two-dimensional shape, such as a rectangle. Examples of 0 DoF viewing areas 710, 714 are shown for viewpoints 3 and 4 (708, 712). For 3 DoF, shown in viewpoint 5 (716), there are three degrees of freedom: yaw, roll, and pitch. These three degrees of freedom indicate orientation (or viewpoint) of a user. For 3 DoF, the location of the user's viewpoint 716 is fixed, and the viewing area 718 is a three-dimensional shape, such as a frustum. For 3 DoF+, the location of the user's viewpoint may change. For 3 DoF+, the navigation area is a three-dimensional shape, such as a cube. Viewpoint 2 (704) is associated with an available 3 DoF+ schema. The viewing area 706 for 3 DoF+ is shown as a three-dimensional shape, such as a frustum. The user may move within the navigation area to adjust the viewpoint. The viewing area indicates the area for which spatial data is available for a user moving within the navigation area. For 6 DoF, there are six degrees of freedom: yaw, roll, pitch, up/down, left/right, and forward/backward. Yaw, roll, and pitch indicate orientation (or viewpoint) of the user. Up/down, left/right, and forward/backward indicate position of the user within a scene. Viewpoint 1 (702) is associated with an available 6 DoF schema. For some embodiments, spatial information and interactive behavior rules may be indicated relative to a scene root node 720, such as the one indicated in FIG. 7. For the example shown in FIG. 7, some object information may be relative to one or more objects. For example, spatial information for object 5 (730) may be relative to spatial information for object 4 (728). Likewise, spatial information for object 6 (732) may be relative to spatial information for object 5 (730) and thereby relative to spatial information for object 4 (728). Object 3 (726) may have spatial information that is relative to spatial information for object 2 (724). Spatial information for some objects, such as object 1 (722), may be independent of other objects. FIG. 8's scene graph, which is described below, also has examples of objects that are described relative to other objects.

The five viewpoints 702, 704, 708, 712, 716 and associated DoF schemas shown in FIG. 7 are described in more detail below. In the example MPD structure shown in FIG. 6, a period may include one or more DoF schemas and include some of the details shown below. The values for, e.g., download size, required network capacity, and resolution, are example values for purposes of the example viewpoints and associated schemas.

6 DoF for Viewpoint 1
   Navigation area: bounding volume of the scene
   Viewing area: bounding volume of the scene
   Data type: Real-time rendering 3D
   Requirements:
      LoD 1
         Progressive data: No Initial content download size: 218 MB (Sum of 3D assets required for rendering)
Required network capacity: 0.4 Mbps (Sum of required data which can be streamed, i.e. animation control data and other 3D data which can be streamed during the period)
LoD 2
Progressive data: No
Initial content download size: 530 MB
Required network capacity: 0.4 Mbps
LoD 3
Progressive data: Yes (Data for this higher LoD refines data from previous LoD level, i.e. both LoD level data is needed to use this LoD)
Initial content download size: 450 MB
Required network capacity: 0.4 Mbps 3 DoF+ for Viewpoint 2
Navigation area: 3D vertices defining navigation area relative to the scene
Viewing area: 3D vertices defining viewing area relative to the scene
Data type: Light field image array
Requirements:
LoD 1
Progressive data: No
Spatial geometry of the light field image array: Number of virtual cameras, locations, camera calibration data
Resolution of images: 768×576 px
Initial content download size: 0 MB
Required network capacity: 14.0 Mbps
LoD 2
Progressive data: No
Spatial geometry of the light field image array: Number of virtual cameras, locations, camera calibration data
Resolution of images: 1024×768 px
Initial content download size: 0 MB
Required network capacity: 22.0 Mbps
LoD 3
Progressive data: No
Spatial geometry of the light field image array: Number of virtual cameras, locations, camera calibration data
Resolution of images: 1920×1080 px
Initial content download size: 0 MB
Required network capacity: 43.0 Mbps 3 DoF for Viewpoint 5
Navigation area: 3D point defining fixed viewpoint relative to the scene
Viewing area: 360 view from fixed viewpoint
Data type: Monoscopic 360 field of view video
Requirements:
LoD 1
Progressive data: No
Resolution of the 360 video: 1920×1080 px
Initial content download size: 0 MB
Required network capacity: 4.0 Mbps
LoD 2
Progressive data: No
Resolution of the 360 video: 4096×2160 px
Initial content download size: 0 MB
Required network capacity: 13.0 Mbps 0 DoF for Viewpoint 3
Navigation area: 3D point defining fixed viewpoint relative to the scene
Viewing area: 3D vertices defining 2D viewport of the 2D view relative to the scene
Data type: Monoscopic 2D video
Requirements:
LoD 1
Progressive data: No
Resolution of the video: 768×576 px
Initial content download size: 0 MB
Required network capacity: 2.0 Mbps
LoD 2
Progressive data: No
Resolution of the video: 1920×1080 px
Initial content download size: 0 MB
Required network capacity: 4.0 Mbps
LoD 3
Progressive data: No
Resolution of the video: 4096×2160 px
Initial content download size: 0 MB
Required network capacity: 13.0 Mbps 0 DoF for Viewpoint 4
Navigation area: 3D point defining fixed viewpoint relative to the scene
Viewing area: 3D vertices defining 2D viewport of the 2D view relative to the scene
Data type: Monoscopic 2D video
Requirements:
LoD 1
Progressive data: No
Resolution of the video: 768×576 px
Initial content download size: 0 MB
Required network capacity: 2.0 Mbps
LoD 2
Progressive data: No
Resolution of the video: 1920×1080 px
Initial content download size: 0 MB
Required network capacity: 4.0 Mbps
LoD 3
Progressive data: No
Resolution of the video: 4096×2160 px
Initial content download size: 0 MB
Required network capacity: 13.0 Mbps For some embodiments, within each DoF schema, the streams of the scene content are described as multiple media elements. Each media element may contain spatial data in some spatial data format. Spatial data contained in the media may be described as temporal segments, or in case of static content, a single temporal step. Also, combinations of static content and temporal segments may be used, for example, a polygon mesh, animated with a skeleton animation rig. Within each media element for each temporal step, one or more LoD versions of the media may be listed under the media block. For each LoD version of the data, streaming bandwidth requirements may be indicated as well as if the data is progressive (such that higher LoD levels build on top of lower LoD levels). In some embodiments, for higher LoD used with progressive data, the lower LoD data needs to be received in addition to the higher LoD data.

Figure 8A:
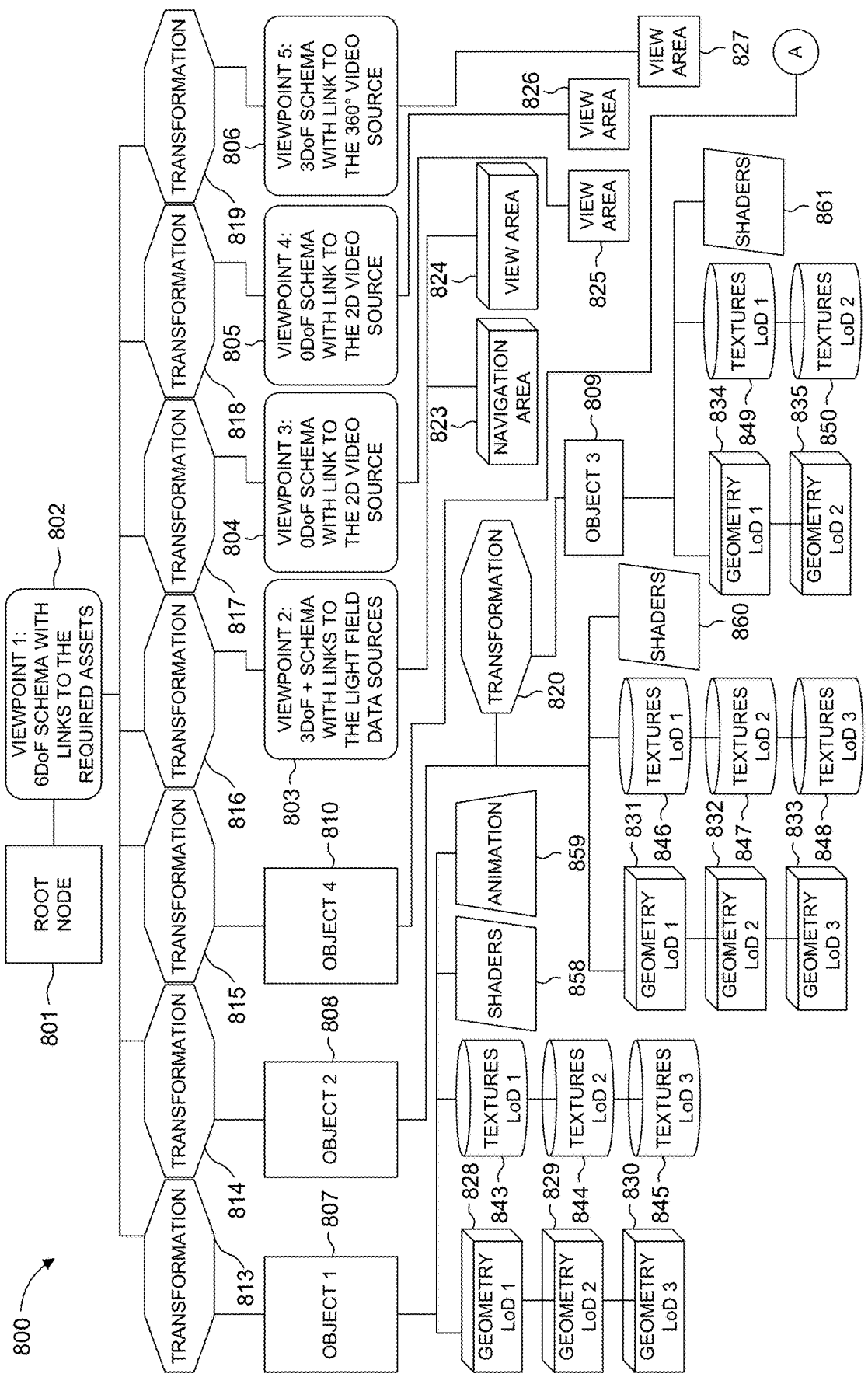
FIGS. 8A and 8B are a scene graph illustrating an example data structure for a virtual scene environment according to some embodiments.
Figure 8B:
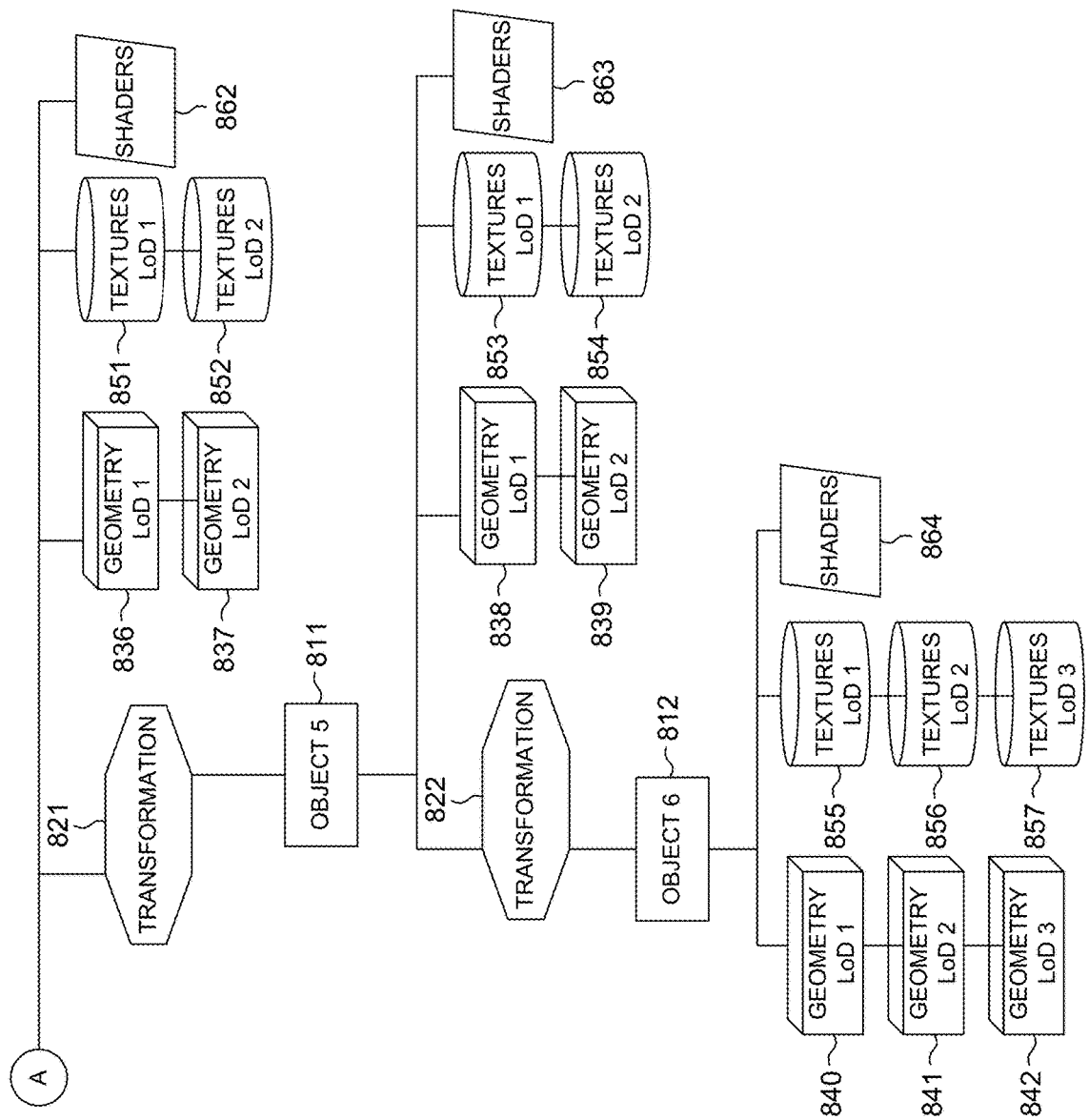

FIGS. 8A and 8B are a scene graph illustrating an example data structure for a virtual scene environment according to some embodiments. A scene graph 800 is a description of structure and behavior of a scene. For some embodiments, the description may include a hierarchical structure of spatial relationships between scene elements and logic rules indicating interactive behavior of scene elements. A scene graph 800 may contain information related to, for example, scene audio and physics relationships of objects. For adaptive streaming, a scene graph 800 may contain information about available viewpoints and associated DoF schemas. For some embodiments, each viewpoint described in the scene graph is a point or area within the scene for which viewpoints (which may be one or more viewpoints from 0 DoF to 6 DoF) are available. Viewpoints may be described as a combination of available DoF, points or areas and supported viewing directions. Viewpoint information may be individual elements under a period and linked with the associated DoF schemas included in the MPD.

FIGS. 8A and 8B show a hierarchical structure scene graph. Viewpoint 1 (802) is associated with a 6 DoF schema with links to assets, such as object spatial relationships, object behavioral rules, and other viewpoints. FIGS. 8A and 8B show transformations 813, 814, 815, 816, 817, 818, 819, 820, 821, 822 from the scene's root node 801 to objects 807, 808, 809, 810, 811, 812 and viewpoints 803, 804, 805, 806 within the scene. Viewpoint 2 (803) is associated with a 3 DoF+ schema and has links to example light field data sources. Viewpoint 3 (804) is associated with a 0 DoF schema and has links to example 2D video data sources. Viewpoint 4 (805) is associated with a 0 DoF schema and has links to example 2D video data sources. Viewpoint 5 (806) is associated with a 3 DoF schema and has links to example 360-degree video data sources. Similar to FIG. 7, the scene graph of FIGS. 8A and 8B indicates 3D navigation area 823 and viewing areas 824 for 3 DoF+ schemas and 2D viewing areas 825, 826, 827 for 0 DoF. FIGS. 8A and 8B also show 6 example objects 807, 808, 809, 810, 811, 812. Spatial data is indicated for each object 807, 808, 809, 810, 811, 812, such as geometry 828, 829, 830, 831, 832, 833, 834, 835, 836, 837, 838, 839, 840, 841, 842, textures 843, 844, 845, 846, 847, 848, 849, 850, 851, 852, 853, 854, 855, 856, 857, shading 858, 860, 861, 862, 863, 864, and animation data 859. Some object data (e.g., 809) is indicated with a transformation (e.g., 820) relative to another object (e.g., 810), such as three objects stacked on top of one another. The scene graph 800 of FIGS. 8A and 8B indicates links to the associated data sources for each viewpoint and DoF schema.

DoF may be used as a variable that may be used to control the tradeoffs between bandwidth, complexity, and QoE. The scene graph structure (an example of which is shown in FIGS. 8A and 8B) may be extended with information indicating viewpoints and associated DoF schema (or levels). Some scene graphs of synthetic 3D scenes include real-time 3D graphic data for image production rendering and information about alternative visual information sources for visualization with lower DoF schema, such as video sources for pre-rendered views.

Figure 9:
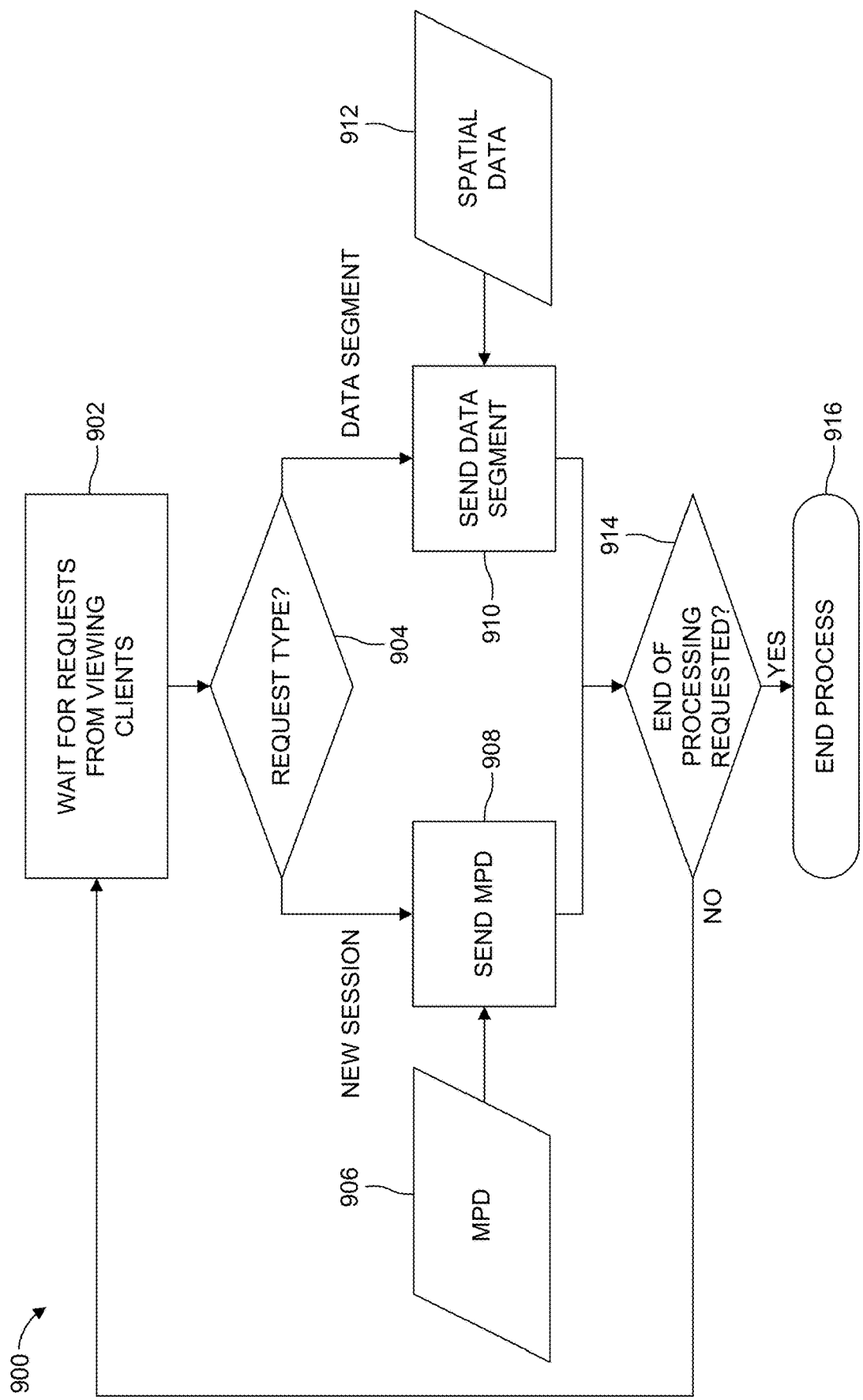
FIG. 9 is a flowchart illustrating an example process for handling viewing client requests according to some embodiments.

FIG. 9 is a flowchart illustrating an example process for handling viewing client requests according to some embodiments. For some embodiments of a process 900, a content server stores the spatial data 912 to be distributed along with the MPDs 906 for the data. At run-time, the content server may distribute data based on client request type 904 in a client pull model, as illustrated in FIG. 9. For a new data streaming session, the viewing client may request an MPD, and the content server may send 908 an MPD. Based on the MPD, the viewing client requests spatial data segments according to the MPD and QoE metrics measured by the viewing client (such as available resources and session conditions), and the content server may send 910 a data segment. The example process 900 may determine 914 if an end of processing is requested and continue by waiting 902 for a request from a viewing client, e.g., until an end of processing 916 is requested.

In some embodiments, the server may produce some of the DoF and LoD versions automatically. For example, given 0 DoF data, the content server may produce various LoD versions from the video file enabling 0 DoF viewing. Also, for some embodiments, with higher DoF versions, the content server may produce lower DoF versions automatically. For example, if spatial content is fully synthetic 6 DoF content, the server may automatically produce lower DoF versions based on user indicated viewpoints.

For embodiments of a server process, a data segment request may indicate the selected degrees of freedom representation (or schema). The selected degrees of freedom may be selected from an ordered set of available degrees of freedom, which may be indicated in the manifest file (such as an MPD). The data segment request also may indicate an LoD that is selected from a set of available LoDs indicated in the manifest file (e.g., the MPD). The DoF schema of the data segment sent to the viewing client may match the DoF schema indicated in the data segment request.

FIG. 10 is a flowchart illustrating an example process for adjusting content requests based on QoE metrics according to some embodiments. FIG. 10 illustrates an example process 1000 executed by the viewing client. For some embodiments, the process 1000 starts with a user, e.g., launching an application on the viewing client and initiating 1002 a request for content from the content server. Content may be indicated as a link to the MPD residing on the content server. The link to the MPD may be a uniform resource location (URL) identifying the content server and specific content. For some embodiments, the viewing client application is launched by an explicit command from the user or automatically by the operating system based on identifying content type request and application associated with the specific content type. For some embodiments, a viewing client may be a stand-alone application, an application integrated with a web browser, a social media client, or a part of the operating system. If a viewing client application is launched, sensor data collection may be initialized 1004 and configuration data may be collected. For some embodiments, sensor data collection may include collecting information about the viewing conditions that the viewing client may use to adapt content streaming. For example, in some embodiments, sensors may collect data in order to, e.g., identify the quantity and locations of users and display devices, in which the locations may be relative to the viewing client or relative to a scene root node location for some embodiments.

If the viewing client has initialized sensor and configuration data collection, a process, e.g., a run-time process, may be performed continually throughout the content streaming session. In the run-time process, the viewing client receives 1006 the MPD from the content server. For some embodiments, based on the MPD, collected viewing conditions information, application default settings, and user preferences, the application selects 1008 an initial viewpoint to the spatial data from the MPD and requests 1010 data segments from the content server using initial requirements for DoF schemas and LoD levels. For some embodiments, the initial request may use the lowest requirements, e.g., 0 DoF with the lowest bandwidth requirement closest to the selected viewpoint. If the viewing client application determines that higher capacity is available, a DoF schema and LoD level with higher requirements may be used.

The viewing client receives and displays 1012 the requested content. User input may be collected 1014, and scene logic may be processed 1016. The viewpoint of the user may be updated 1018, and QoE metrics may be collected 1020. The DoF and LoD may adapted for the user's current viewpoint based on the QoE metrics and adaptation rules, for some embodiments. In some embodiments, the MPEG-DASH adaptation set (of which, DoF is an example) and the MPEG-DASH representation (of which, LoD is an example) may be adapted 1022 for the user's current viewpoint based on the QoE metrics and adaptation rules. Examples of QoE metrics include encoding parameters, resolution, sample rate, content update rate, delay, and jitter. DoF and LoD may be updated based on one or more of these QoE metrics examples for some embodiments. For example, DoF and LoD may be adjusted if the amount of jitter in displayed content exceeds a threshold. The next set of segments may be requested 1024 for the adjusted DoF and LoD. The process may determine 1026 if the end of processing is requested. If an end of processing is requested, the process ends 1028. Otherwise, the process repeats with receiving and displaying of content.

For some embodiments, the viewing client's process may include determining available processing power for processing the selected degrees of freedom schema (or representation) and selecting a level of detail representation based on the available processing power. For some embodiments, the selected degrees of freedom representation comprises the selected level of detail representation. The LoD selected is available for the selected DoF. For some embodiments, the available processing power may include local rendering power and view interpolation power. For some embodiments, a DoF and a LoD may be selected such that local rendering power is capable of rendering content segments for the selected DoF and LoD. For example, a DoF scheme of 3 DoF and a LoD scheme supporting a resolution of 1920×1080 may be selected if the local rendering power is capable of displaying 1920×1080 with support for three degrees of freedom for the orientation of the viewer. For some embodiments, the viewing client's process may include tracking a range of motion of the client, and responsive to detecting a reduction in the range of motion of the client, selecting an updated DoF schema (or representation). The updated DoF schema may be selected from a ordered set of available DoF schemas. The updated DoF schema may have less degrees of freedom than the previously selected DoF schema for some embodiments. For some embodiments, the viewing client's process may include detecting a change in the range of motion of the client and responsive to detecting the change in the range of motion of the client, selecting a representation from one or more degrees of freedom representations.

Figure 11:
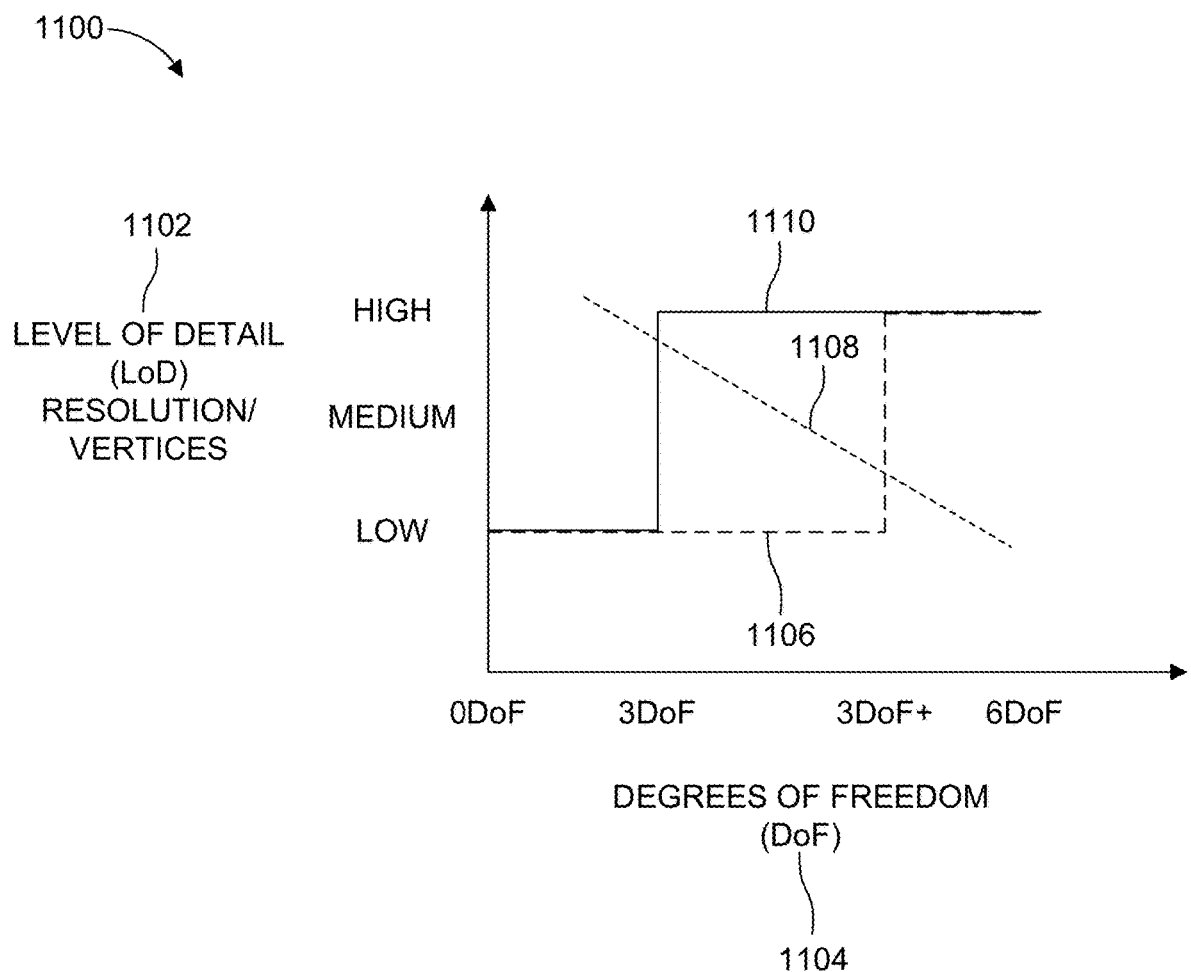
FIG. 11 is a graph illustrating example relationships of Degrees of Freedom (DoF) and Levels of Detail (LoD) for multiple adaptation parameters according to some embodiments.

FIG. 11 is a graph illustrating example relationships of Degrees of Freedom (DoF) and Levels of Detail (LoD) for multiple adaptation parameters according to some embodiments. The example graph 1100 of FIG. 11 shows Levels of Detail (LoD) resolution/vertices 1102 vs. Degrees of Freedom (DoF) 1104. QoE metrics, for some embodiments, include data the viewing client collects in order to adapt content streaming to processing and computation performance limitations. Network performance may be measured, for example, by measuring latency between segment request and display. For example, a latency requirement may be set to be below the target frame rate of the rendering in order to not cause content to lag behind due to network bandwidth. Client computing performance may be measured, for example, using rendering frame rate as a QoE metric. Rendering falling below a given threshold may indicate that the content exceeds the complexity the client device is able to handle. This situation may be corrected by reducing the LoD of the content, thereby reducing the rendering complexity. For some embodiments, clients in 2D ("0 DoF") space may use adaptation of DoF/LoD based on bandwidth, client motion freedom, and processing power (rendering view interpolation) factors. DASH may typically vary only LoD (resolution) in response to bandwidth constraints. Some embodiments may impose client device capability limits for high DoF or LoD selections.

FIG. 11 shows three traces 1106, 1108, 1110 for DoF/LoD adaptation based on adaptation processes that emphasize different parameters. For example, the bandwidth adaptation trace 1106 indicates a matching of DoF and LoD schemas for a process that emphasizes the LoD schema as the primary parameter for adapting bitrate. The DoF may be maintained high (3 DoF+) as LoD adjusts bandwidth until the bandwidth is insufficient to support 3 DoF+ at the lowest LoD. The processing constraint trace 1110 indicates a matching of DoF and LoD schemas for a process that emphasizes the DoF schema as the primary parameter. For the processing constraint trace 1110, the LoD may be maintained at high while the DoF varies from 3 DoF to 6 DoF. For some embodiments, the LoD is reduced only if the DoF is at a minimum (3 DoF) The motion adaptation trace 1108 indicates a matching of DoF and LoD schemas for a process that emphasizes motion of the user. Both the DoF and LoD vary with the relative value of DoF/LoD depending upon user motion (e.g., for little motion, low DoF but high LoD may be used and for high motion, high DoF but low LoD may be used). For a 6 DoF schema, the user is able to move to a 3D position within a scene with a yaw-pitch-roll viewing orientation. With such a large area over which the user may move, the LoD schema may be set low to maintain a bandwidth limit. As the user changes to a lower DoF schema (which may correspond to a limitation on user motion), the LoD schema may be successively increased (e.g., "medium" LoD corresponding to 3 DoF+, and "high" LoD corresponding to 3 DoF) and the amount of content data may still remain below the bandwidth limit.

For some embodiments, the viewing client may implement an adaptation control logic process that applies to a particular environment and application. For some embodiments, the control logic may adapt the LoD to the available bandwidth and processing performance for a DoF that matches the display capabilities of the viewing client. For some embodiments, the best QoE may be achieved with an adaptation logic process that mixes both LoD and DoF representations levels simultaneously. Mixed adaptation may be used because the highest DoF representation may not provide the best visual quality and a lower DoF with higher image quality may be sufficient to support viewpoint motion of the specific session. For some embodiments, depending on viewpoint motion, a higher DoF may be preferred by a user during a session over visual quality to support a level of content navigation desired by the user (viewer). If the DoF is dynamically changed during a session due to changes in available resources or viewpoint motion, the LoD may be re-adjusted for each change of DoF. Exemplary pseudo code for an adaptation logic process implementing mixed adaptation is shown in Table 2. Setting of the lowest available DoF and LoD may be based on bandwidth and/or processing power requirements for some embodiments. For example, the lowest DoF may be the lowest number of degrees of freedom available, and the lowest LoD may be the lowest total number of pixels for a resolution for the selected DoF.

TABLE 2

Adaptation Logic Pseudocode

```
start session
receive MPD
select initial viewpoint
set lowest available DoF and LoD for the selected viewpoint as the initial representations
observe session capabilities
if (tracking enabled)
    start collecting motion characteristics
while (content available)
    request content with the current DoF and LoD levels
    display content
    observe QoE metrics
    if (bandwidth consumption exceeding threshold)
        if (lower LoD available for the current DoF)
            set lower LoD as the current
        else
            if (higher DoF available for which initial content has been downloaded and which
                reduces bandwidth requirement)
                set current DoF as the higher DoF
                set current LoD as the highest LoD of that DoF that reduces bandwidth
                    requirement
            else if (lower DoF providing lower bandwidth requirement available)
                set current DoF as the lower DoF
                set current LoD as the highest LoD of that DoF that reduces bandwidth
                    requirement
            else
                report error caused by the lack of available resources and exit
    else if (bandwidth consumption may be increased)
        if ((higher LoD available for the current DoF) and (processing resources available))
            increase current LoD level
        if ((higher DoFs available that require initial download) and (session capabilities support
            higher DoFs) and (processing effort may be increased) and (initial download not yet
            done))
            download and cache initial data required by the higher DoFs
    if (processing effort is exceeding threshold)
        if (lower LoD available for the current DoF)
            reduce LoD
        else if (lower DoF available)
            set lower DoF as the current and set closest matching LoD of the new DoF to
                the bandwidth requirements of the previous DoF as the current LoD
        else
            report error caused by the lack of available resources and exit
    else if (processing effort may be increased)
        if (higher LoD available for the current DoF and bandwidth available)
            increase LoD level
    if (multiple DoF available for the current viewpoint)
        if (((motion characteristics indicate increase in DoF required or a viewpoint moving
            towards edge of 3DoF+ area) or (support for increasing translational or rotational
            motion requires higher DoF)) and (processing resources available))
            if (higher DoF requirements may be fulfilled)
                set higher DoF as the current one and set LoD within new DoF closest
                    to the current LoD in bandwidth requirements for the current LoD
        if ((motion characteristics indicate decrease in DoF possible or a translational or
            rotational motion of the viewing device reduced below a threshold) or (6DoF
            navigation has brought viewpoint to an area where 3DoF+ is available))
            if (lower DoF provides better image quality or going to the lower DoF moves
                from real-time 3D rendering to light field representation) or (lower DoF
                enables higher resolution perceivable for the viewer)
                set lower DoF as the current one and set LoD within new DoF closest to
                    the current LoD in bandwidth requirements for the current LoD
```

In addition to the control parameters described in the pseudo code example in Table 2, the control logic may balance between DoFs and LoDs using some weighting in order to balance more finely between, for example, DoF and perceivable resolution so that, in some cases, the freedom of navigation may be decreased in order to achieve a higher perceivable resolution. This process could be used, for example, to drop from 3 DoF to 0 DoF if the final 3 DoF rendering causes the perceivable resolution to be significantly lower than what 0 DoF is able to provide. Another control element not described in the pseudo code example of Table 2 is user preferences. In some embodiments, user preferences may affect an adaptation process, with the process, e.g., configured to incorporate, e.g., specific user preferences. For example, a user may prefer 0 DoF content over 3 DoF content, and this preference may be incorporated into, e.g., adaptation process logic. User preferences may be determined from users directly, or inferred or assumed based on, e.g., prior user streaming activity or viewing behavior.

With a 2D display, a default process for the viewing client may be to select a viewpoint based on the user preferences and scene logic described in the scene graph for available 0 DoF viewpoints. The process may adapt the 0 DoF LoD during a session to the available network bandwidth. If the viewing client uses a process to enable a user to interactively navigate content, the viewing client may enable navigation by switching to a higher DoF schema.

For spatial display with multiple viewers, such as a multi-view tabletop display, the spatial content may be adjusted to the number and location of multiple users in order to achieve best QoE for all viewers. In this case, the viewing client may monitor the location of the users, and based on the locations of users, select multiple viewpoints for the content's scene graph. Depending on user preferences and the locations of users, viewpoints may use data streamed with different DoF schemas.

Depending on user preferences and particular use case, the viewing client (which may be a head mounted display (HMD), for example) may use 3 DoF+content over full 6 DoF content because of the better image quality enabled by the 3 DoF+ data even if full 6 DoF schema is available. For some embodiments, if free content navigation is enabled by the viewing client, the viewing client may switch between 6 DoF and 3 DoF+schemas as the user navigates the content based on availability of 3 DoF+ data for a particular viewpoint. For some embodiments, a 6 DoF version of a synthetic 3D scene may be a 3D polygonal mesh representation that the user is able to navigate and for selected viewpoints, pre-rendered light fields may be available to enable higher image quality with a limited navigation area.

Figure 12:
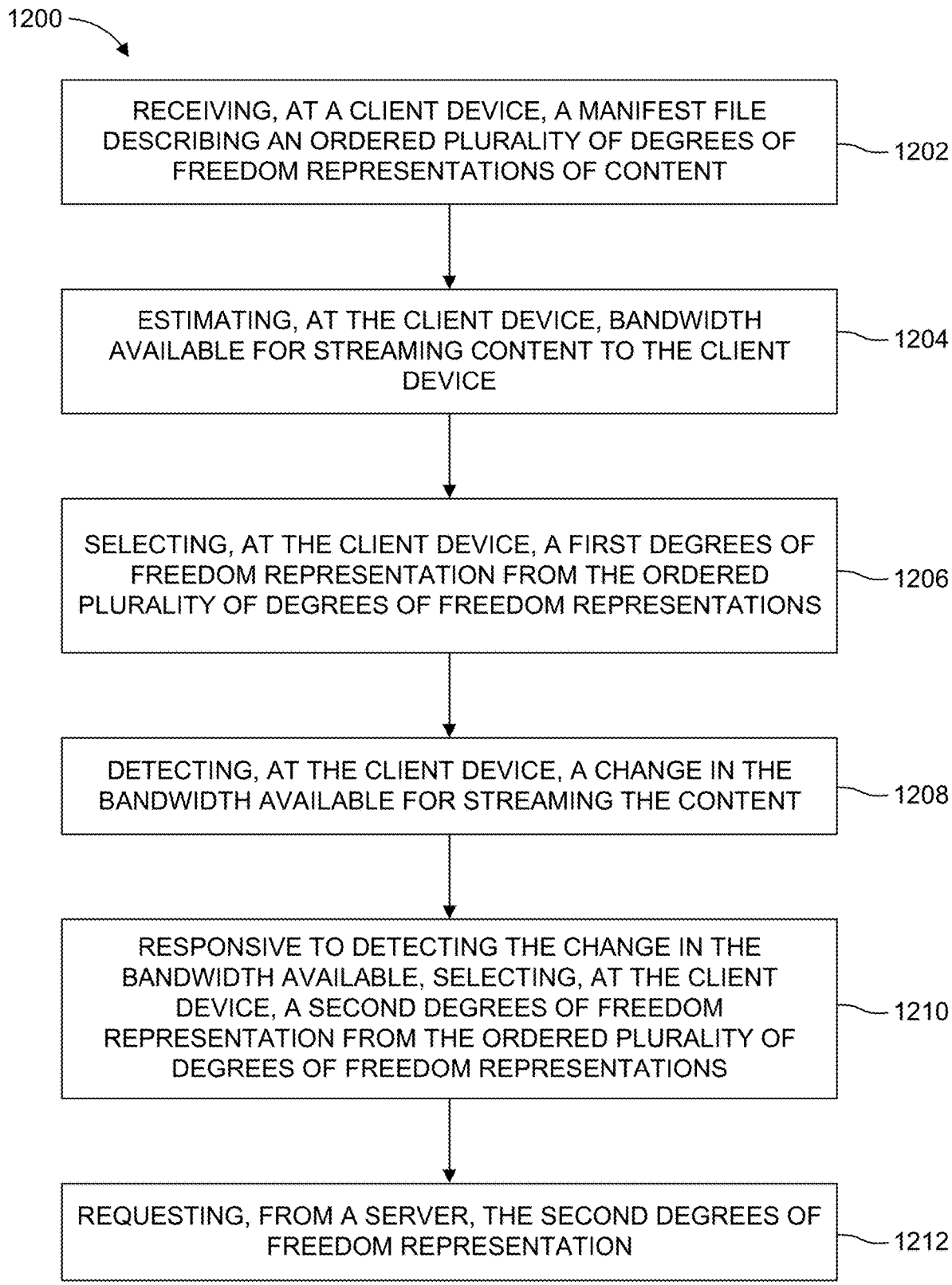
FIG. 12 is a flowchart illustrating an example process for a viewing client streaming content from a content server according to some embodiments.

FIG. 12 is a flowchart illustrating an example process for a viewing client streaming content from a content server according to some embodiments. Some embodiments of a content streaming process 1200 may include receiving 1202, at a client device, a manifest file describing an ordered plurality of degrees of freedom representations of content. The manifest file may not be ordered for some embodiments. In some embodiments, the content streaming process 1200 may further include estimating 1204, at the client device, bandwidth available for streaming content to the client device. For some embodiments, the content streaming process 1200 may further include selecting 1206, at the client device, a first degrees of freedom representation from the ordered plurality of degrees of freedom representations. Some embodiments of the content streaming process 1200 may further include detecting 1208, at the client device, a change in the bandwidth available for streaming the content. In some embodiments, the content streaming process 1200 may further include responsive to detecting the change in the bandwidth available, selecting 1210, at the client device, a second degrees of freedom representation from the ordered plurality of degrees of freedom representations. Some embodiments of the content streaming process 1200 may further include requesting 1212, from a streaming server, the second degrees of freedom representation. Some embodiments of an apparatus may include a processor and a non-transitory computer-readable medium storing instructions that are operative, when executed by the processor, to perform the content streaming process described above.

For some embodiments, if a content streaming process estimates a reduction in available bandwidth, an updated DoF schema may be selected that decreases the degrees of freedom (such as a switch from a 6 DoF schema to a 3 DoF+ schema). For some embodiments, if a content streaming process estimates an increase in available bandwidth, an updated DoF schema may be selected that increases the degrees of freedom (such as a switch from a 3 DoF+ schema to a 6 DoF schema). For some embodiments, a content streaming process may include retrieving a content representation and rendering the representation.

Figure 13:
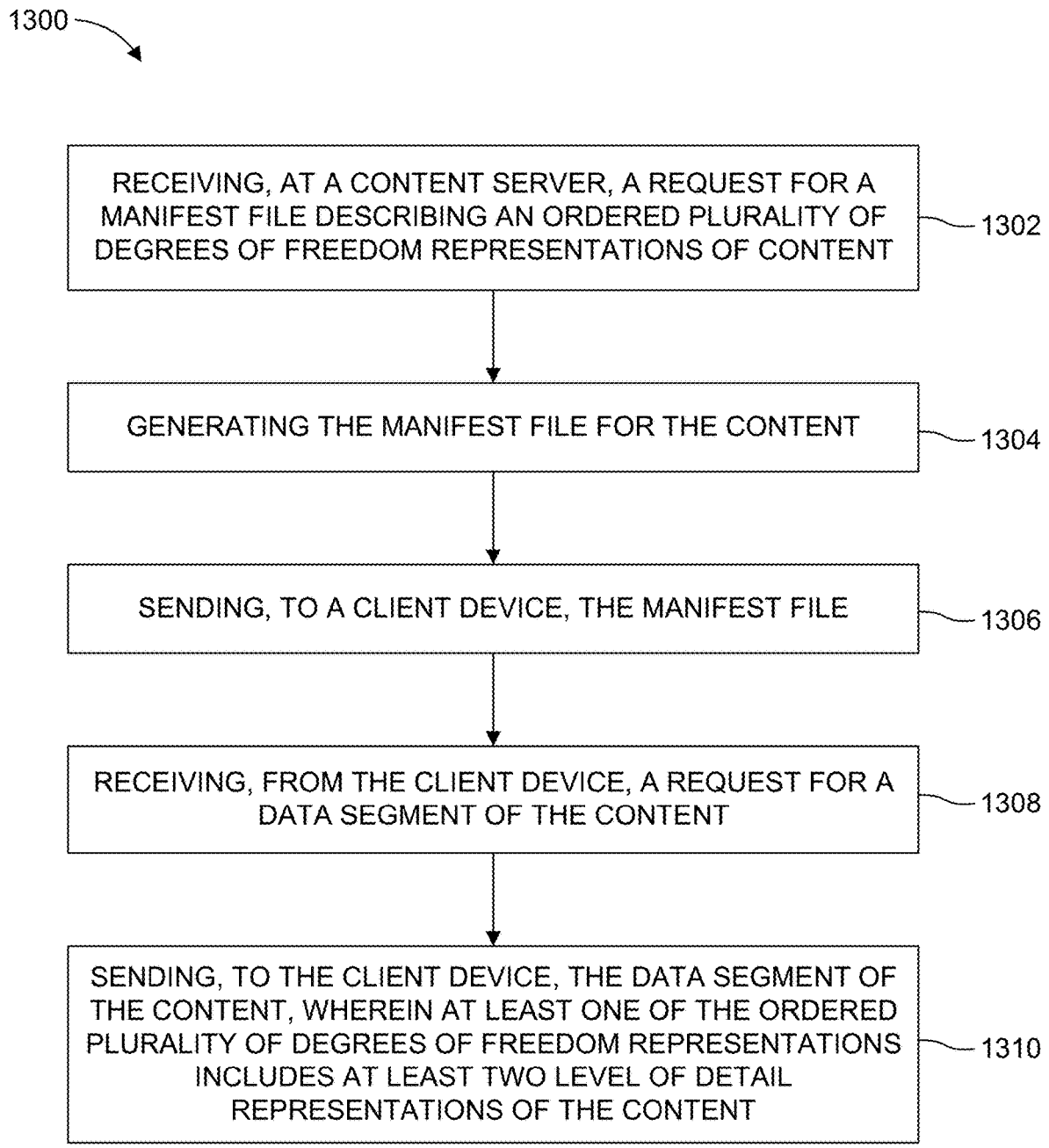
FIG. 13 is a flowchart illustrating an example process for a content server streaming content to a viewing client according to some embodiments.

FIG. 13 is a flowchart illustrating an example process for a content server streaming content to a viewing client according to some embodiments. Some embodiments of a content server process 1300 may include receiving 1302, at a content server, a request for a manifest file describing an ordered plurality of degrees of freedom representations of content. In some embodiments, the content server process 1300 may include generating 1304 the manifest file for the content. With some embodiments, the content server process 1300 may include sending 1306, to a client device, the manifest file. For some embodiments, the content server process 1300 may include receiving 1308, from the client device, a request for a data segment of the content. In some embodiments, the content server process 1300 may include sending 1310, to the client device, the data segment of the content, wherein at least one of the ordered plurality of degrees of freedom representations comprises at least two level of detail representations of the content. Some embodiments of an apparatus may include a processor and a non-transitory computer-readable medium storing instructions that are operative, when executed by the processor, to perform the streaming server process described above.

Streaming media may need to adjust to requirements that are generally becoming more complex. MPEG-Dash addresses dynamic variation in the streaming media distribution bandwidth with focus on video content. With spatial media, similar dynamic adaptive streaming may be used but with a model that takes into an account multitude of spatial content formats as well as an even wider gamut of contextual conditions. Some content formats may require, for example, only minimal amount of initial download, but instead consume more bandwidth during the whole streaming session. Some devices use larger chunks of data at some parts of the experience, and users may desire a balance among initial wait-up time, streaming bandwidth, and image quality.

Many current adaptive spatial content streaming devices focus on a single spatial content type, namely 3D data in polygon mesh format, as understood according to the articles Lavoué, Guillaume, et al., *Streaming Compressed 3D Data on the Web Using JavaScript and WebGL*, PROCEEDINGS OF THE 18TH INTERNATIONAL CONFERENCE ON 3D WEB TECHNOLOGY 19-27 ACM (2013) ("Lavoué"); Evans, Alun, et al., i A Pipeline for the Creation of Progressively Rendered Web 3*D Scenes*, MULTIMEDIA TOOLS AND APPLICATIONS 1-29 (2017) ("Evans"); and Zampoglou, Markos, et al., Adaptive Streaming of Complex Web 3D Scenes Based on the MPEG-DASH Standard, 77.1 MULTIMEDIA TOOLS AND APPLICATIONS 125-148 (2018) ("*Zampoglou*"). These academic efforts are understood to expand content adjustment schema at the client side by adjusting to bandwidth limitations and adjusting to computing performance. In *Zampoglou*, applicability of MPEG-Dash standard to transmit 3D data with multiple levels of detail (LoD) together with associated metadata is understood to be investigated. Both Lavoué and Evans are understood to propose a progressive compression algorithm for 3D graphics data suitable for adaptive LoD streaming.

Figure 14:
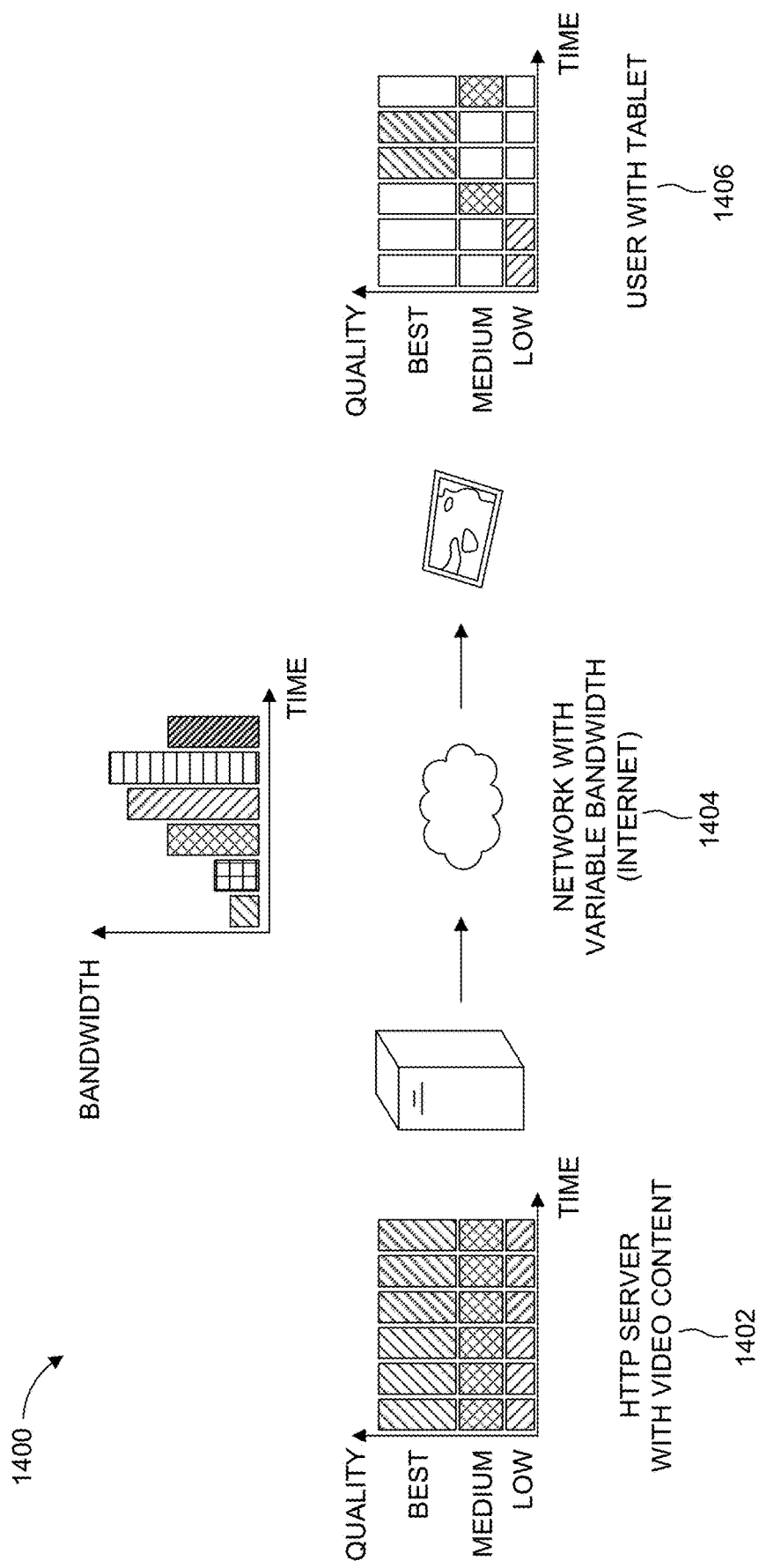
FIG. 14 is a process diagram illustrating an example communication of video content according to some embodiments.

FIG. 14 is a process diagram illustrating an example communication of video content according to some embodiments. As shown in the process 1400 of FIG. 14, an HTTP server 1402 with video content may have quality levels that vary over time. A network (the Internet) 1404 with a variable bandwidth availability also varies over time. A user with a tablet 1406 (or other wireless device) downloads content onto the device. The user's demand for content also varies over time.

Spatial data may increase demand for content streaming bandwidth and the ability to be able to dynamically adapt to the changing resources available. With spatial data, unlike 2D video content, balancing between bandwidth consumption and QoE may be more than just adjusting resolution/ compression rate across the whole image area depending on the available bandwidth. With spatial data, for example, switching between different content formats during streaming instead of just changing level of detail within single format may result in a better QoE, but this depends on the viewing conditions. Some formats, e.g., require different amounts of data to be pre-downloaded before rendering and display is enabled. One example is a model that is animated by streaming commands. In some embodiments, the model must be downloaded before the small animation command stream may be used.

For some embodiments, viewing clients may be informed of available spatial data formats and associated data download specifications. In addition to streaming manifest communication, a client may handle adaptation in order to achieve an optimal QoE for some embodiments. Some embodiments may balance QoE, taking into account, for example, required initial downloads and anticipated streaming specifications to ensure smooth playback. Some embodiments may include expanding adaptive spatial data streaming to balance between initial download, streaming bandwidth, and image quality by dynamically adjusting between different spatial data formats. Adaptive streaming prepares content at different bitrates, allowing a client to adapt to different bandwidth. The streaming rate of the stream is communicated in an MPD for some embodiments. In some example embodiments, a potential challenge regarding how to handle fixed-size data needs and burst data needs is addressed.

Figure 15:
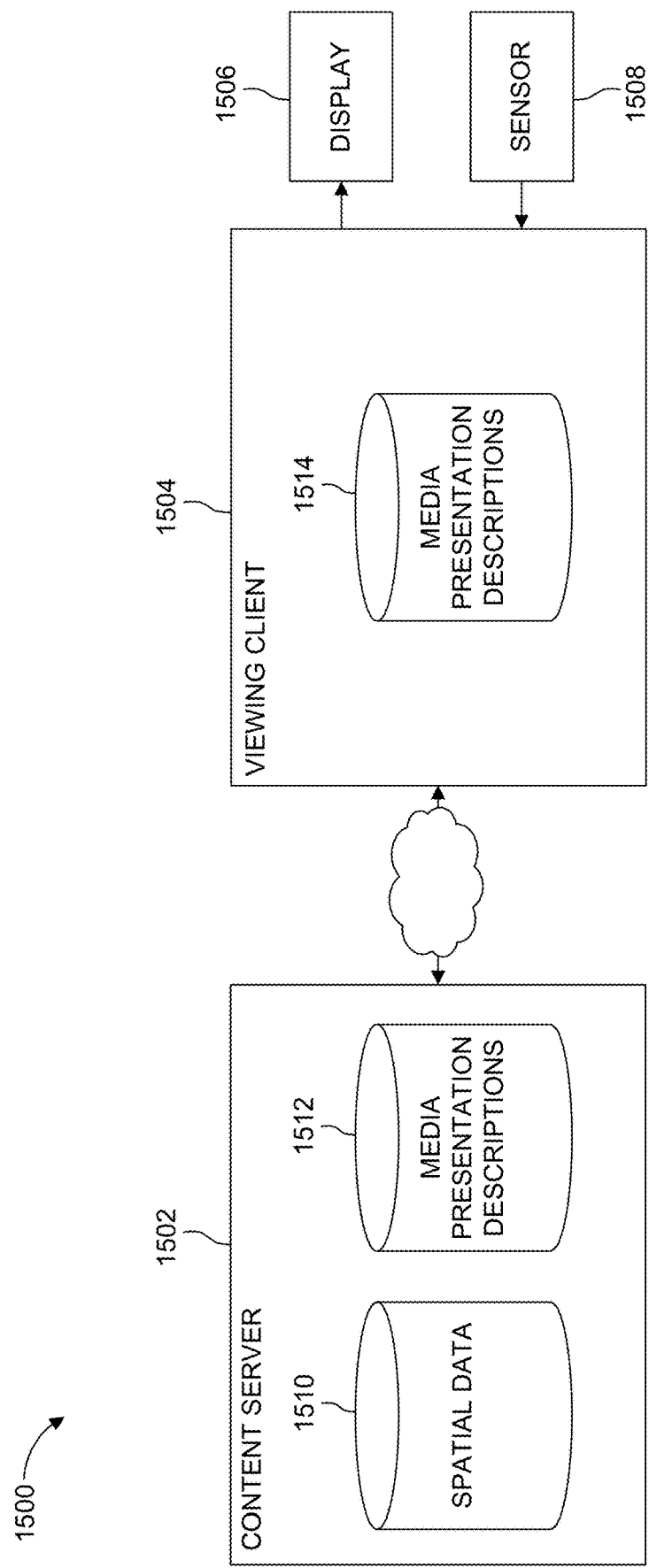
FIG. 15 is a system diagram illustrating an example set of interfaces for a content server-viewing client network according to some embodiments.

FIG. 15 is a system diagram illustrating an example set of interfaces for a content server-viewing client network according to some embodiments. For some embodiments of a system 1500, a content server 1502 streaming spatial content data 1510 with various formats and quality settings may allow a viewing client 1504 to dynamically adapt the content streaming to the viewing conditions within limits of the available bandwidth, client performance, and per session conditions. For some embodiments, the content server 1502 may store media presentation descriptions 1512 which may relate to one or more sets of spatial data. In addition to several quality and format streams, the content server 1502 may provide metadata about the available streams to the viewing client 1504. A viewing client 1504 may select the streams to be used based on information about the content received as streaming manifest metadata from the server 1502, the contextual information the viewing client has about the viewing conditions, available bandwidth, and available processing resources. For some embodiments, a viewing client 1504 may include a local cache, which may be used to store content streams of media presentation descriptions 1514. The viewing client 1504 may send content streams to a display 1506. The viewing client 1504 may receive sensor data from a sensor 1508.

For some embodiments, an adaptive media manifest is expanded with specification of the initial download specification for the content streams. Similar to the MPEG-Dash media presentation description (MPD), metadata about the content streams may be composed in a structured document extended with the initial download specifications defined for each content stream version. For some embodiments, at the beginning of a streaming session, the viewing client may download an MPD from the content server. Based on, e.g., the MPD, current conditions, and local client/display capabilities, the viewing client may select versions of the content data to be downloaded and adapt data transmission and quality by selecting content segments in a format and resolution that is most appropriate and complies with the available resources. This functionality may enable the viewing client to control the wait-up time a user waits before the execution of the experience may be launched. Furthermore, during the session, the client may inspect available bandwidth, and may download concurrently with the real-time streaming, content elements that are part of the initial download used by another type of spatial data.

For some embodiments, progressive and adaptive distribution of spatial data to client devices may be enabled with large variation in capabilities and display characteristics of client devices while also adapting to the transmission bandwidth and client device processing performance. For some embodiments, web-based distribution of spatial scenes with multiple spatial content types with controllable latency and start-up delay may be enabled.

Figure 16:
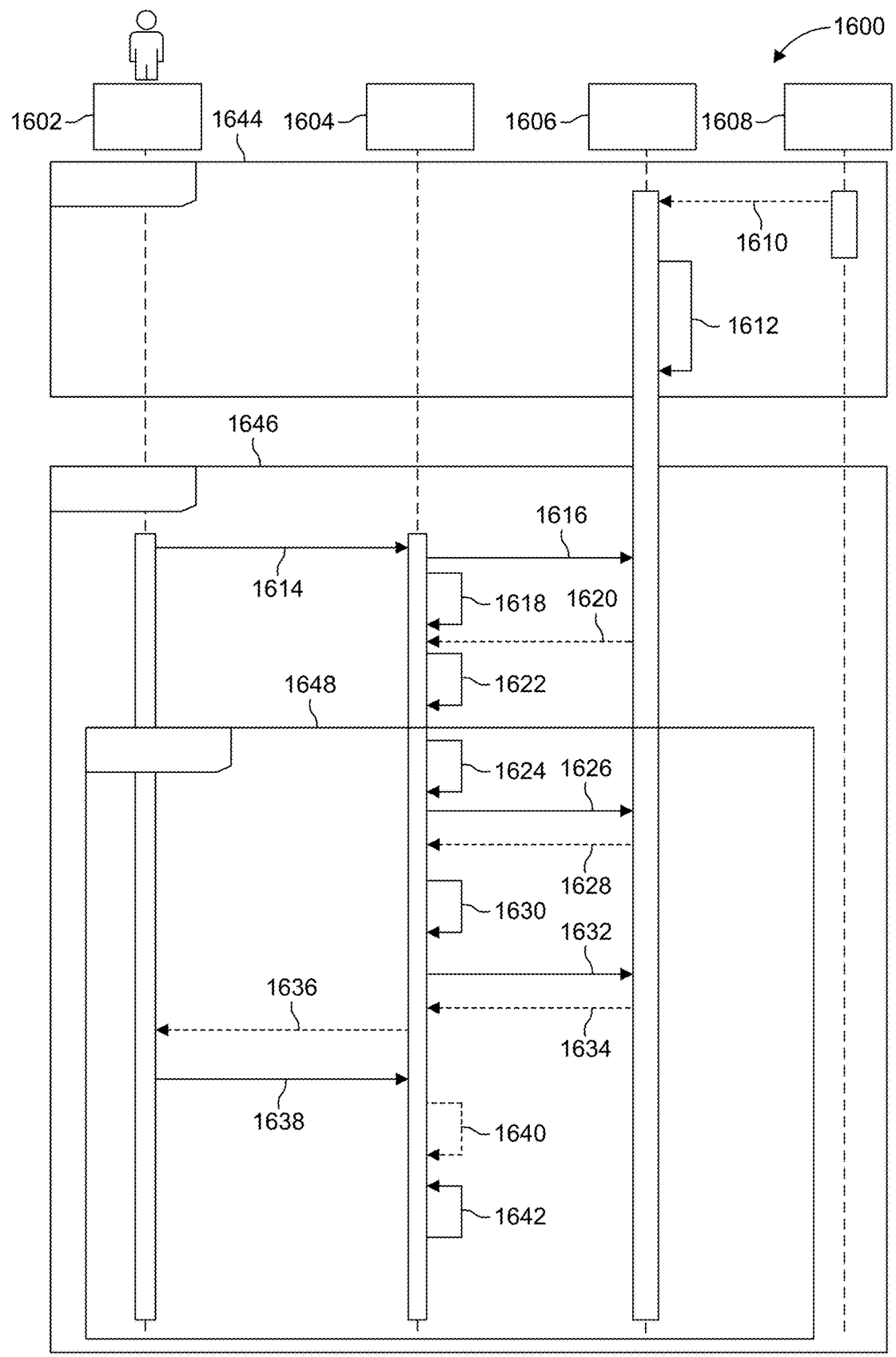
FIG. 16 is a message sequencing diagram illustrating an example process for communication and processing of a typical use session according to some embodiments.

FIG. 16 is a message sequencing diagram illustrating an example process for communication and processing of a typical use session according to some embodiments. FIG. 16 illustrates an example communication sequence 1600 in an example use session with content pre-processing 1644, content distribution 1646, and a run-time loop 1648 in accordance with some embodiments. For some embodiments, spatial data may be provided 1610 by the content provider 1608 to the content server 1606, from which the viewer client (or, e.g., "viewing client") 1604 may select versions of the content to be downloaded. The content server 1606 may compile 1612 various versions of streamed data as segments and identify download specifications for one or more (or, in some example cases, all) data elements for the MPD.

A user 1602 may send 1614 a content request to the viewer client 1604, and the viewer client 1604 may send 1616 a content request to the content server. The viewing client 1604 may collect 1618 sensor information about the viewing conditions by collecting system configuration information, by collecting available sensor data, and by observing network communication and processing performance. The viewer client 1604 may collect 1618 sensor and configuration data. The content server 1606 may send 1620 an MPD to the viewer client 1604, and the viewer client 1604 may select 1622 an initial viewpoint. The viewer client 1604 may select 1624 spatial data elements to be requested. The viewer client 1604 may send 1626 a request for initial content data to the content server, and the content server 1606 may send 1628 the requested content elements to the viewer client 1604. The viewer server 1604 may wait 1630 for the initial downloads to be completed. The viewer client 1604 may send 1632 a request for streamed content data to the content server 1606, and the content server 1606 may send 1634 the requested content elements to the viewer client 1604. The content may be displayed 1636 to the user 1602, and the user 1602 may send 1638 user input to the viewer client 1604. The viewer client 1604 may process 1640 the user input and scene information and update the viewpoint. The viewer client 1604 also may observe 1642 QoE metrics. Based on the QoE metrics observed and/or inferred from the collected dynamically changing viewing conditions, the viewing client may request specific versions of the spatial data media segments based on the Media presentation description (MPD) provided by the content server, adaptively balancing start-up delays, QoE and available resources.

For some embodiments, a QoE metric for a selected content representation (such as a selected spatial data element) may be determined to be less than a threshold, and a second content representation may be selected from one or more content representations. For some embodiments, selecting the second content element representation may include determining that a QoE metric corresponding to the second content element representation exceeds a minimum threshold. For some embodiments, a QoE metric for a selected content element representation may be determined, and a second content element representation may be selected from the plurality of content element representations based on the determined QoE metric. For some embodiments, selecting the second content element representation includes determining that the QoE metric corresponding to the second content element representation exceeds a minimum threshold. For some embodiments, a process may include determining a quality of experience (QoE) metric for the selected representation is less than a threshold; and responsive to determining the QoE metric for the selected representation is less than the threshold, selecting a still further representation from the one or more degrees of freedom representations.

Figure 17:
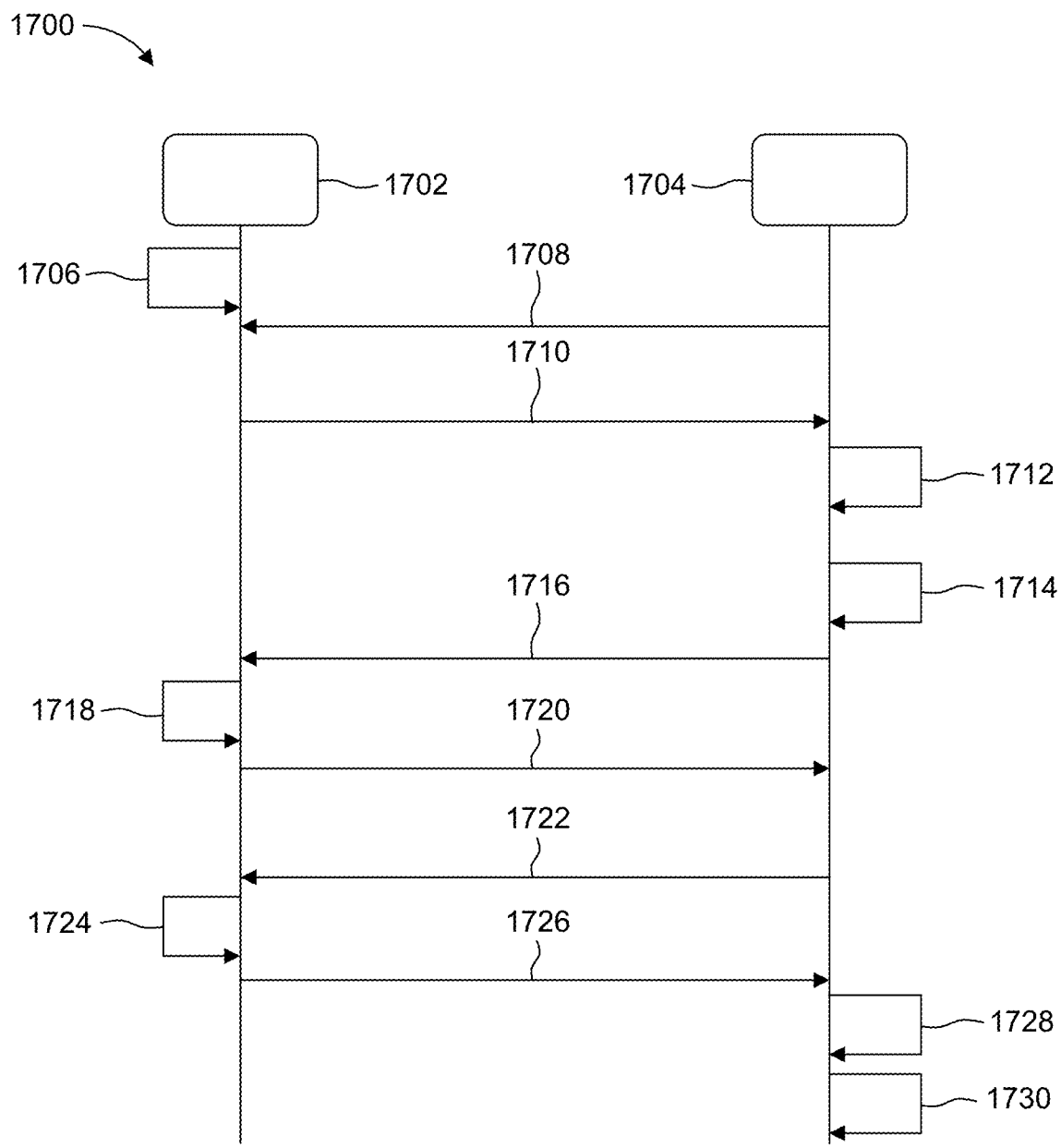
FIG. 17 is a message sequencing diagram illustrating an example process for streaming and displaying content data according to some embodiments.

FIG. 17 is a message sequencing diagram illustrating an example process for streaming and displaying content data according to some embodiments. For some embodiments, an example process 1700 may include a server 1702 generating 1706 an MPD with initial download specifications (e.g., requirements). For some embodiments, the example process 1700 may further include a client 1704 sending 1708 a content request to the server 1702. For some embodiments, the example process 1700 may further include the server 1702 sending 1710 a Media Presentation Description (MPD) to the client 1704. For some embodiments, the example process 1700 may further include the client 1704 estimating 1712 available bandwidth and start-up latency. For some embodiments, the example process 1700 may further include the client 1704 selecting 1714 an appropriate media representation. The appropriate media representation may be selected to reduce start-up latency based on the estimated available bandwidth, which is discussed in more detail later. For some embodiments, the example process 1700 may further include the client 1704 requesting 1716 initial download data. For some embodiments, the example process 1700 may further include the server 1702 transmitting 1718 the requested data and the client 1704 receiving 1720 the initial download data. For some embodiments, the example process 1700 may further include the client 1704 requesting 1722 streamed spatial data. For some embodiments, the example process 1700 may further include the server 1702 transmitting 1724 the requested streamed segments and the client 1704 receiving 1726 the streamed spatial data. For some embodiments, the example process 1700 may further include the client 1704 observing 1728 quality of experience (QoE) metrics. For some embodiments, the example process 1700 may further include the client 1704 displaying 1730 the content.

For some embodiments, a full spatial data scene view may include initial download data and a stream segment. For some embodiments, selecting a content element representation may include: determining a respective start-up delay for one or more of the plurality of content elements; determining a minimum start-up delay of the determined respective start-up delays; and selecting the content element representation corresponding to the minimum start-up delay, wherein the timeline information includes information regarding the respective start-up delay for one or more of the one or more of the plurality of content elements.

For some embodiments, a viewing client process may include retrieving a stream segment for a content element representation; and displaying the stream segment of the content element representation. For some embodiments, a viewing client may display received initial download data and received stream segment(s). For some embodiments, selecting a content element representation may include: determining a respective latency time associated with the initial download specification for one or more of the plurality of content element representations; and selecting one of the plurality of content element representations, wherein the latency time of the selected content element representation is less than a threshold. For some embodiments, a viewing client may determine a respective latency time for each of a plurality of content element representations, such that selecting the content element representation uses the determined respective latency times.

Figure 18:
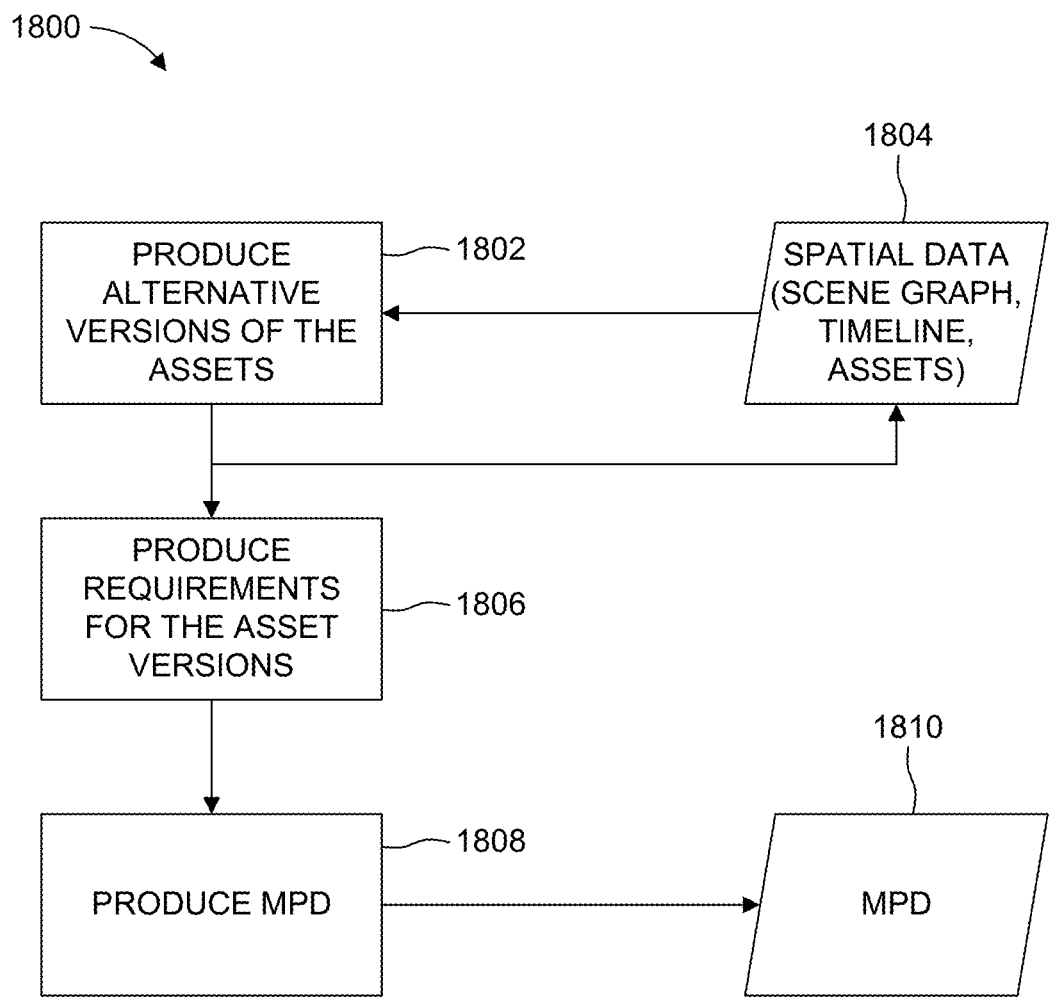
FIG. 18 is a flowchart illustrating an example process for producing an example Media Presentation Description (MPD) according to some embodiments.

FIG. 18 is a flowchart illustrating an example process for producing an example Media Presentation Description (MPD) according to some embodiments. FIG. 18 also illustrates an example content pre-processing process 1800 executed by the content server. For some embodiments, in the pre-processing phase, the content server may produce metadata description(s) of the available content, e.g., in the form of a media presentation description file (MPD). The MPD according to the example may provide an overview of the scene, relationships of the scene elements in the form of a scene graph, a timeline associated with the scene elements, one or more different versions of the media assets available, and associated specifications. The content server may store the spatial data 1804 (such as the scene graph, the timeline, and the media assets) in memory, which may be, for example, local memory location(s) of the server. The content server may produce 1802 one or more versions of the media assets. For example, the versions may differ regarding encoding bitrate, display resolution, and total media asset size. As part of the pre-processing, the content server may produce various versions of the existing scene elements that enable streaming adaptation by the client. The content server may produce 1806, e.g., specifications for the asset versions, such as minimum network bandwidth used to support, minimum network latency used to support, minimum display resolution size used to support, and minimum display refresh rate used to support. The content server may produce 1808 the MPD and store the MPD in memory. For some embodiments, once the content server has produced an MPD file 1810 with different asset versions and metadata describing available streams, the content server starts run-time processing such that the content server distributes content to the viewing clients.

For some embodiments, selecting a content element representation may be based on, e.g., representation size, the estimated bandwidth, and playback duration until the content element is displayed. For some embodiments, a manifest file may include timeline information regarding one or more of the plurality of content elements, and a content element representation may be selected based on the timeline information.

Figure 19:
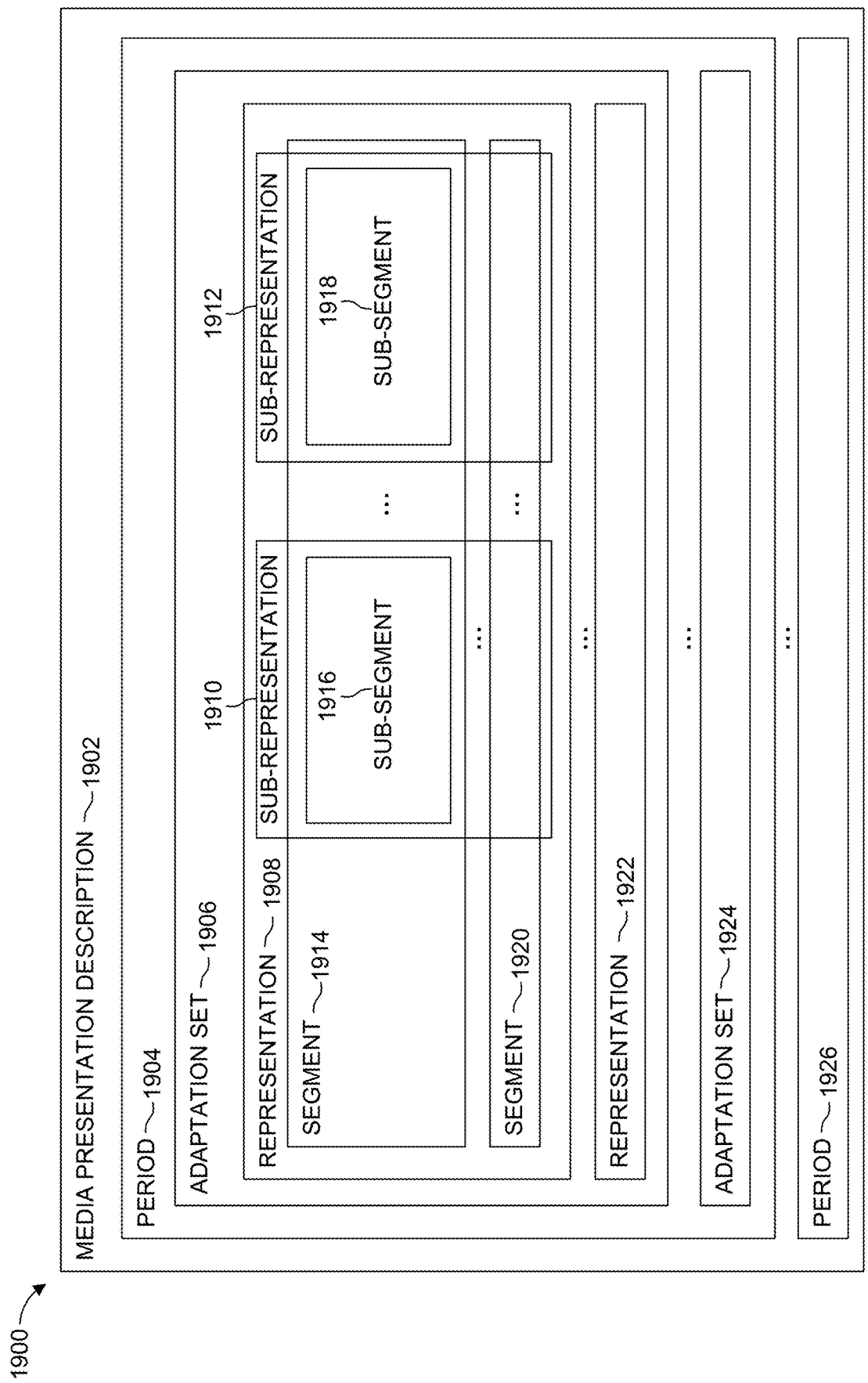
FIG. 19 is a data structure diagram illustrating an example MPEG-DASH Media Presentation Description (MPD) according to some embodiments.

FIG. 19 is a data structure diagram illustrating an example MPEG-DASH Media Presentation Description (MPD) according to some embodiments. For some embodiments, the general structure 1900 of the MPEG-Dash MPD illustrated in FIG. 19 may be used as the file format used for transmitting the overall media descriptions. The viewing client may download the MPD as part of a streaming session initialization. The MPD file 1902 may include one or more periods 1904, 1926. The period 1904, 1926 may include a start time and duration for content. The period 1904, 1926 may include one or more adaptation sets 1906, 1924. The adaptation set 1904, 1926 contains a media stream. The adaptation set 1904, 1926 may include one or more representations 1908, 1922. Representations 1908, 1922 may include one or more encodings of content, such as 720p and 1080p encodings. Representations 1908, 1922 may include one or more segments 1914, 1920. The segment 1914, 1920 is media content data that may be used by a media player (or viewing client) to display the content. The segment 1914, 1920 may include one or more sub-segments 1916, 1918 that represent sub-representations 1910, 1912 with a representation field 1908, 1922. Sub-representations 1910, 1912 contain information that apply to a particular media stream.

Table 3 shows an example MPD that corresponds with the fields shown in FIG. 19. For the example shown in Table 3, the AdaptationSet id field indicates the content scheme, and the Representation id field indicates an identifier that indicates a display size resolution or level of detail (LOD). The bandwidth field may indicate a minimum bandwidth that a network has available for streaming the particular version of the content. The width and height fields indicate the respective width and height display sizes of the content. The filesize field indicates the memory size of the content.

TABLE 3

MPEG-DASH MPD Example

```
<AdaptationSet id="Video" >
  <Representation id="UHD2" bandwidth="1000000000" width="7680"
  height="4320">
  <Representation id="UHD" bandwidth="100000000" width="3840"
  height="2160">
  <Representation id="HD" bandwidth="20000000" width="1920"
  height="1080">
  ...
<AdaptationSet id="Object 1" >
  <Representation id="High LOD" filesize=10MB>
  <Representation id="Mid LOD" filesize=2MB>
  <Representation id="Low LOD" filesize=100KB>
<AdaptationSet id="Object 2" >
  <Representation id="High LOD" filesize=20MB>
  <Representation id="Mid LOD" filesize=3MB>
  <Representation id="Low LOD" filesize=10KB>
```

Figure 20:
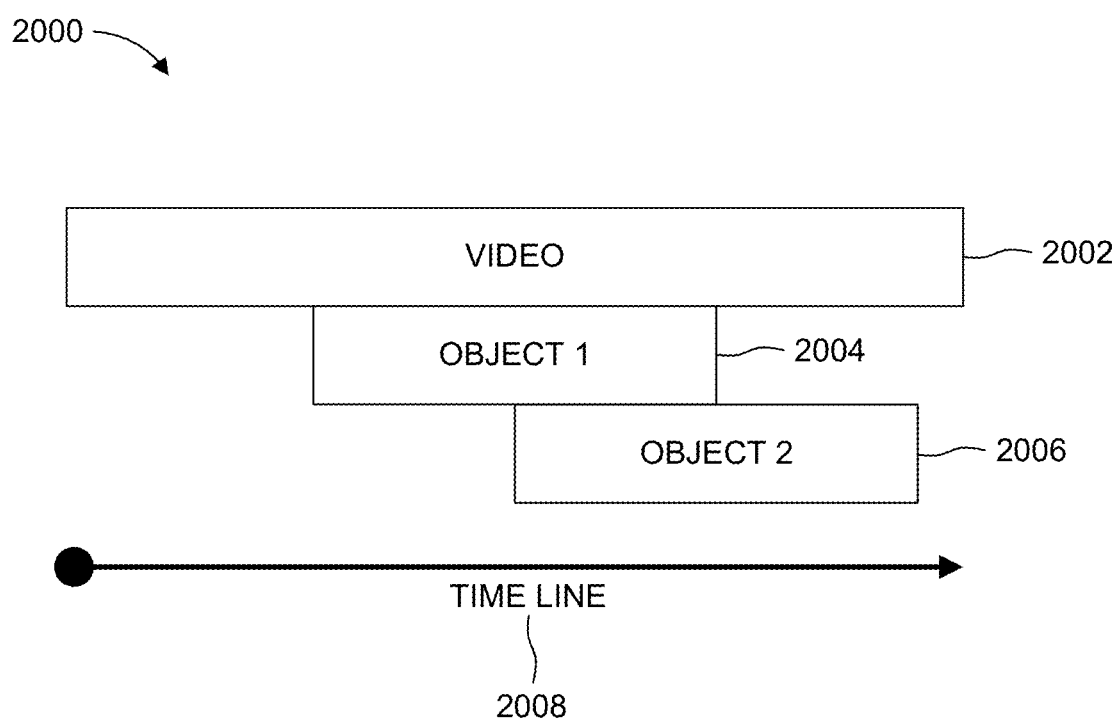
FIG. 20 is a timing diagram illustrating an example timeline of video and objects according to some embodiments.

FIG. 20 is a timing diagram illustrating an example timeline of video and objects according to some embodiments. For some embodiments, timeline information 2000 is a list of assets and, e.g., the respective temporal presence of these assets in the scene during a user experience. This timeline information 2000 allows the viewing client, in accordance with some embodiments, to keep track of which assets are used at which time of the user experience and to determine when to begin downloading and streaming of new assets. Timeline information may be stored as part of the scene graph and may be, for example, attached as part of the per scene graph node information. For some embodiments, client capabilities may be tracked. A change in client capabilities may be detected, and responsive to detecting the change in client capabilities, may select a representation from one or more degrees of freedom representations.

The MPD may include details of initial downloads, e.g., as required by different content elements in different formats. Different level of detail (LoD) representations correspond to different file sizes. Also, timeline information may be included in the MPD, enabling a client to initiate content downloads in time. Based on QoE preferences, the client may switch between content representations to balance between initial downloads and, e.g., required streaming bandwidth. For some embodiments, the client may balance between initial start-up delay (e.g., latency) and image quality (e.g., resolution). Such a process may enable web-based distribution of spatial scenes with multiple spatial content types balanced with controllable latency and start-up delay.

The example timeline shown in FIG. 20 shows a timeline 2008 of the overall video for a scene. Two example objects 2004, 2006 related to the scene (labeled as Object 1 (2004) and Object 2(2006)) are shown with the relative timings of these example objects in relation to each other and the overall video content 2002.

Figure 21:
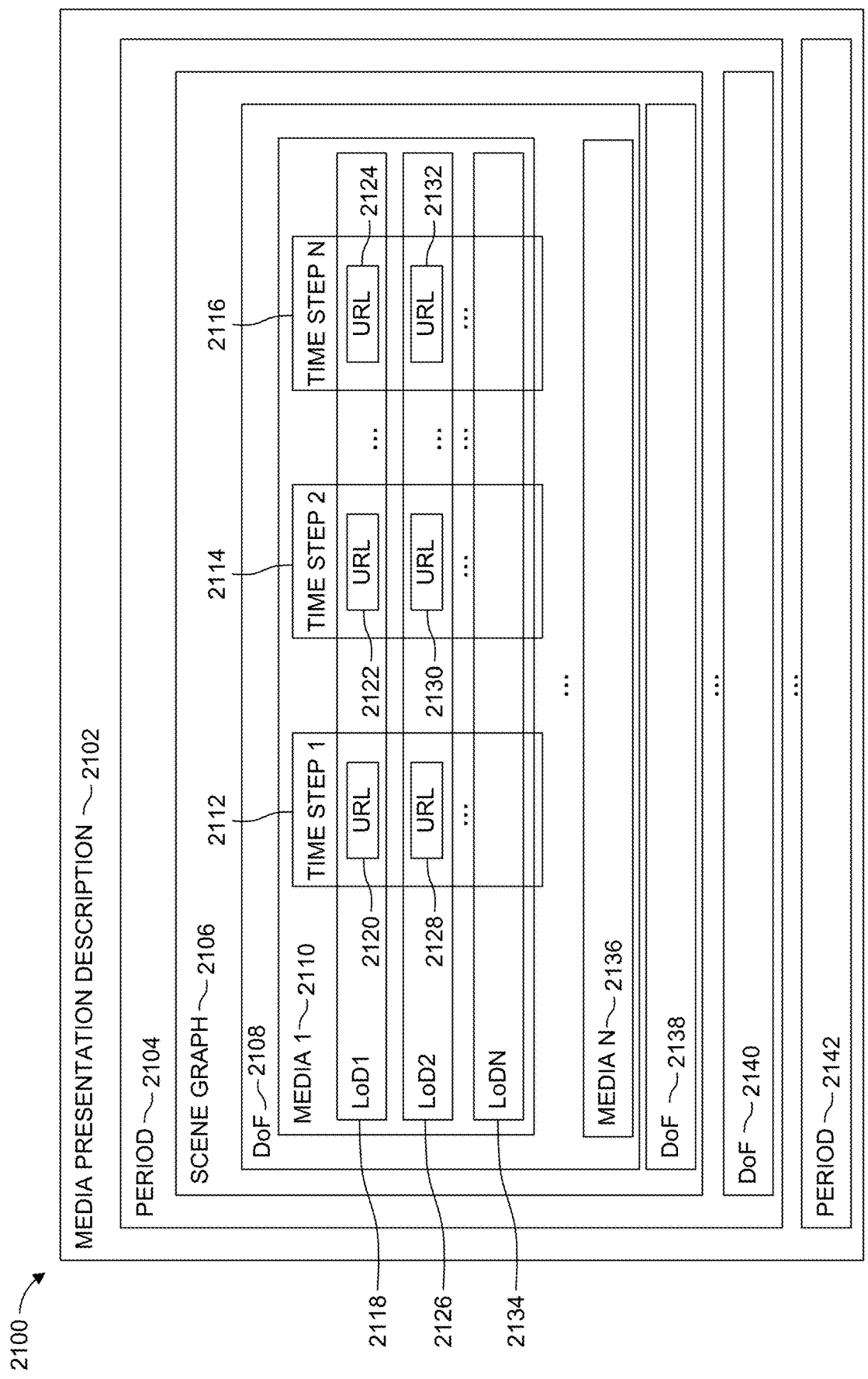
FIG. 21 is a data structure diagram illustrating an example Media Presentation Description (MPD) with example Degrees of Freedom (DoF) and Levels of Detail (LoD) schemes according to some embodiments.

FIG. 21 is a data structure diagram illustrating an example Media Presentation Description (MPD) with example Degrees of Freedom (DoF) and Levels of Detail (LoD) schemes according to some embodiments. FIG. 21 illustrates how the MPD data enabling streaming and initial download balancing may be organized with the general MPEG-DASH MPD structure 2100. For some embodiments, the top hierarchical entity in the MPD file 2102 is a period 2104, 2142. Each period 2104, 2142 provides the information of a single consistent virtual scene composited of spatial data. A single scene, for example, may be a single virtual environment in which an interactive and/or pre-defined virtual experience takes place. The virtual experience may include several scenes, and each scene may include one or more period blocks, similar to a movie that has several scenes. According to the example, each period 2104, 2142 may include a scene graph 2106 and one or more DoF blocks 2108, 2138, 2140, each containing a description of available assets and associated data formats, versions, and specifications.

Relating FIGS. 19 and 21 together, DoF divisions 2108, 2138, 2140 may correspond to MPEG-DASH adaptation sets, and LoD divisions 2118, 2126, 2134 under a given DoF 2108, 2138, 2140 may correspond to MPEG-DASH representations and segments. For some embodiments, media blocks 2110, 2136 may correspond to MPEG-DASH representations, and time steps 2112, 2114, 2116 may correspond to sub-representations. For some embodiments, a time step 2112, 2114, 2116 may contain a URL 2120, 2122, 2124, 2128, 2130, 2132 for a corresponding LoD block 2118, 2126, 2134. For some embodiments, a period 2104, 2142 may include DoF blocks (or DoF representations) 2108, 2138, 2140 for 3 DoF, 3 DoF+, and 6 DoF representations.

A scene graph is the description of the structure and behavior of the scene. The description may be formed as a hierarchical description of spatial relations between scene elements, as well as logic indicating interactive behavior of the scene elements. In addition, a scene graph may contain information, for example, related with scene audio and physics. For adaptive streaming, the scene graph may contain information about timeline of presence of assets, available viewpoints, and associated asset versions. The client may use timeline information to estimate when to begin the initial downloading of assets (if applicable) in order to have the assets available without waiting when the assets are used. Viewpoint information may indicate the location and the type of navigation area from which the scene may be viewed or inspected. The viewpoint information may be linked with asset versions if the assets are available in different formats. Such a structure may allow different initial download, freedom of navigation, or viewpoints to be stored.

For some embodiments, this MPD structure provides to the client, e.g., both timeline information and per asset initial download specifications. Clients may use local criteria to select a version of an asset that provides a high (or the best in some embodiments) QoE and enables more accurate per-buffering of spatial content in multiple formats, which may avoid interruptions during a user experience.

FIG. 22 is a flowchart illustrating an example content server run-time process according to some embodiments. The content server may store the spatial data 2212 to be distributed along with the MPDs 2206 for the data. In an example run-time process 2200, the content server may distribute data based on client request types 2204 in a strict client pull model, as illustrated in FIG. 22. If a content request is received from a viewing client, the content server may determine the request type 2204. If the request type 2204 is for a new session, the content server may retrieve the MPD from memory and send 2208 the MPD to the viewing client. If the request type 2204 is for a data segment or initial download, the content server may retrieve the spatial data from memory and send 2210 the data segment or initial download assets, respectively. The viewing client may request spatial data segments according to the MPD and QoE metrics measured by the viewing client, which may include the available resources and session conditions. The process may determine if an end of processing was requested 2214. If an end of processing request was not received, the process 2200 may wait 2202 for a content request from a viewing client. The process 2200 may continue until an end of processing request 2216 is received.

For some embodiments, an example process executed by the content server may include: receiving the spatial data. The spatial data may be pre-processed and organized into different versions. The content server may analyze initial download times, e.g., that may be required by each content version. An MPD of the scene may be produced. The content server may wait for content requests from viewing clients. Upon receive a content request, the content server may send the MPD to the client. The content server may transfer data elements to the client based on client HTTP requests, such as the content transfer process described above in relation to FIG. 22.

Figure 23A:
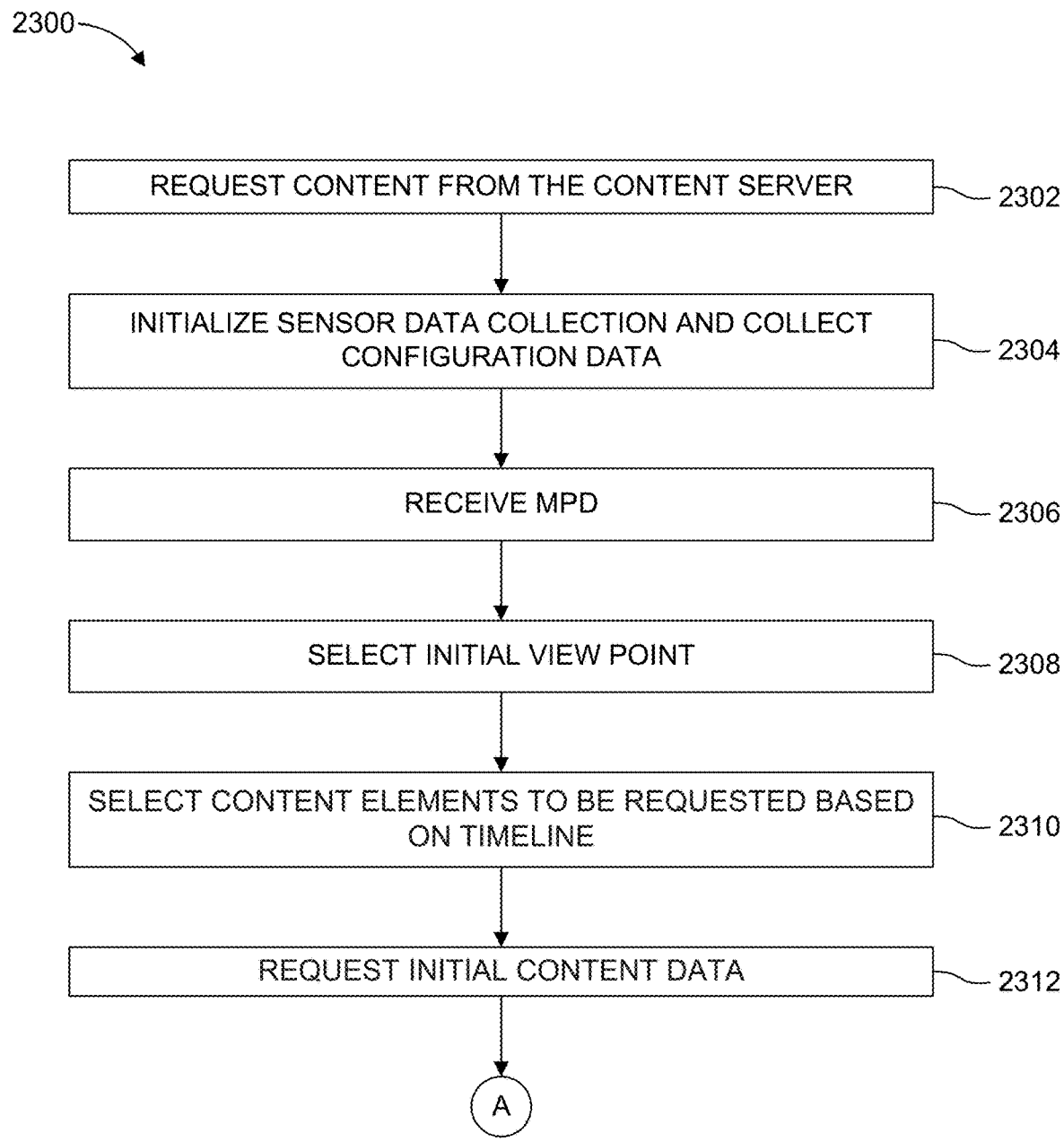
FIGS. 23A-23B are flowcharts illustrating an example viewing client process according to some embodiments.
Figure 23B:
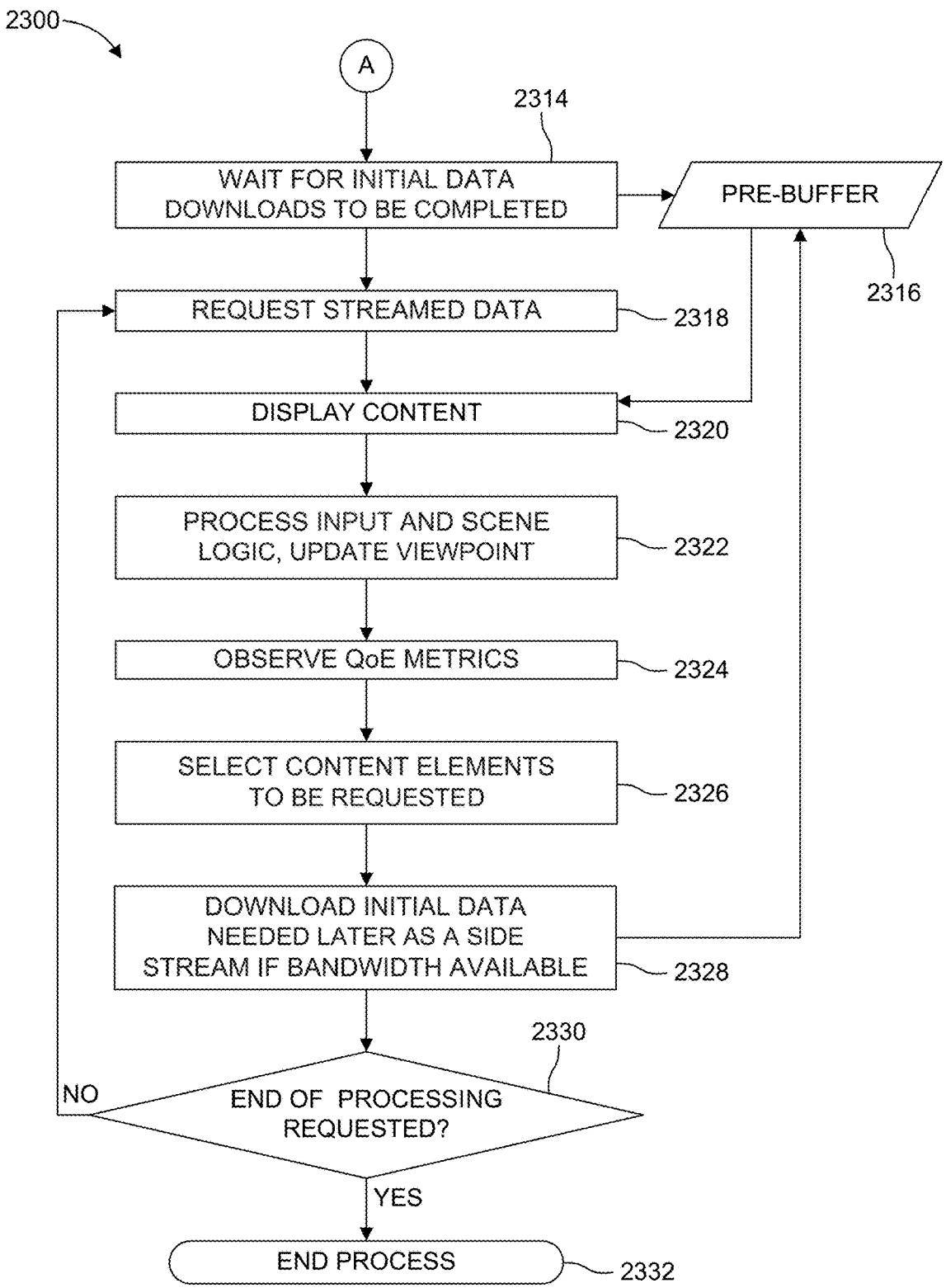

FIGS. 23A-23B are flowcharts illustrating an example viewing client process according to some embodiments. For some embodiments, a user launches an application implementing the viewing client. The user starts the application and may indicate the content to be viewed. For some embodiments, the content is a link to the MPD residing on the content server. The link to the MPD may be a URL identifying the content server and specific content. A viewing client application may be launched, e.g., either by an explicit command by the user or automatically by the operating system based on identifying a content type request and application associated with the specific content type. For some embodiments, the viewing client is a stand-alone application. For some embodiments, the viewing client may be integrated with a web browser or a social media client, or the viewing client may be part of the operating system. For some embodiments of a client process 2300, content may be requested 2302 from a content server. If a viewing client application is launched, sensor data may be initialized, and sensors may be configured for data collection. For some embodiments, sensor data collection collects information about the viewing conditions that the viewing client may use to adapt content streaming. For some embodiments, sensor data may be collected from a sensor and analyzed by the viewing client. For some embodiments, the sensor data may be, for example, RGB video data from a camera or RGBD data from a depth camera. For some embodiments, the number and locations of the users and display devices may be identified.

If the viewing client has initialized 2304 sensor and configuration data collection, the viewing client may begin the run-time operation, which may be performed continually throughout the content streaming session. In the run-time processing, the viewing client receives 2306 the MPD from the content server. For some embodiments, based on the MPD, collected viewing conditions information, application default settings, and user preferences, the application selects 2308 the initial viewpoint to the spatial data from the MPD and requests data segments according to the timeline information, loading assets that are used first. According to an illustrative example, the client may, e.g., balance between wait-up time caused by using asset formats that use an initial download and bandwidth that is consumed continually with asset formats such as light field video which may be streamed. For some embodiments, balancing is based on per client local criteria.

During run-time, the viewing client may continually observe QoE metrics and timeline information in order to be able to swap between asset formats to achieve better QoE and to estimate when to start downloading of assets. For some embodiments, an estimate of when to start downloading an asset may be based on when the asset may be used by a user experience. For some embodiments, an estimate of when to start downloading may determine an estimate of when an asset may be fully downloaded under current network conditions. For some embodiments, such pre-buffering 2316 by the client may estimate how much excess download bandwidth is currently available and given that excess bandwidth, how long initial download of each asset may take. For some embodiments, content elements to be requested may be selected 2310 based on a timeline, and initial content data may be requested 2312.

For some embodiments, a process executed by a viewing client may include requesting specific content from the content server. The viewing client may collect session-specific viewing condition information. The viewing client may receive the MPD from the content server. The viewing client may select 2310 content streams to be used based on, e.g., application specific initial specifications. The viewing client may request 2312 initial downloads for the selected scene data streams and may request the first segments of the real-time streamed scene data. The viewing client may display 2320 the content. The viewing client may observe 2324 QoE metrics (such as network performance (which may include consumption of available bandwidth), processing performance (which may include computing load reported by the operating system), client computing performance, and session conditions) and may select 2326 the content stream to be requested based on the QoE metrics. The viewing client may request the next spatial data segments, and, e.g., if required, begin downloading 2328 initial data along with real-time streaming. The viewing client may pause streaming to wait 2314 for completion of the initial downloads. The viewing client may repeat the requesting 2318 and processing 2322 of streams until a session termination 2332 is received.

For some embodiments, QoE metrics are data the viewing client collects in order to adapt content streaming to the bandwidth and computation performance limitations. It will be understood that details for how to implement adaptation of content streaming may vary from client to client, and the scenarios described herein and below are examples. Network performance may be measured, for example, by measuring latency between requesting a segment and displaying the segment. For some embodiments, the viewing client may make adjustments so that the latency is below a target frame rate of the rendering in order to not cause content to lag behind due to the network bandwidth. Client computing performance may be a QoE metric that uses rendering frame rate. Rendering falling below a given threshold may indicate that the content exceeds the complexity for which the client device may handle. This situation which may be corrected, for example, by reducing the LoD of the content or by switching to a content format that uses less rendering computation, reducing the rendering complexity.

For some embodiments, spatial content may be requested from a server. For some embodiments, timeline information regarding one or more of a plurality of content elements may be received, wherein selecting the content element representation may be based on representation size, the estimated bandwidth, and playback duration until the content element is displayed. For some embodiments, selecting a content element representation may include: determining a respective minimum bandwidth for each of the plurality of content element representations; and selecting the content element representation from the plurality of content element representations associated with a highest level of detail available such that the expected bandwidth exceeds the respective minimum bandwidth. For some embodiments, selecting a selected representation may include determining a respective minimum bandwidth for each of the one or more degrees of freedom representations and selecting the selected representation from the one or more degrees of freedom representations associated with a highest level of detail available such that the respective minimum bandwidth is less than the tracked bandwidth available. For some embodiments, selecting the selected representation may include: determining a respective start-up delay for one or more of a plurality of content elements; determining a minimum start-up delay of the determined respective start-up delays; and selecting the degrees of freedom representation corresponding to the minimum start-up delay.

Exemplary pseudocode for some embodiments of example adaptation control logic is shown in Table 4. In some embodiments, a viewing client may implement adaptation control logic using other logic and pseudocode (e.g., other than the non-limiting illustrative example provided as follows) that is adapted to a specific application and use case.

TABLE 4

Adaptation Logic Pseudocode

```
start session
receive MPD
select initial viewpoint
select assets that are needed based on the timeline in format with minimal initial download size
observe session capabilities
if tracking enabled
   start collecting motion characteristics
while content available
   request selected assets
   receive selected asset data and pre-buffer
   if asset requiring initial download has not full initial data available and not currently streaming
      alternative asset version
         wait for initial download to be completed
      display content
      observe QoE metrics
      if bandwidth consumption exceeding threshold
         for all assets
            sum of bandwidth saved with dropping LoD is zero
            if lower LoD version available for the currently streamed asset format
               set lower LoD as the current selected streamed asset version and add
                  saved bandwidth to the sum of bandwidth saved
            if asset version with initial download available with less streaming bandwidth
               required
                  if initial download size can be performed within threshold time limit and
                     list of assets to switched to once initial download has been performed
                     has room and sum of bandwidth saved has is bigger than zero
                        set initial download to be performed and list asset as one that is
                           to be switched to once initial download has been performed
         if sum of bandwidth saved zero
            select streaming asset to be removed from the list of currently selected assets
               by using weighting between streaming bandwidth required, remaining duration
               how long asset is needed according to the timeline and estimated visual value
               (size of element in current viewpoint, distance from the viewpoint)
      else if bandwidth consumption can be increased
         if asset missing that is currently visible according to the timeline (removed due
            to the temporary lack of bandwidth)
               set streamed version of the missing asset to be requested
         inspect timeline and identify next assets that are going to become visible
            if new asset becoming visible require initial download
               if download can be performed with currently available excess
                  bandwidth before asset becomes visible
                     start asset download
      if processing effort is exceeding threshold
         if versions of the currently streamed assets available that require less
            processing
               set version with less required processing as the currently selected
         else if version that requires initial download but less processing available
            set initial download to be performed and list asset as one that is to be
               switched to once initial download has been performed
         if processing required can't be reduced by switching asset versions
            select asset to be removed from the processing, i.e. remove from the
               scene by using weighting between processing required, remaining
```

TABLE 4-continued

Adaptation Logic Pseudocode

```
    duration how long asset is needed according to the timeline and
    estimated visual value (size of element in current viewpoint, distance
    from the viewpoint)
  else if processing effort can be increased
    if versions of the currently streamed assets available that require more
      processing
        set version with more required processing as the currently selected
    if versions of the assets that require initial download available that require more
      processing available
        set initial download to be performed and list asset as one that is to be
        switched to once initial download has been performed
```

One example of another additional control element not described in the pseudo code explanatory non-limiting example of Table 4 is user preferences. In some embodiments, user preferences may impact adaptation. For example, a user preference may indicate a preference for full 3D content but allow free 6 DoF navigation at all times. This preference may be implemented in adaptation control logic. For some embodiments, adaptation logic may indicate that assets that, e.g., require initial download are to be used instead of streamed versions.

Figure 24:
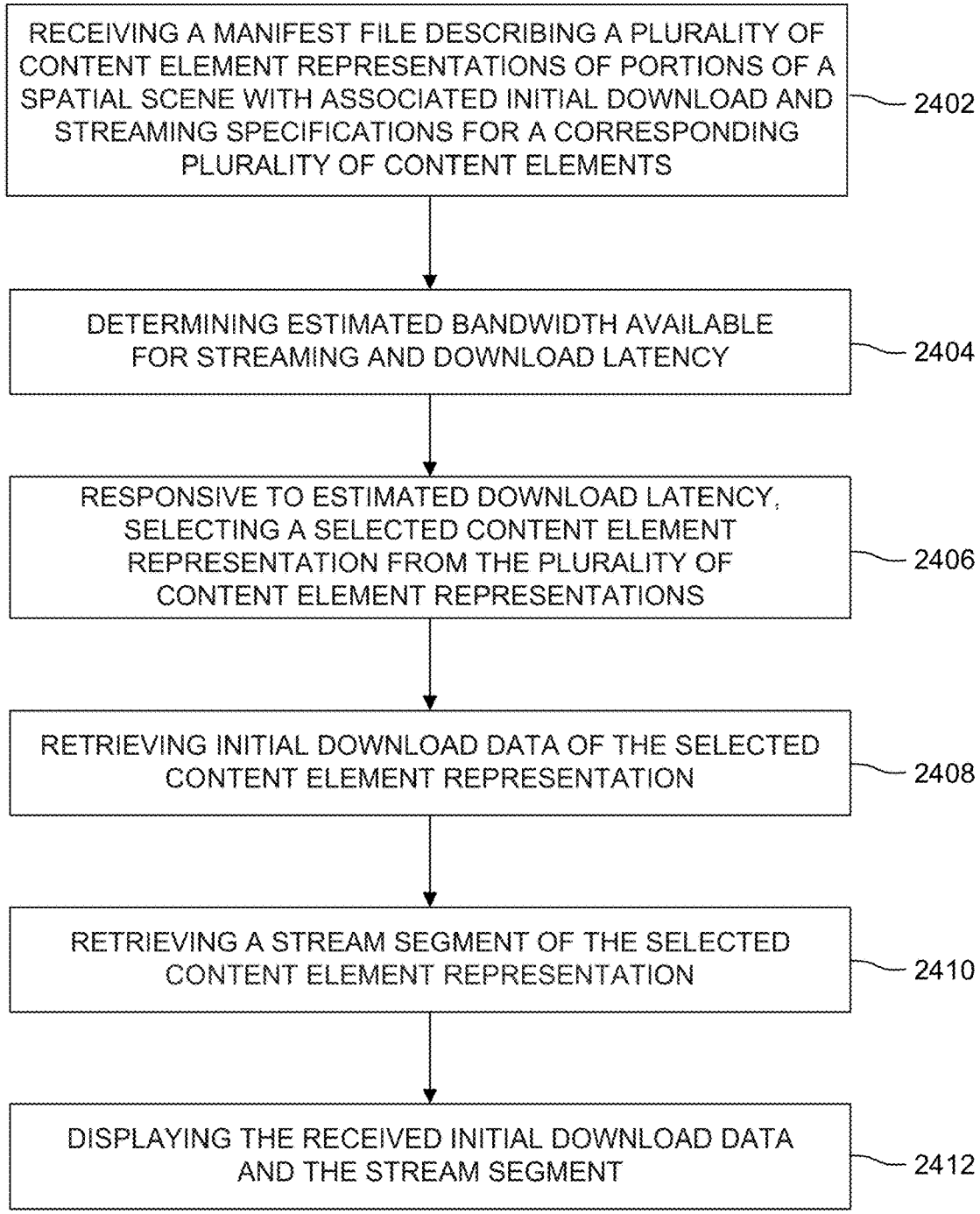
FIG. 24 is a flowchart illustrating an example process according to some embodiments.

FIG. 24 is a flowchart illustrating an example process according to some embodiments. For some embodiments, an example process 2400 may include receiving 2402 a manifest file describing a plurality of content element representations of portions of a spatial scene with associated initial download and streaming specifications for a corresponding plurality of content elements. For some embodiments, the example process 2400 may further include determining 2404 estimated bandwidth available for streaming and download latency. For some embodiments, the example process 2400 may further include responsive to estimated download latency, selecting 2406 a selected content element representation from the plurality of content element representations. For some embodiments, the example process 2400 may further include retrieving 2408 initial download data of the selected content element representation. For some embodiments, the example process 2400 may further include retrieving 2410 a stream segment of the selected content element representation. For some embodiments, the example process 2400 may further include displaying 2412 the received initial download data and the stream segment.

Some embodiments of the example process may further include requesting spatial content from a server. Some embodiments of the example process may further include displaying the received initial download data and the stream segment including a full spatial data scene view. For some embodiments of the example process, retrieving initial download data of the selected content element representation may include: requesting initial download data of the selected content element representation; and receiving the initial download data. For some embodiments of the example process, retrieving a stream segment of the selected content element representation may include: requesting a stream segment of the selected content element representation; and receiving the stream segment of the selected content element representation. For some embodiments, an apparatus may include a processor and a non-transitory computer-readable medium storing instructions that are operative, when executed by the processor, to perform any of the example processes.

For some embodiments, an example process may include requesting spatial content from a server. For some embodiments, retrieving initial download data of the selected content element representation may include: requesting initial download data of the selected content element representation; and receiving the initial download data. For some embodiments, retrieving a stream segment of the selected content element representation may include requesting a stream segment of the selected content element representation.

For some embodiments, a viewing client may receive a manifest file that includes: (1) a plurality of content element representations of portions of a spatial scene with associated initial download and streaming specifications for a corresponding plurality of content elements, and (2) timeline information regarding one or more of the plurality of content elements. For some embodiments, a viewing client may perform a process further including: determining an estimated bandwidth available for streaming content; selecting a content element representation from the plurality of content element representations based on at least one of the estimated bandwidth, initial download and streaming specifications, and the timeline information; retrieving initial download data of the selected content element representation; and retrieving a stream segment of the selected content element representation.

For some embodiments, a viewing client may perform a process that includes: determining a respective estimated download latency of a plurality of content element representations; selecting a content element representation from the plurality of content element representations based on the respective estimated download latency; and retrieving a stream segment of the selected content element representation. For some embodiments, the process may include rendering the representation. For some embodiments, selecting a degrees of freedom representation from one or more degrees of freedom representation may be responsive to an estimated download latency.

For some embodiments, an apparatus may include a processor; and a non-transitory computer-readable medium storing instructions that are operative, when executed by the processor, to perform an example process described above.

Figure 25:
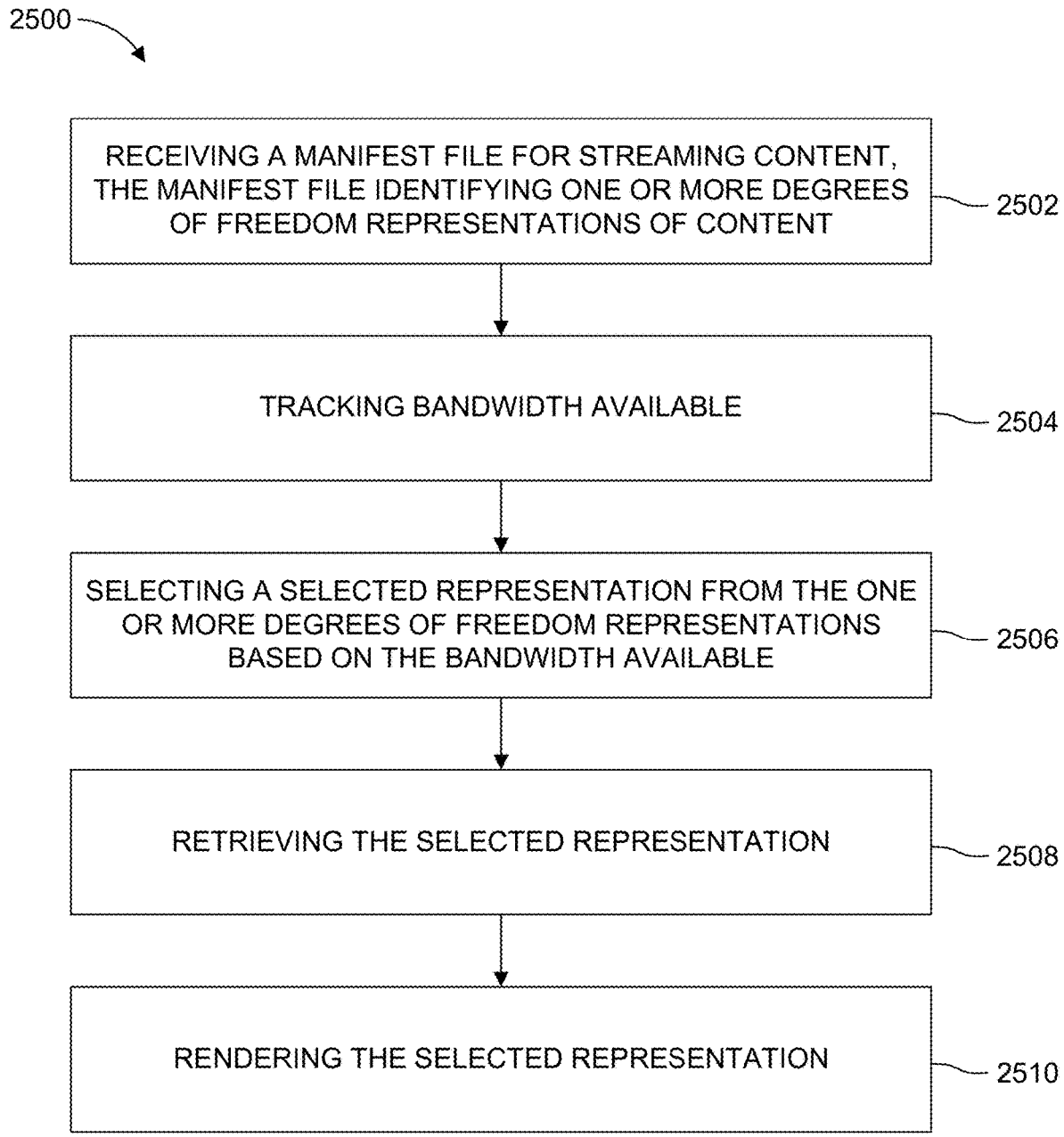
FIG. 25 is a flowchart illustrating another example process according to some embodiments.

FIG. 25 is a flowchart illustrating another example process according to some embodiments. For some embodiments, an example process 2500 may include receiving 2502 a manifest file for streaming content, the manifest file identifying one or more degrees of freedom representations of content. For some embodiments, the example process 2500 may further include tracking 2504 bandwidth available. For some embodiments, the example process 2500 may further include selecting 2506 a selected representation from the one or more degrees of freedom representations based on the bandwidth available. For some embodiments, the example process 2500 may further include retrieving 2508 the selected representation. For some embodiments, the example process 2500 may further include rendering 2510 the selected representation. For some embodiments, an apparatus may include a processor and a non-transitory computer-readable medium storing instructions that are operative, when executed by the processor, to cause the apparatus to perform the example process 2500 or any of the methods described above.

While the methods and systems in accordance with some embodiments are discussed in the context of a viewing client, some embodiments may be applied to virtual reality (VR), mixed reality (MR), and augmented reality (AR) contexts as well. Some embodiments may be applied to a wearable device, such as a head mounted display (HMD), (which may or may not be attached to the head) capable of, e.g., VR, AR, and/or MR for some embodiments.

An example method in accordance with some embodiments may include: receiving a manifest file for streaming content, the manifest file identifying one or more degrees of freedom representations of content; tracking bandwidth available; selecting a selected representation from the one or more degrees of freedom representations based on the bandwidth available; retrieving the selected representation; and rendering the selected representation.

For some embodiments, the example method may further include: determining estimated download latency of the one or more degrees of freedom representations; responsive to the estimated download latency, selecting a second representation from the one or more degrees of freedom representations; retrieving the second representation; and rendering the second representation.

For some embodiments, the example method may further include: determining estimated download latency of the one or more degrees of freedom representations; responsive to the estimated download latency, selecting a second representation from the one or more degrees of freedom representations; retrieving initial download data of the second representation; requesting a stream segment of the second representation; and displaying the retrieved initial download data and the stream segment comprising a full spatial data scene view.

For some embodiments of the example method, the one or more degrees of freedom representations may include 0 DoF, 3 DoF, 3 DoF+, and 6 DoF representations of content.

For some embodiments of the example method, selecting the selected representation may be selected further based on at least one of capabilities of a client device and range of motion of the client device.

For some embodiments, the example method in accordance with some embodiments may further include: tracking the range of motion of the client device; detecting a change in the range of motion of the client device; and responsive to detecting the change in the range of motion of the client device, selecting another representation from the one or more degrees of freedom representations.

For some embodiments, the example method in accordance with some embodiments may further include: tracking the capabilities of the client device; detecting a change in the capabilities of the client device; and responsive to detecting the change in the capabilities of the client device, selecting another representation from the one or more degrees of freedom representations.

For some embodiments, the example method in accordance with some embodiments may further include: detecting a change in the bandwidth available; responsive to detecting the change in the bandwidth available, selecting an additional representation from the one or more degrees of freedom representations; retrieving the additional representation; and rendering the additional representation.

For some embodiments of the example method, selecting the selected representation may include: determining a respective minimum bandwidth for each of the one or more degrees of freedom representations; and selecting the selected representation from the one or more degrees of freedom representations associated with a highest level of detail available such that the respective minimum bandwidth is less than the tracked bandwidth available.

For some embodiments of the example method, selecting the selected representation may include: determining a respective start-up delay for one or more of a plurality of content elements; determining a minimum start-up delay of the determined respective start-up delays; and selecting the degrees of freedom representation corresponding to the minimum start-up delay.

For some embodiments, the example method in accordance with some embodiments may further include: determining a quality of experience (QoE) metric for the selected representation is less than a threshold; and responsive to determining the QoE metric for the selected representation is less than the threshold, selecting a still further representation from the one or more degrees of freedom representations.

For some embodiments of the example method, the QoE metric may be a metric selected from the group consisting of network performance, processing performance, client computing performance, and session conditions.

For some embodiments, the example method in accordance with some embodiments may further include: selecting a level of detail representation from one or more level of detail representations for the selected degrees of freedom representation based on a viewpoint of a user, wherein the selected degrees of freedom representation comprises the one or more level of detail representations.

For some embodiments, the example method in accordance with some embodiments may further include: limiting the viewpoint of the user to a viewing area for the user, wherein the manifest file comprises the viewing area for the user.

For some embodiments, the example method in accordance with some embodiments may further include: determining available processing power for processing the selected degrees of freedom representation; and selecting a level of detail representation from one or more level of detail representations for the selected degrees of freedom representation based on the available processing power, wherein the selected degrees of freedom representation comprises the selected level of detail representation.

For some embodiments, the capabilities of the client may include one or more of the following: resolution, display size, pixel size, number of dimensions supported, degrees of freedom supported, levels of detail supported, bandwidth supported, processing power, processing performance, start-up delay, latency delay, image quality, and spatial content types supported.

For some embodiments, the manifest file may include a Media Presentation Description (MPD) file.

An example apparatus in accordance with some embodiments may include: a processor; and a non-transitory computer-readable medium storing instructions that are operative, when executed by the processor, to cause the apparatus to perform any of the embodiments of the example method.

An example method in accordance with some embodiments may include: receiving, at a client device, a manifest file describing an ordered plurality of degrees of freedom representations of content; estimating, at the client device, bandwidth available for streaming the content to the client device; selecting, at the client device, a first degrees of freedom representation from the ordered plurality of degrees of freedom representations; detecting, at the client device, a change in the bandwidth available for streaming the content; responsive to detecting the change in the bandwidth available, selecting, at the client device, a second degrees of freedom representation from the ordered plurality of degrees of freedom representations; and requesting the second degrees of freedom representation.

An example apparatus is accordance with some embodiments may include: a processor; and a non-transitory computer-readable medium storing instructions that are operative, when executed by the processor, to perform an example method listed above.

In some embodiments of the example method, estimating bandwidth available for streaming the content to the client device may include detecting the change in the bandwidth available for streaming the content, and selecting the second degrees of freedom representation responsive to estimating the change in bandwidth available may include selecting the second degrees of freedom representation responsive to detecting the change in the bandwidth available for streaming the content In some embodiments of the example method, the manifest file comprises a Media Presentation Description (MPD) file.

In some embodiments of the example method, the plurality of degrees of freedom representations may include 0 DoF, 3 DoF, 3 DoF+, and 6 DoF representations of the content.

In some embodiments of the example method, the change in the bandwidth available may be estimated to be a reduction, and the second degrees of freedom representation may include a lower degree of freedom.

In some embodiments of the example method, the change in the bandwidth available may be estimated to be an increase, and the second degrees of freedom representation comprises a higher degree of freedom.

Some embodiments of the example method may further include: determining available processing power for processing the second degrees of freedom representation; and selecting a level of detail representation from a plurality of level of detail representations for the second degrees of freedom representation based on the available processing power, wherein the second degrees of freedom representation may include the plurality of level of detail representations.

In some embodiments of the example method, the available processing power may include at least one parameter selected from the group consisting of local rendering power and view interpolation power.

Some embodiments of the example method may further include: tracking a range of motion of the client; and responsive to detecting a reduction in the range of motion of the client, selecting a third degrees of freedom representation from the ordered plurality of degrees of freedom representations, wherein degrees of freedom of the third degrees of freedom representation may be less than degrees of freedom of the second degrees of freedom representation.

Some embodiments of the example method may further include rendering the content for the second degrees of freedom representation.

Some embodiments of the example method may further include: determining a quality of experience (QoE) metric for the content; selecting a third degrees of freedom representation from the ordered plurality of degrees of freedom representations based on the QoE metric; and requesting, from a streaming server, the third degrees of freedom representation.

In some embodiments of the example method, the QoE metric may be selected from the group consisting of: network performance, processing performance, and session conditions.

Some embodiments of the example method may further include selecting a level of detail representation from a plurality of level of detail representations for the third degrees of freedom representation based on the QoE metric, wherein the third degrees of freedom representation may include the plurality of level of detail representations.

Some embodiments of the example method may further include determining a viewpoint of a user, wherein rendering the content renders the content for the viewpoint of the user.

Some embodiments of the example method may further include: selecting a third degrees of freedom representation from the ordered plurality of degrees of freedom representations based on the viewpoint of the user; and requesting, from a streaming server, the third degrees of freedom representation.

Some embodiments of the example method may further include selecting a level of detail representation from a plurality of level of detail representations for the third degrees of freedom representation based on the viewpoint of the user, wherein the third degrees of freedom representation may include the plurality of level of detail representations.

Some embodiments of the example method may further include limiting a viewpoint of a user to a viewing area for the user, wherein the manifest file may include the viewing area for the user.

Some embodiments of the example method may further include limiting a viewpoint of a user to a combination of the viewing area for the user and a navigation area for the user, wherein the manifest file may include the navigation area for the user.

An example apparatus in accordance with some embodiments may include: a processor; a non-transitory computer-readable medium storing instructions that are operative, when executed by the processor, to perform any of the methods of a client device including, e.g., a viewing client described above.

Another example method in accordance with some embodiments may include: receiving, at a content server, e.g., a streaming content server, a request for a manifest file describing an ordered plurality of degrees of freedom representations of content; generating the manifest file for the content; sending, to a client device, the manifest file; receiving, from the client device, a request for a data segment of the content; and sending, to the client device, the data segment of the content, wherein at least one of the ordered plurality of degrees of freedom representations may include at least two level of detail representations of the content.

In some embodiments of the example method, the request for the data segment indicates a selected degrees of freedom representation selected from the ordered plurality of degrees of freedom representations, the selected degrees of freedom representation within the manifest file comprises a plurality of level of detail representations, and the request for the data segment indicates a selected level of detail selected from the plurality of level of detail representations.

In some embodiments of the example method, the data segment sent to the client device matches the selected degrees of freedom representation and the selected level of detail representation.

An example apparatus in accordance with some embodiments may include: a processor; a non-transitory computer-readable medium storing instructions that are operative, when executed by the processor, to perform any of the methods of a content server described above.

An example method in accordance with some embodiments may include: receiving spatial data of a scene; generating ordered levels of detail (LoD) versions of the spatial data; generating ordered degrees of freedom (DoF) versions of the spatial data; generating a media presentation description (MPD) for the scene; responsive to receiving a content request from a viewing client, sending the MPD to the viewing client; and transferring, to the viewing client, data elements for the content request.

An example apparatus in accordance with some embodiments may include: a processor; a non-transitory computer-readable medium storing instructions that are operative, when executed by the processor, to perform the method of: receiving spatial data of a scene; generating ordered levels of detail (LoD) versions of the spatial data; generating ordered degrees of freedom (DoF) versions of the spatial data; generating a media presentation description (MPD) for the scene; responsive to receiving a content request from a viewing client, sending the MPD to the viewing client; and transferring, to the viewing client, data elements for the content request.

An example method in accordance with some embodiments may include: requesting, from a content server, content for a scene; collecting information on session specific viewing conditions; receiving, from the content server, a media presentation description (MPD) for the scene; selecting a viewpoint as an initial viewpoint of the scene; requesting an initial set of content segments of the scene using application specific initial requirements; setting a current set of content segments to the initial set of content segments; and repeating continually, until a session termination is received, a content request and display process comprising: displaying the current set of content segments; responsive to processing scene logic and user feedback input, updating the viewpoint of the scene; determining a quality of experience (QoE) metric; updating LoD and DoF levels adapted to the QoE metric; updating LoD and DoF levels adapted to the QoE metric; requesting an updated set of content segments of the scene matching the updated LoD and DoF levels; and setting the current set of content segments to be the updated set of content segments.

In some embodiments of the example method, the application specific initial requirements include initial levels for the LoD and DoF.

An example apparatus in accordance with some embodiments may include: a processor; a non-transitory computer-readable medium storing instructions that are operative, when executed by the processor, to perform the method of: requesting, from a content server, content for a scene; collecting information on session specific viewing conditions; receiving, from the content server, a media presentation description (MPD) for the scene; selecting a viewpoint as an initial viewpoint of the scene; requesting an initial set of content segments of the scene using application specific initial requirements; setting a current set of content segments to the initial set of content segments; and repeating continually, until a session termination is received, a content request and display process comprising: displaying the current set of content segments; responsive to processing scene logic and user feedback input, updating the viewpoint of the scene; determining a quality of experience (QoE) metric; updating LoD and DoF levels adapted to the QoE metric; updating LoD and DoF levels adapted to the QoE metric; requesting an updated set of content segments of the scene matching the updated LoD and DoF levels; and setting the current set of content segments to be the updated set of content segments.

Another example method in accordance with some embodiments may include: receiving a manifest file describing ordered adaptation sets for content; estimating a bandwidth available for streaming content to a viewing client; selecting an initial adaptation set based on the estimated bandwidth available; responsive to estimating a change in the bandwidth available, selecting an updated adaptation set from the ordered adaptation sets described in the manifest file; requesting content streams for the updated adaptation set; receiving the content streams for the updated adaptation set; and displaying the content streams for the updated adaptation set.

Some embodiments of another example method may further include: measuring quality of experience (QoE) metrics; updating the adaptation set based on the QoE metrics; and selecting a representation content type corresponding to the updated adaptation set based on the estimated bandwidth and QoE metrics.

Another example apparatus in accordance with some embodiments may include: a processor, and a non-transitory computer-readable medium storing instructions that are operative, when executed by the processor, to perform the method of: requesting spatial content from a server; receiving a manifest file describing a plurality of content element representations of portions of the spatial content with associated initial download and streaming specifications for a corresponding plurality of content elements; determining estimated bandwidth available for streaming and estimated download latency; responsive to the estimated download latency, selecting a content element representation from the plurality of content element representations; requesting initial download data of the selected content element representation; receiving the initial download data; requesting a stream segment of the selected content element representation; and displaying the received initial download data and the stream segment comprising a full spatial data scene view.

A further example method in accordance with some embodiments may include: requesting spatial content from a server; receiving a manifest file describing a plurality of content element representations of portions of the spatial content with associated initial download and streaming specifications for a corresponding plurality of content elements; determining estimated bandwidth available for streaming and download latency; responsive to estimated download latency, selecting a selected content element representation from the plurality of content element representations; requesting initial download data of the selected content element representation; receiving the initial download data; requesting a stream segment of the selected content element representation; and displaying the received initial download data and the stream segment including a full spatial data scene view.

A further example apparatus in accordance with some embodiments may include: a processor; and a non-transitory computer-readable medium storing instructions that are operative, when executed by the processor, to perform the method of: requesting spatial content from a server; receiving a manifest file describing a plurality of content element representations of portions of the spatial content with associated initial download and streaming specifications for a corresponding plurality of content elements; determining estimated bandwidth available for streaming and estimated download latency; responsive to the estimated download latency, selecting a content element representation from the plurality of content element representations; requesting initial download data of the selected content element representation; receiving the initial download data; requesting a stream segment of the selected content element representation; and displaying the received initial download data and the stream segment comprising a full spatial data scene view.

An example method in accordance with some embodiments may include: receiving a manifest file describing a plurality of content element representations of portions of a spatial scene with associated initial download and streaming specifications for a corresponding plurality of content elements; determining estimated bandwidth available for streaming and download latency; responsive to estimated download latency, selecting a selected content element representation from the plurality of content element representations; retrieving initial download data of the selected content element representation; retrieving a stream segment of the selected content element representation; and displaying the received initial download data and the stream segment.

Some embodiments of an example method may further include requesting spatial content from a server.

For some embodiments of an example method, the received initial download data and the stream segment may include a full spatial data scene view.

Some embodiments of an example method may further include: receiving timeline information regarding one or more of the plurality of content elements, wherein selecting the content element representation may be based on representation size, the estimated bandwidth, and playback duration until the content element is displayed.

For some embodiments of an example method, selecting the content element representation may be based on representation size, the estimated bandwidth, and playback duration until the content element is displayed.

For some embodiments of an example method, selecting the content element representation may include: determining a respective minimum bandwidth for each of the plurality of content element representations; and selecting the content element representation from the plurality of content element representations associated with a highest level of detail available such that the estimated bandwidth exceeds the respective minimum bandwidth.

For some embodiments of an example method, the manifest file may include timeline information regarding one or more of the plurality of content elements, and selecting the content element representation may be based on the timeline information.

For some embodiments of an example method, selecting the content element representation may include: determining a respective start-up delay for one or more of the plurality of content elements; determining a minimum start-up delay of the determined respective start-up delays; and selecting the content element representation corresponding to the minimum start-up delay, wherein the timeline information may include information regarding the respective start-up delay for one or more of the plurality of content elements.

Some embodiments of an example method may further include: determining a quality of experience (QoE) metric for the selected content element representation is less than a threshold; and selecting a second content element representation from the plurality of content element representations.

For some embodiments of an example method, selecting the second content element representation may include determining the QoE metric corresponding to the second content element representation exceeds a minimum threshold.

For some embodiments of an example method, the QoE metric may be a metric selected from the group consisting of network performance, processing performance, client computing performance, and session conditions.

Some embodiments of an example method may further include: retrieving a stream segment of the second content element representation; and displaying the stream segment of the second content element representation.

An example apparatus in accordance with some embodiments may include: a processor; and a non-transitory computer-readable medium storing instructions that are operative, when executed by the processor, to perform any of the example methods.

An additional example method in accordance with some embodiments may include: receiving a manifest file describing: (1) a plurality of content element representations of portions of a spatial scene with associated initial download and streaming specifications for a corresponding plurality of content elements, and (2) timeline information regarding one or more of the plurality of content elements; determining an estimated bandwidth available for streaming content; selecting a content element representation from the plurality of content element representations based on at least one of the estimated bandwidth, initial download and streaming specifications, and the timeline information; retrieving initial download data of the selected content element representation; and retrieving a stream segment of the selected content element representation.

Some embodiments of an additional example method may further include displaying the received initial download data and the stream segment.

For some embodiments of an additional example method, selecting the content element representation may include: determining a respective latency time associated with the initial download specification for one or more of the plurality of content element representations; and selecting one of the plurality of content element representations, wherein the latency time of the selected content element representation may be less than a threshold.

Some embodiments of an additional example method may further include determining a respective latency time for each of the plurality of content element representations, wherein selecting the content element representation uses the determined respective latency times.

Some embodiments of an additional example method may further include determining a quality of experience (QoE) metric for the selected content element representation; and selecting a second content element representation from the plurality of content element representations based on the determined QoE metric.

For some embodiments of an additional example method, selecting the second content element representation may include determining the QoE metric corresponding to the second content element representation exceeds a minimum threshold.

For some embodiments of an additional example method, the QoE metric may be a metric selected from the group consisting of network performance, processing performance, client computing performance, and session conditions.

An additional example apparatus in accordance with some embodiments may include: a processor; and a non-transitory computer-readable medium storing instructions that are operative, when executed by the processor, to perform any of the additional example methods.

Another example apparatus in accordance with some embodiments may include: determining a respective estimated download latency of a plurality of content element representations; selecting a content element representation from the plurality of content element representations based on the respective estimated download latency; and retrieving a stream segment of the selected content element representation.

A further example method performed by a viewing client, of dynamically adapting content streaming to viewing conditions with limits of client and available connection capabilities in accordance with some embodiments may include: selecting a stream of content from a set of available streams offered by a content server based at least in part on streaming manifest metadata information about the content provided by the content server, wherein the manifest metadata information forms part of a media presentation description (MPD) file and takes into account specific capabilities of the content server, the available connection, and the viewing client; and leveraging at least the manifest metadata information to dynamically provide the stream of content to a display in accordance with download, streaming, and QoE metric constraints, wherein selecting the stream of content is further based at least in part on at least one of contextual information relevant to the viewing client regarding viewing conditions relating to the content; available bandwidth with respect to available connection capabilities of the viewing client; or available processing resources of the viewing client.

An example method in accordance with some embodiments may include adaptively streaming of spatial content balancing between initial downloads and run-time streaming.

An example method in accordance with some embodiments may include: receiving a media manifest file including timeline information; and selecting content downloads corresponding to timeline information.

An example method in accordance with some embodiments may include estimating bandwidth available for streaming and download latency.

An example method in accordance with some embodiments may include responsive to estimating download latency, selecting a representation from said plurality of representations.

An example method in accordance with some embodiments may include selecting and initiating initial downloads to minimize start-up delays.

An example method in accordance with some embodiments may include: observing quality of experience metrics; and adjusting selected content representation.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
receiving a manifest file, the manifest file comprising streaming specifications for a plurality of available content element representations of portions of a spatial scene, the manifest file identifying, for each respective content element representation, (1) degrees of freedom associated with the respective content element representation from among a plurality of available degrees of freedom, and (2) a bitrate associated with the respective content element representation, the manifest file further identifying initial download data and a size of the initial download data for at least a first content element representation of the plurality of available content element representations;
selecting the first content element representation from the plurality of available content element representations identified in the manifest file based on an estimate of available network bandwidth and the size of the initial download data,
wherein the first content element representation is further associated with a first degrees of freedom and initial download data;
retrieving the initial download data;
retrieving a stream segment of the first content element representation; and
displaying the first content element representation using the initial download data and the stream segment.

2. The method of claim 1, further comprising determining the estimate of the available network bandwidth for streaming and an estimate of download latency.

3. The method of claim 2, wherein selecting the first content element representation is further based on the estimate of the download latency.

4. The method of claim 2, wherein determining the estimate of the download latency comprises determining the amount of time needed to download the initial download data using the estimate of the available network bandwidth.

5. The method of claim 1, wherein displaying the first content element representation uses the degrees of freedom identified for the first content element representation in the manifest file.

6. The method of claim 1, wherein the degrees of freedom associated with the first content element representation is 6 degrees of freedom (6DoF).

7. The method of claim 1, wherein the initial download data comprises at least one of a polygon mesh and an animatable object model.

8. An apparatus comprising:
a processor; and
a computer-readable medium storing instructions operative, when executed by the processor, to cause the apparatus to:
receive a manifest file, the manifest file comprising streaming specifications for a plurality of available content element representations of portions of a spatial scene, the manifest file identifying, for each respective content element representation, (1) degrees of freedom associated with the respective content element representation from among a plurality of available degrees of freedom, and (2) a bitrate associated with the content element representation, the manifest file further identifying initial download data and a size of the initial download data for at least a first content element representation of the available content element representations;
select the first content element representation from the plurality of available content element representations identified in the manifest file based on a first estimate of the available network bandwidth and the size of the initial download data,
wherein the first content element representation is further associated with a first degrees of freedom;
retrieve the first initial download data;
retrieve a stream segment of the first content element representation; and
display the first content element representation using the first initial download data and the stream segment.

9. A method comprising:
receiving a manifest file, the manifest file comprising streaming specifications for a plurality of available content element representations of portions of a spatial scene, the manifest file identifying, for each respective content element representation, (1) degrees of freedom associated with the respective content element representation from among a plurality of available degrees of freedom, and (2) a bitrate associated with the respective content element representation, the manifest file further identifying initial download data for at least one of the plurality of available content element representations;
selecting a first content element representation from the plurality of available content element representations specified in the manifest file based on a first estimate of available network bandwidth, the first content element representation associated with a first degrees of freedom;
retrieving streaming segments of the first content element representation;
displaying the streaming segments of the first content element representation using the first degrees of freedom;
selecting a second content element representation from the plurality of available content element representations specified in the manifest file, the second content element representation having initial download data identified in the manifest file, the second content element representation associated with a second degrees of freedom different from the first degrees of freedom;
performing a download of the initial download data; and
once the download of the initial download data is performed, retrieving streaming segments of the second content element representation and switching to display the streaming segments of the second content element representation using the second degrees of freedom.

10. The method of claim 9, wherein selecting the second content element representation is based on a second estimate of the available network bandwidth.

11. The method of claim 9, further comprising determining the first estimate of the available network bandwidth.

12. The method of claim 10, further comprising determining the second estimate of the available network bandwidth.

13. The method of claim 9, further comprising determining an estimate of download latency.

14. The method of claim 13, wherein selecting the second content element representation is based on a determination of download latency for the initial download data.

15. The method of claim 9, wherein selecting the second content element representation is based on a determination that the second degrees of freedom is greater than the first degrees of freedom.

16. The method of claim 9, wherein selecting the second content element representation is based on an amount of available processing resources.

17. The method of claim 9, wherein the manifest file specifies a size of the initial download data.

18. The method of claim 9, wherein the initial download data comprises at least one of a polygon mesh and an animatable object model.

19. The method of claim 9, wherein the second degrees of freedom is 6 degrees of freedom (6DoF).

* * * * *